US012688715B2

(12) United States Patent　　　(10) Patent No.:　US 12,688,715 B2
Kim et al.　　　　　　　　　　　(45) Date of Patent:　　　Jul. 21, 2026

(54) METHOD AND ELECTRONIC DEVICE FOR PROCESSING CLOTHING LABEL IMAGE, AND COMPUTER-READABLE RECORDING MEDIUM

(71) Applicant: SAMSUNG ELECTRONICS CO., LTD., Suwon-si (KR)

(72) Inventors: Younguk Kim, Suwon-si (KR); Jongyeong Kim, Suwon-si (KR); Hyunhan Kim, Suwon-si (KR); Hyosang Kim, Suwon-si (KR); Chanwon Seo, Suwon-si (KR); Hyein Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 18/375,236

(22) Filed: Sep. 29, 2023

(65) Prior Publication Data

US 2024/0112477 A1　　Apr. 4, 2024

Related U.S. Application Data

(63) Continuation of application No. PCT/KR2023/014306, filed on Sep. 20, 2023.

(30) Foreign Application Priority Data

Sep. 29, 2022　(KR) ........................ 10-2022-0124704
Dec. 28, 2022　(KR) ........................ 10-2022-0187753

(51) Int. Cl.
*G06V 20/62*　　　(2022.01)
*G06V 30/18*　　　(2022.01)
(Continued)

(52) U.S. Cl.
CPC .............. *G06V 20/62* (2022.01); *G06V 30/18* (2022.01); *G06V 30/191* (2022.01); *G06V 30/30* (2022.01)

(58) Field of Classification Search
CPC ...................................................... G06V 20/62
See application file for complete search history.

(56) References Cited

U.S. PATENT DOCUMENTS 10,699,322 B2 * 6/2020 Bajovic .............. G06K 7/10297
11,562,558 B2　　1/2023 Kim
(Continued)

FOREIGN PATENT DOCUMENTS

CN　108866934 A　11/2018
CN　110826562 A　2/2020
(Continued)

OTHER PUBLICATIONS

Kralicek, et al, "Care Label Recognition", ICDAR, pp. 959-966, 2019 (Year: 2019).*
(Continued)

*Primary Examiner* — Edward Park
(74) *Attorney, Agent, or Firm* — Sughrue Mion, PLLC

(57)　　　　　ABSTRACT

A method of processing an image by an electronic device, includes: obtaining a label image of a label including at least one symbol associated with handling of clothing item; obtaining, from the label image, text information associated with the handling of the clothing item; identifying, from the label image, the at least one symbol associated with the handling of the clothing item, based on the text information and the label image; and obtaining handling information related to the clothing item based on the identified at least one symbol.

20 Claims, 30 Drawing Sheets

(51) Int. Cl.
    *G06V 30/19*      (2022.01)
    *G06V 30/30*      (2022.01)

(56)          References Cited

U.S. PATENT DOCUMENTS

| | | | |
|---|---|---|---|
| 11,578,444 | B2 | 2/2023 | Kim et al. |
| 11,692,293 | B2 | 7/2023 | Kim et al. |
| 2020/0040508 | A1 | 2/2020 | Park |
| 2020/0042822 | A1* | 2/2020 | Chae .................. G01N 21/3581 |
| 2022/0341078 | A1 | 10/2022 | Kim et al. |
| 2024/0112477 | A1* | 4/2024 | Kim ..................... G06V 30/191 |

FOREIGN PATENT DOCUMENTS

| | | | |
|---|---|---|---|
| CN | 113191422 | A | 7/2021 |
| CN | 114398882 | A | 4/2022 |
| KR | 10-2007-0016765 | A | 2/2007 |
| KR | 10-1959831 | B1 | 3/2019 |
| KR | 10-2019-0094297 | A | 8/2019 |
| KR | 10-2019-0096879 | A | 8/2019 |
| KR | 10-2048638 | B1 | 11/2019 |
| KR | 10-2021-0071267 | A | 6/2021 |
| KR | 10-2021-0092071 | A | 7/2021 |
| KR | 10-2021-0096072 | A | 8/2021 |
| KR | 10-2022-0097844 | A | 7/2022 |
| KR | 10-2022-0111982 | A | 8/2022 |

OTHER PUBLICATIONS

Zhao, et al, "CUTIE: Learning to Understand Documents with Convolutional Universal Text Information Extractor", CV, pp. 1-11, 2019 (Year: 2019).*

Liu, et al, "DeepFashion: Powering Robust Clothes Recognition and Retrieval with Rich Annotations", CVPR, pp. 1096-1104, 2016 (Year: 2016).*

Arivazhakan et al, "Intelligent Washing Machine Driven by Internet of Things", IJME, pp. 1-5, 2021 (Year: 2021).*

International Search Report (PCT/ISA/210) and Written Opinion (PCT/ISA/237) issued by the International Searching Authority on Dec. 22, 2023 in corresponding International Application No. PCT/KR2023/014306.

Jiri Kralicek et al., "Care Label Recognition", 2019 International Conference on Document Analysis and Recognition (ICDAR), Sep. 2019, pp. 959-966, DOI: 10.1109/ICDAR.2019.00158, XP033701427.

Communication issued on Sep. 24, 2025 by the European Patent Office in European Patent Application No. 23872933.9.

\* cited by examiner

Figure 12:
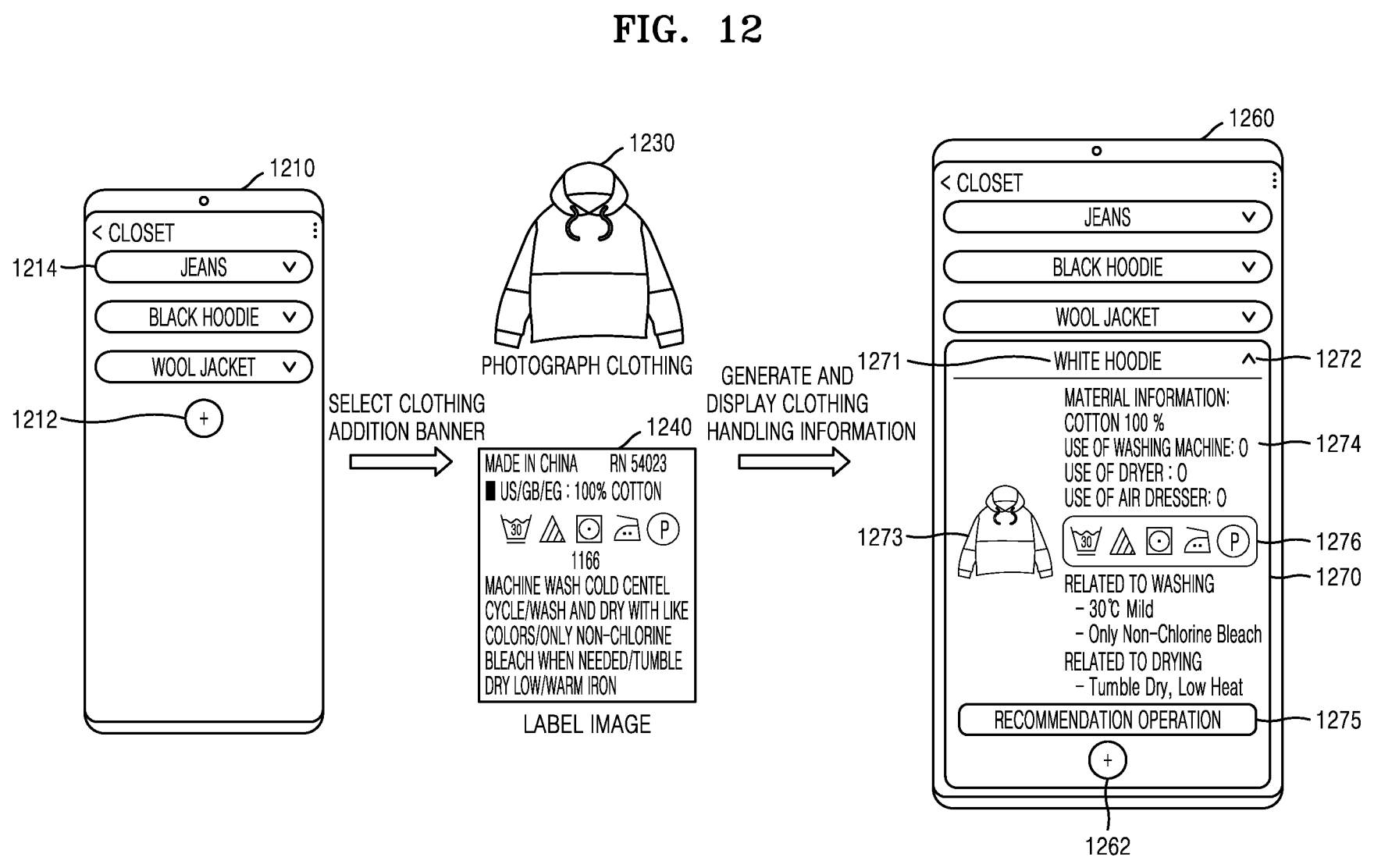

SELECT CLOTHING
ADDITION BANNER

PHOTOGRAPH CLOTHING

GENERATE AND
DISPLAY CLOTHING
HANDLING INFORMATION

1210

< CLOSET

JEANS ∨
BLACK HOODIE ∨
WOOL JACKET ∨

1214

1212

1230

1240

MADE IN CHINA    RN 54023
■ US/GB/EG : 100% COTTON
1166
MACHINE WASH COLD CENTEL
CYCLE/WASH AND DRY WITH LIKE
COLORS/ONLY NON-CHLORINE
BLEACH WHEN NEEDED/TUMBLE
DRY LOW/WARM IRON

LABEL IMAGE

1260

< CLOSET

JEANS ∨
BLACK HOODIE ∨
WOOL JACKET ∨
WHITE HOODIE ∧

MATERIAL INFORMATION:
COTTON 100 %
USE OF WASHING MACHINE: O
USE OF DRYER : O
USE OF AIR DRESSER: O

RELATED TO WASHING
– 30℃ Mild
– Only Non-Chlorine Bleach
RELATED TO DRYING
– Tumble Dry, Low Heat

RECOMMENDATION OPERATION 1272
1274
1276
1270
1271
1273
1275
1262

METHOD AND ELECTRONIC DEVICE FOR PROCESSING CLOTHING LABEL IMAGE, AND COMPUTER-READABLE RECORDING MEDIUM

CROSS-REFERENCE TO RELATED APPLICATION(S)

This application is a bypass continuation of International Application No. PCT/KR2023/014306, filed on Sep. 20, 2023, which is based on and claims priority to Korean Patent Application No. 10-2022-0124704, filed Sep. 29, 2022, in the Korean Intellectual Property Office and Korean Patent Application No. 10-2022-0187753, filed Dec. 28, 2022, in the Korean Intellectual Property Office, the disclosures of which are incorporated by reference herein in their entireties.

BACKGROUND

1. Field

The disclosure relates to an electronic device for identifying, from a label image, information corresponding to a clothing item. For example, the disclosure may include an electronic device and a method for identifying, from a label image of clothing item, at least one symbol associated with handling of a clothing item.

2. Description of Related Art

Various technologies for text recognition are used in the field of computer vision. For example, text included in an image may be recognized by using optical character recognition (OCR), and objects included in an image may be identified by using object detection.

A label image associated with a clothing item may include text and symbols. Technologies in the field of computer vision may be used to recognize and/or identify text and symbols included in a label image of the clothing item.

SUMMARY

Provided are a method and an electronic device for processing an image and a computer-readable recording medium.

In an embodiment of the disclosure, a method of processing an image by an electronic device, may include: obtaining a label image of a label including at least one symbol associated with handling of clothing item; obtaining, from the label image, text information associated with the handling of the clothing item; identifying, from the label image, the at least one symbol associated with the handling of the clothing item, based on the text information and the label image; and obtaining handling information related to the clothing item based on the identified at least one symbol.

In an embodiment of the disclosure, the method may include obtaining a plurality of texts from the label image by applying the label image to an optical character recognition (OCR) model; and extracting at least one text associated with the handling of the clothing item from among the plurality of obtained texts by applying the plurality of texts to at least one artificial intelligence (AI) model trained to infer texts associated with handling of clothing item.

In an embodiment of the disclosure, the extracting of the at least one text associated with the handling of the clothing item may include: obtaining weight information about weights representing a correlation between the plurality of texts by applying the plurality of texts to a first AI model; and extracting the at least one text associated with the handling of the clothing item from among the plurality of texts by applying the plurality of texts and the weight information to a second AI model.

In an embodiment of the disclosure, the first AI model may be an AI model trained to infer the weights representing the correlation between the plurality of texts, and the second AI model may be an AI model trained to infer the texts associated with the handling of the clothing item.

In an embodiment of the disclosure, the identifying of the at least one symbol may include: extracting at least one image feature associated with the at least one symbol by inputting the label image to an image feature extraction network; and identifying, from the label image, the at least one symbol associated with the handling of the clothing item by applying the text information associated with the handling of the clothing item, including the at least one text associated with the handling of the clothing item, and the at least one image feature associated with the at least one symbol, to a third AI model trained to infer symbols associated with the handling of the clothing item.

In an embodiment of the disclosure, the text information associated with the handling of the clothing item may include at least one of a type of clothing, a fiber material, a fiber ratio, or precautions corresponding to the clothing item.

In an embodiment of the disclosure, the method may further include: obtaining appearance information for identifying the clothing item; and displaying clothing information including the handling information and the appearance information.

In an embodiment of the disclosure, the method may further include: obtaining a user input requesting information about a recommendation operation corresponding to the handling information; identifying whether the clothing item is manageable in at least one clothing management device, based on the handling information; and providing information about whether the clothing is manageable in the at least one clothing management device, based on the user input.

In an embodiment of the disclosure, the providing of the information about whether the clothing is manageable in the at least one clothing management device may include: obtaining information about the recommendation operation to be performed by the at least one clothing management device by analyzing the handling information based on identifying that the clothing item is manageable in the at least one clothing management device; and transmitting the information about the recommendation operation to the at least one clothing management device.

In an embodiment of the disclosure, the providing of the information about whether the clothing is manageable in the at least one clothing management device may include providing a notification that the at least one clothing management device is unable to handle the clothing item, based on identifying that the clothing item is unmanageable in the at least one clothing management device.

In an embodiment of the disclosure, the method may further include: transmitting the label image to a server; and receiving, from the server, the at least one symbol or the handling information.

In an embodiment of the disclosure, the handling information may include at least one of washing information, drying information, spin-drying information, ironing information, or dry cleaning information corresponding to the clothing item.

In an embodiment of the disclosure, ah electronic device for processing an image, includes: a memory storing one or more instructions; and at least one processor configured to execute the one or more instructions stored in the memory to: obtain a label image of a label including at least one symbol associated with the handling of the clothing item; obtain, from the label image, text information associated with the handling of the clothing item; identify, from the label image, the at least one symbol related to the item, based on the text information and the label image; and obtain handling information related to the clothing item based on the identified at least one symbol.

In an embodiment of the disclosure, the item may be a clothing item, the label may be attached to the clothing item, and the label may include the text information associated with handling of the clothing item, and the at least one processor may be further configured to execute the one or more instructions to: obtain a plurality of texts from the label image by applying the label image to an optical character recognition (OCR) model; and extract at least one text associated with the handling of the clothing item from among the plurality of texts by applying the plurality of obtained texts to at least one artificial intelligence (AI) model trained to infer texts associated with handling of clothing item.

In an embodiment of the disclosure, the at least one processor may be further configured to execute the one or more instructions to: obtain weight information about weights representing a correlation between the plurality of texts by applying the plurality of texts to a first AI model; and extract the at least one text associated with the handling of the clothing item from among the plurality of texts by applying the plurality of texts and the weight information to a second AI model.

In an embodiment of the disclosure, the first AI model may be an AI model trained to infer the weights representing the correlation between the plurality of texts, and the second AI model may be an AI model trained to infer the texts associated with the handling of the clothing item.

In an embodiment of the disclosure, the at least one processor may be further configured to execute the one or more instructions to: extract at least one image feature associated with the at least one symbol by inputting the label image to an image feature extraction network; and identify, from the label image, the at least one symbol associated with the handling of the clothing item by applying the text information associated with the handling of the clothing item, including the at least one text associated with the handling of the clothing item, and the at least one image feature associated with the at least one symbol, to a third AI model trained to infer symbols associated with the handling of the clothing item.

In an embodiment of the disclosure, the at least one processor may be further configured to execute the one or more instructions to: obtain appearance information for identifying the clothing item; and display clothing information including the handling information and the appearance information.

In an embodiment of the disclosure, the at least one processor may be further configured to execute the one or more instructions to: obtain a user input requesting information about a recommendation operation corresponding to the handling information; identify whether the clothing item is manageable in at least one clothing management device, based on the handling information; and provide information about whether the clothing is manageable in the at least one clothing management device, based on the user input.

In an embodiment of the disclosure, a computer-readable recording medium has recorded thereon a program for causing a computer to perform a method including: obtaining a label image of a label including at least one symbol associated with the handling of the clothing item; obtaining, from the label image, text information associated with the handling of the clothing item; identifying, from the label image, the at least one symbol related to the clothing item, based on the text information and the label image; and obtaining handling information related to the item, based on the identified at least one symbol.

BRIEF DESCRIPTION OF DRAWINGS

The above and other aspects of the disclosure will become apparent and more easily understood by the following detailed description in conjunction with the accompanying drawings.

FIG. 8 illustrates an input and an output of a clothing symbol identification module that receives a label image and recognizes a clothing symbol, according to an embodiment of the disclosure;

FIG. 12 illustrates an operation by which the electronic device 100 provides appearance information and handling information, according to an embodiment of the disclosure;

DETAILED DESCRIPTION

Figure 1:
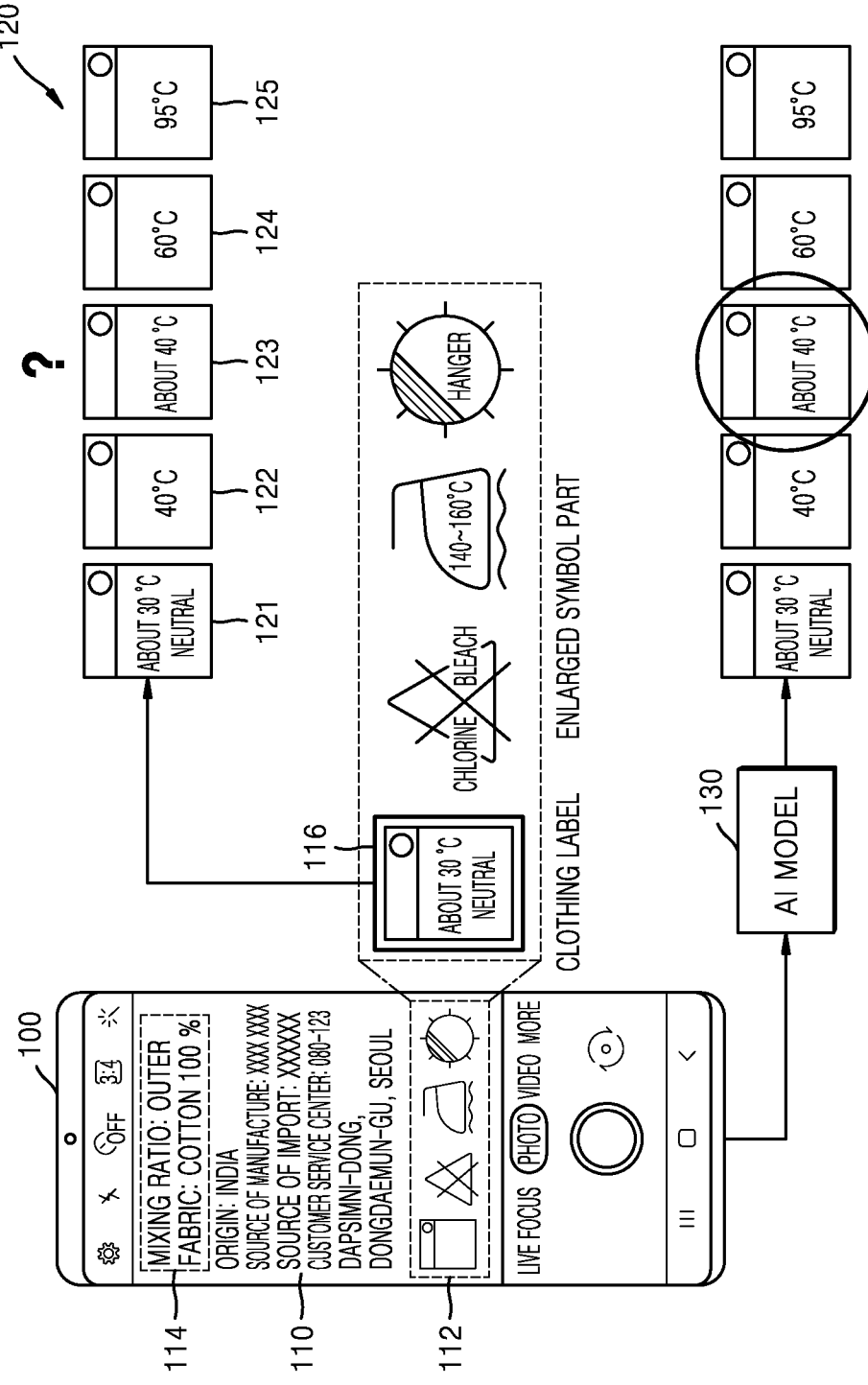
FIG. 1 is a diagram for describing an image processing system according to an embodiment of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Throughout the disclosure, the expression "at least one of a, b or c" indicates only a, only b, only c, both a and b, both a and c, both b and c, or all of a, b, and c.

As for the terms as used in the disclosure, common terms that are currently widely used are selected as much as possible while taking into account the functions in the disclosure. However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of the disclosure. Therefore, the terms as used herein should be defined based on the meaning of the terms and the description throughout the disclosure rather than simply the names of the terms.

The singular forms as used herein are intended to include the plural forms as well unless the context clearly indicates otherwise. All terms including technical or scientific terms as used herein have the same meaning as commonly understood by those of ordinary skill in the art.

The term "and/or" includes a combination of a plurality of related recited elements or any one of a plurality of related recited elements.

It will be understood that although the terms "first," "second," etc. may be used to describe various elements, these elements should not be limited by these terms. These terms are only used to distinguish one element from another.

Throughout the specification, the expression "a portion includes a certain element" means that a portion further includes other elements rather than excludes other elements unless otherwise stated. The embodiments of the disclosure are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units, modules or the terms such as " . . . er/or" or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, an embodiment of the disclosure will be described in detail with reference to the accompanying drawings, so that those of ordinary skill in the art may easily carry out the disclosure. However, the disclosure may be implemented in various different forms and is not limited to the embodiments described herein. In order to clearly explain the disclosure, parts irrelevant to the description are omitted in the drawings, and similar reference numerals are assigned to similar parts throughout the specification. Also, reference numerals used in the drawings are only for describing the drawings, and different reference numerals used in different drawings do not indicate different elements. Hereinafter, the disclosure will be described in detail with reference to the accompanying drawings.

FIG. 1 is a diagram for describing an image processing system according to an embodiment of the disclosure.

Referring to FIG. 1, the image processing system according to an embodiment of the disclosure may include an electronic device 100. However, the disclosure is not limited thereto, and as such, according to an embodiment, the image processing system may include other devices and/or components. For example, the image processing system may further include a server in addition to the electronic device

100. The image processing system including the server will be described in detail with reference to FIG. 21.

The electronic device 100 according to an embodiment of the disclosure may be a device that identifies and/or provides information about a label image of a label attached to clothing, such as a clothing item. The clothing item may be an object made of cloth, leather or other material that may be worn on the body. For example, clothing items may include clothes, accessories (e.g., gloves, hats, etc.), companion animal clothes, and the like. Also, the clothing items may include are various types, uses, and materials of clothing. For example, the material of clothing may be made of various materials, such as cotton, hemp, wool, rayon, polyester, nylon, acrylic, and the like, and clothing management methods such as washing and drying methods may be different depending on the material of clothing.

According to an embodiment, a clothing label may be a tag indicating clothing-related information and is a label attached to the inside or outside of clothing. The label may refer to the clothing label. The clothing-related information in the clothing label may include information such as a size of clothing, a color of clothing, a material of clothing, a washing manner, a drying manner, a manufacturer, a source of import, a source of sales, year and month of manufacture, a country of manufacture, or precautions. The washing manner, the drying manner, or the ironing manner may be represented by a symbol in the clothing label.

The symbols associated with handling of clothing item, which is included in the clothing label, may include a symbol indicating a washing manner, a symbol indicating a drying manner, a symbol indicating an ironing manner, a symbol indicating spin-drying information, a symbol indicating a dry cleaning manner, and a symbol indicating a solvent used in a clothing management device. The symbols included in the clothing label are standardized and may be different for each country. Also, some symbols included in the clothing label may be indicated identically even in different countries.

The electronic device 100 may be of various types. For example, the electronic device 100 may include a smart television (TV), a smartphone, a tablet personal computer (PC), a laptop PC, and a wearable device, but the disclosure is not limited thereto. The electronic device 100 may be implemented as various types and forms of the electronic device 100 including a camera.

In an embodiment of the disclosure, a user of the electronic device 100 may photograph a clothing label attached to clothing by using the camera of the electronic device 100. In this case, the electronic device 100 may obtain a label image 110 including at least a portion of the label. At least one symbol 112 associated with handling of clothing item may be included in the label image 110, and text 114 associated with handling of clothing item may be included in the label image 110.

In an example, the symbols included in the clothing label may have many similar shapes, it may be difficult to clearly recognize the symbols in the label image 110 even when the electronic device 100 performs an operation of enlarging the label image 110 or performs a super-resolution operation on the label image 110. For example, the electronic device 100 may not clearly identify a first symbol 116 among the at least one symbol 112 included in the label image 110. The electronic device 100 may recognize that the first symbol 116 is a symbol including letters inside a washing machine figure, but may not clearly recognize even letters included inside the washing machine figure. Accordingly, it may be difficult for the electronic device 100 to exactly select one candidate symbol as the first symbol 116 from among candidate symbol sets 120 including letters inside the washing machine figure. The candidate symbol sets 120 may include a first candidate symbol 121 including "about 30° C., neutral" inside the washing machine figure, a second candidate symbol 122 including "40° C." inside the washing machine figure, a third candidate symbol 123 including "about 40° C." inside the washing machine figure, a fourth candidate symbol 124 including "60° C." inside the washing machine figure, and a fifth candidate symbol 125 including "95° C." inside the washing machine figure.

Meanwhile, when the electronic device 100 uses text information included in the label, it may be easier than selecting the first symbol 116 from among the candidate symbol sets 120. Therefore, according to an embodiment of the disclosure, the electronic device 100 may recognize a symbol in the label image 110 by using at least one AI model 130 trained to infer a symbol by taking into account the text information included in the label.

For example, the electronic device 100 may select, as the first symbol 116, the third candidate symbol 123 including "about 40° C." inside the washing machine figure from among the candidate symbol sets 120 by applying, to the at least one AI model 130, the text 114 associated with handling of clothing item, which indicates a fiber material and a fiber percentage, and the label image 110.

According to an embodiment of the disclosure, the electronic device 100 performs symbol recognition from the label image 110 by taking into account the text information included in the label, and as such, a symbol recognition rate may be increased and accurate handling information may be provided to a user.

Although the disclosure describes an electronic device 100 that identifies and/or provides information about the clothing item according to an embodiment, the disclosure is not limited thereto. For example, according to an embodiment, the electronic device 100 may identify and/or provide information about other types of labels (e.g., a label different from a clothing label). For example, one or more of the other types of labels may include a tag indicating information corresponding to an item or an object associated with the tag. For example, the tag or the label may be attached to the item or the object. According to an embodiment, the electronic device 100 may identify and/or provide item (or object) related information, which may include information about one or more characteristics or one or more features of the item.

Hereinafter, an operation by which the electronic device 100 identifies, from the label image 110, at least one symbol associated with handling of clothing item will be described in more detail with reference to FIG. 2.

Figure 2:
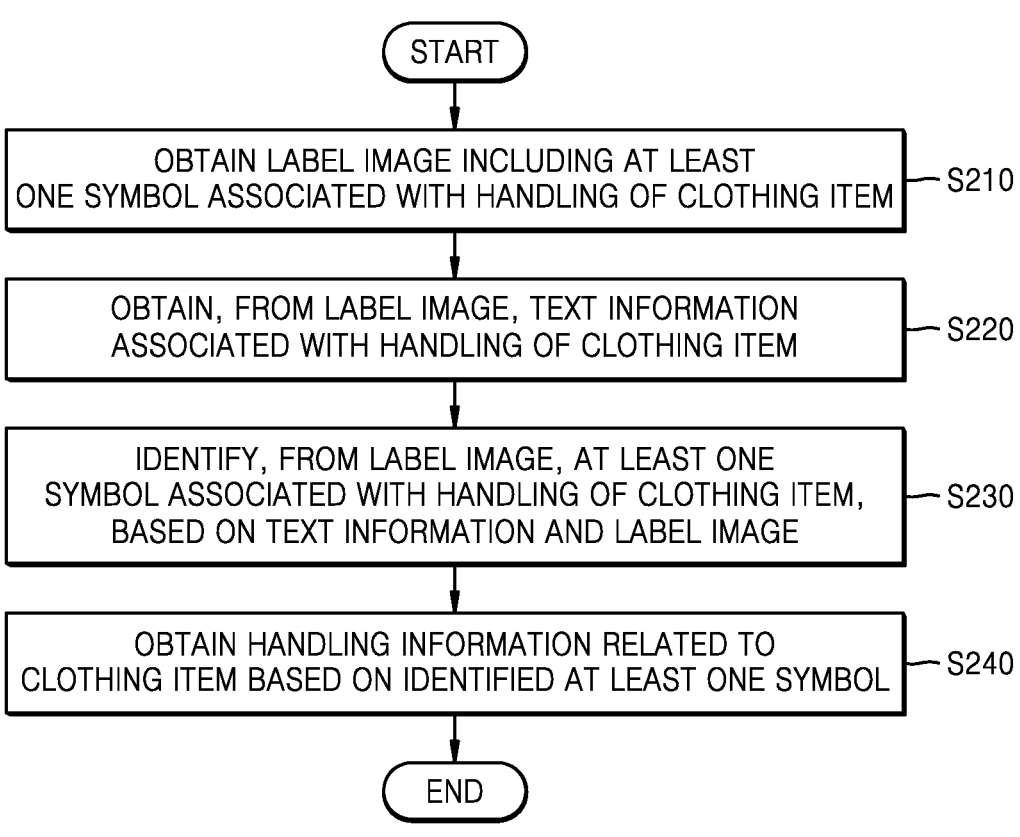
FIG. 2 is a flowchart of a method, performed by an electronic device, of processing an image, according to an embodiment of the disclosure.

FIG. 2 is a flowchart of a method of processing an image according to an embodiment of the disclosure. The method may be performed by the electronic device 100.

In operation S210, the electronic device 100 according to an embodiment of the disclosure may obtain a label image of a label including at least one symbol associated with handling of clothing item. For example, the user of the electronic device 100 may photograph the label attached to clothing item by using the camera of the electronic device 100. The electronic device 100 may obtain the label image including at least a portion of label by photographing the clothing label through the camera. Meanwhile, the disclosure is not limited thereto, and as such, the label image may be obtained in another manner. For example, according to an embodiment, the electronic device 100 may obtain the label image from an image prestored in a memory, or may receive an image from an external electronic device, the server 200, or a cloud storage. For example, the label image may be received from an external electronic device through an application such as a messenger. The label image may include at least one symbol associated with handling of clothing item and may include at least one text associated with the handling of the clothing item.

In operation S220, the electronic device 100 according to an embodiment of the disclosure may obtain, from the label image, text information associated with the handling of the clothing item.

In an embodiment of the disclosure, the electronic device 100 may obtain text information associated with handling of clothing item by analyzing a plurality of texts included in the label image. The text information associated with the handling of the clothing item may refer to information about text associated with the handling of the clothing item from among the plurality of texts included in the label. For example, the text information associated with the handling of the clothing item may include at least one of a type of clothing, a fiber material, a fiber ratio, or precautions, but the disclosure is not limited thereto. The text information associated with the handling of the clothing item may be information including text for identifying at least one symbol associated with clothing item, and included in the label image. The text information associated with the handling of the clothing item may refer to a set of texts associated with the handling of the clothing item, which are included in the label, or feature vectors corresponding to the texts associated with the handling the of clothing item.

According to an embodiment of the disclosure, the electronic device 100 may obtain the information about text associated with handling of clothing item from among the plurality of texts included in the label image by using at least one AI model.

For example, the electronic device 100 may extract the texts by applying the label image to an optical character recognition (OCR) model that extracts features corresponding to the plurality of texts from the label image. The electronic device 100 may extract weight information by applying the texts to an AI model trained to extract weight information about weights representing a correlation between the texts. The electronic device 100 may extract at least one text associated with the handling of the clothing item by applying the plurality of texts and weight information to an AI model trained to extract at least one text associated with the handling of the clothing item. Hereinafter, the AI model trained to extract the weight information indicating the correlation between the texts may be referred to as a first AI model and the AI model trained to extract the at least one text associated with the handling of the clothing item may be referred to as a second AI model. Meanwhile, the disclosure is not limited thereto, and as such, according to an embodiment, the first AI model or the second AI model may be trained to extract both the weight information and the at least one text associated with the handling of the clothing item.

An operation by which the electronic device 100 obtains, from the label image, the text information associated with the handling of the clothing item by using at least one AI model will be described in more detail below with reference to FIG. 3.

In operation S230, the electronic device 100 according to an embodiment of the disclosure may identify, from the label image, at least one symbol associated with the handling of the clothing item, based on the text information associated with the handling of the clothing item and the label image.

The electronic device 100 may easily identify at least one symbol associated with handling of clothing item by performing symbol recognition on the label image by taking into account the text information included in the label.

In an embodiment of the disclosure, the electronic device 100 may extract at least one image feature associated with the at least one symbol by inputting the label image to an image feature extraction network. Also, the electronic device 100 may identify the at least one symbol by applying the text information associated with the handling of the clothing item, including the at least one text associated with the handling of the clothing item, and the at least one image feature associated with the at least one symbol to an AI model. Hereinafter, the AI model trained to infer the symbol associated with handling of clothing may be referred to as a third AI model.

In an embodiment of the disclosure, the label image may include words "cotton" and "100%" in a sequential manner. That is, the words cotton" and "100%" are provided adjacent to each other. In an example, the electronic device 100 may recognize a symbol, which includes a washing machine figure and text inside the washing machine figure. Here, the electronic device 100 may identify the washing machine figure, but may not clearly identify the text inside the washing machine figure. In this case, the electronic device 100 may infer the symbol based on "cotton," which is the text information associated with the handling of the clothing item, and the image feature. Specifically, the electronic device 100 may identify the symbol meaning lightly washing clothing with a washing machine at a temperature of up to 40° C. by taking into account the main washing manner for clothing item made of cotton.

In an embodiment of the disclosure, the at least one symbol associated with handling of clothing item may be different for each country. The electronic device 100 may recognize a washing symbol of the United States or Europe by identifying that the language of the text included in the label is English. The electronic device 100 may identify a symbol associated with clothing by recognizing the washing symbol of the United States or Europe. For example, the text included in the label may be in English and include the words "WARM" and "IRON" in a sequential manner. That is, the words "WARM" and "IRON" are provided adjacent to each other. In an example in which the electronic device 100 recognizes the iron figure but fails to clearly identify an indication (or text) included with the iron figure, the electronic device 100 may identify a symbol associated with clothing item based on the text included in the label. Specifically, the electronic device 100 may identify at least one symbol associated with the handling of the clothing item by applying at least one image feature and text information associated with the handling of the clothing item, including "WARM" and "IRON," to the third AI model. The identified symbol associated with the handling of the clothing item may be a symbol indicated by two dots inside the iron figure and including ironing information indicating that ironing is possible at up to 150° C.

In operation S240, the electronic device 100 according to an embodiment of the disclosure may obtain handling information related to the clothing item, based on the identified at least one symbol. In the disclosure, the handling information may be information including a meaning indicated by the identified at least one symbol associated with handling of clothing item. In an embodiment of the disclosure, the handling information may represent information associated with the handling of the clothing item, and may be referred to as clothing handling information. Also, the handling information may be information including at least one of washing information, drying information, spin-drying information, ironing information, dry cleaning information, or information about solvents usable in the clothing management device, but the disclosure is not limited thereto. The washing information may include information about at least one of whether to use the washing machine, maximum temperature of water used for washing, whether to wash by hand, type of detergent, spin-drying method, whether to use bleach, or type of usable bleach. The drying information may include information about at least one of whether to perform machine drying, maximum temperature of air for use of a machine dryer, drying method, whether to dry in the shade, or whether to dry on a hanger. The dry cleaning information may include information about whether dry cleaning is allowed or information about type of solvent usable for dry cleaning. The information about solvents usable in the clothing management device may include information about the type of solvent used for washing, the type of solvent used for bleaching, or the type of solvent used for dry cleaning. Meanwhile, the handling information related to the clothing item may include the handling information of the clothing item.

In an embodiment of the disclosure, the electronic device 100 may obtain handling information by taking into account the meaning represented by the identified at least one symbol. For example, in an example in which the electronic device 100 identifies a symbol including the words "about 40° C." inside the washing machine symbol, the electronic device 100 may obtain handling information indicating that the clothing item should be washed lightly at up to 40° C. In an example in which the electronic device 100 identifies a symbol with a dot inside a figure in which a circle is added to a square, the electronic device 100 may obtain handling information indicating that clothing should be dried at a low temperature during machine drying. In an example in which the electronic device 100 identifies a symbol including a number "2" inside the ironing figure, the electronic device 100 may obtain handling information indicating that ironing is possible at up to 150° C.

Figure 3:
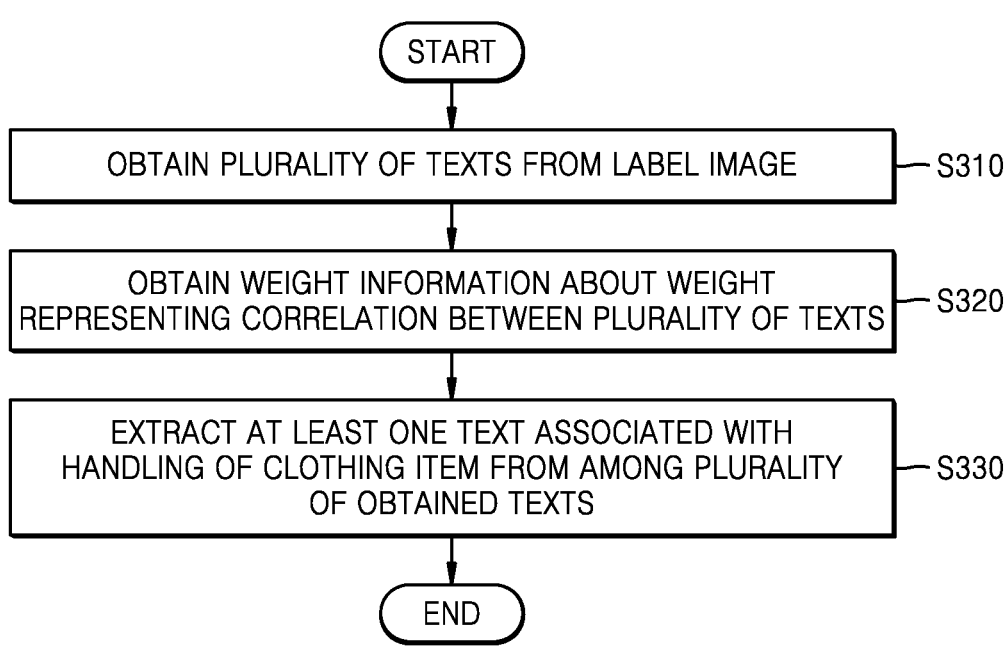
FIG. 3 is a flowchart of an operation of obtaining, from a label image, text information associated with handling of clothing item, according to an embodiment of the disclosure.

FIG. 3 is a flowchart of an operation of obtaining, from a label image, text information associated with handling of clothing item, according to an embodiment of the disclosure.

In operation S310, the electronic device 100 according to an embodiment of the disclosure may obtain a plurality of texts from a label image of the clothing item. For example, the electronic device 100 may obtain the plurality of texts from the label image based on an OCR model. For example, the electronic device 100 may obtain the plurality of texts from the label image by applying the label image to an OCR model. For example, the electronic device 100 may obtain a plurality of texts included in the label image by applying the label image to the OCR model that extracts features from texts within the image. The plurality of obtained texts from the label image may be a plurality of feature vectors corresponding to each of the plurality of texts. In an example, the OCR model may be pre-trained to extract features from characters within the image. In an example, the OCR model may be a model that is additionally trained during the process of training at least one AI model to identify at least one symbol associated with handling of clothing item. In yet an example, the OCR model may be a fixed model that is not additionally trained.

In an example, the plurality of texts included in the label image may include a fiber material, a fiber ratio, a manufacturer, a source of import, a source of sales, year and month of manufacture, age of use, a country of manufacture, a manufacturer's address, precautions, warnings, etc., but the disclosure is not limited thereto, and the plurality of texts included in the label image may refer to all texts included in the label.

In an embodiment of the disclosure, the electronic device 100 may extract at least one text associated with handling of clothing item from among the plurality of texts by applying the plurality of obtained texts from the label image to at least one AI model trained to infer texts associated with handling of clothing item.

In operation S320, the electronic device 100 according to an embodiment of the disclosure may obtain weight information about a weight representing a correlation between the plurality of texts. For example, the electronic device 100 may obtain weight information about a weight representing a correlation between the plurality of texts by applying the plurality of obtained texts to the first AI model. The first AI model may be an AI model trained to receive the plurality of texts and infer a weight representing a correlation between the plurality of texts. The electronic device 100 may obtain weight information indicating a correlation between the plurality of texts by applying the plurality of obtained texts to the first AI model. The weight information may be a feature vector corresponding to weight information about a weight representing a correlation between the plurality of texts. The electronic device 100 may assign higher weights to texts with a high correlation, regardless of whether the texts are associated with handling of clothing item. The electronic device 100 may assign lower weights to texts with a low correlation. For example, the electronic device 100 may assign a first weight to first texts with a first correlation, and a second weight to second texts with a second correlation. Here, the first weight is higher than the second weight and the first correlation is higher than the second correlation. The weight may be assigned by taking into account the position of the text or the meaning of the text in the image.

In operation S330, the electronic device 100 according to an embodiment of the disclosure may extract at least one text associated with handling of clothing item from among the plurality of obtained texts. For example, the electronic device 100 may extract the at least one text associated with handling of clothing item from among the plurality of obtained texts by applying the plurality of obtained texts and weight information to the second AI model. The at least one text associated with handling of clothing item may be a feature vector corresponding to the at least one text associated with handling of clothing item. The second AI model is an AI model trained to receive the plurality of texts and weight information about a weight representing a correlation between the plurality of texts and infer at least one text associated with handling of clothing item from among the obtained texts. The electronic device 100 may extract the at least one text by taking into account the plurality of obtained texts and weight information. For example, the electronic device 100 may extract, as the at least one text associated with handling of clothing item, the at least one text having a weight greater than or equal to a threshold value with respect to first text associated with handling of clothing item. In an example in which there is no text having a weight greater than or equal to a threshold value, the electronic device 100 may extract only the first text as the at least one text associated with handling of clothing item.

Figure 4:
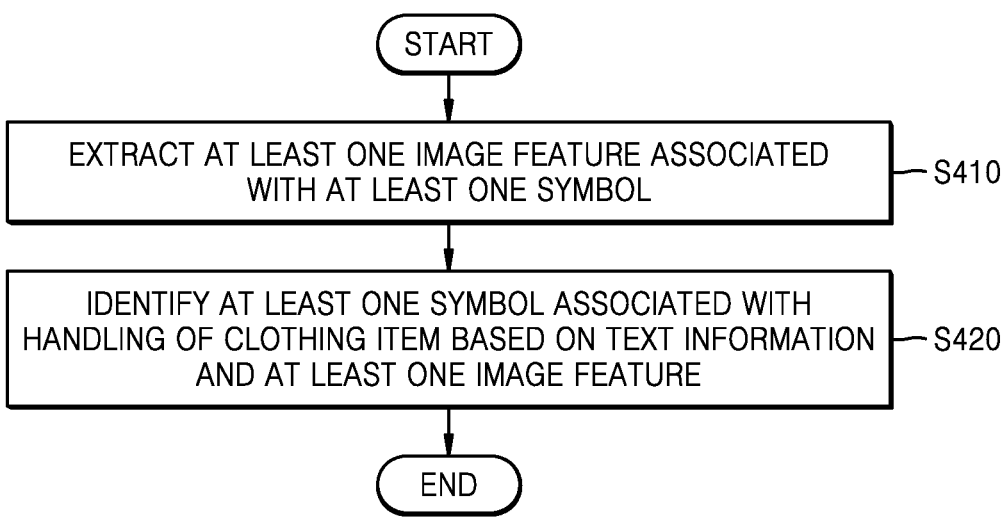
FIG. 4 is a flowchart of an operation of identifying, from a label image, at least one symbol associated with handling of clothing item, according to an embodiment of the disclosure.

FIG. 4 is a flowchart of an operation of identifying, from a label image, at least one symbol associated with handling of clothing item, according to an embodiment of the disclosure.

In operation S410, the electronic device 100 according to an embodiment of the disclosure may extract at least one image feature associated with the at least one symbol from a label image. For example, the electronic device 100 may extract the at least one image feature associated with the at least one symbol by inputting the label image to an image feature extraction network. For example, the image feature extraction network may receive a label image and extract at least one image feature corresponding to at least one symbol included in the label. The image feature extraction network may be a network that is pre-trained to receive the label image and extract the image feature corresponding to at least one symbol included in the label, and is additionally trained in the process of training at least one AI model in order to extract at least one image feature associated with at least one symbol.

In operation S420, the electronic device 100 according to an embodiment of the disclosure may identify at least one symbol associated with handling of clothing item based on text information and at least one image feature. For example, the electronic device 100 may identify the at least one symbol associated with the handling of clothing item by applying, to a third AI model, text information associated with handling of clothing item, including at least one text associated with handling of clothing item, and at least one image feature associated with at least one symbol. The third AI model may be an AI model trained to receive text information associated with handling of clothing item and at least one image feature and infer a symbol associated with handling of clothing item.

In an embodiment of the disclosure, the text information associated with handling of clothing item may include text for a fiber material and a fiber ratio, i.e., "100% cotton." In an example in which the electronic device 100 recognizes that a certain symbol includes text inside a washing machine figure, but fails to clearly identify the text inside the washing machine figure, the electronic device 100 may identify a symbol meaning washing lightly with a washing machine at a maximum temperature of 40° C., based on the extracted image feature and the obtained text information, i.e., "100% cotton." Meanwhile, this is only an example, and various results may be obtained by a variety of text information associated with handling of clothing item and image features.

Figure 5:
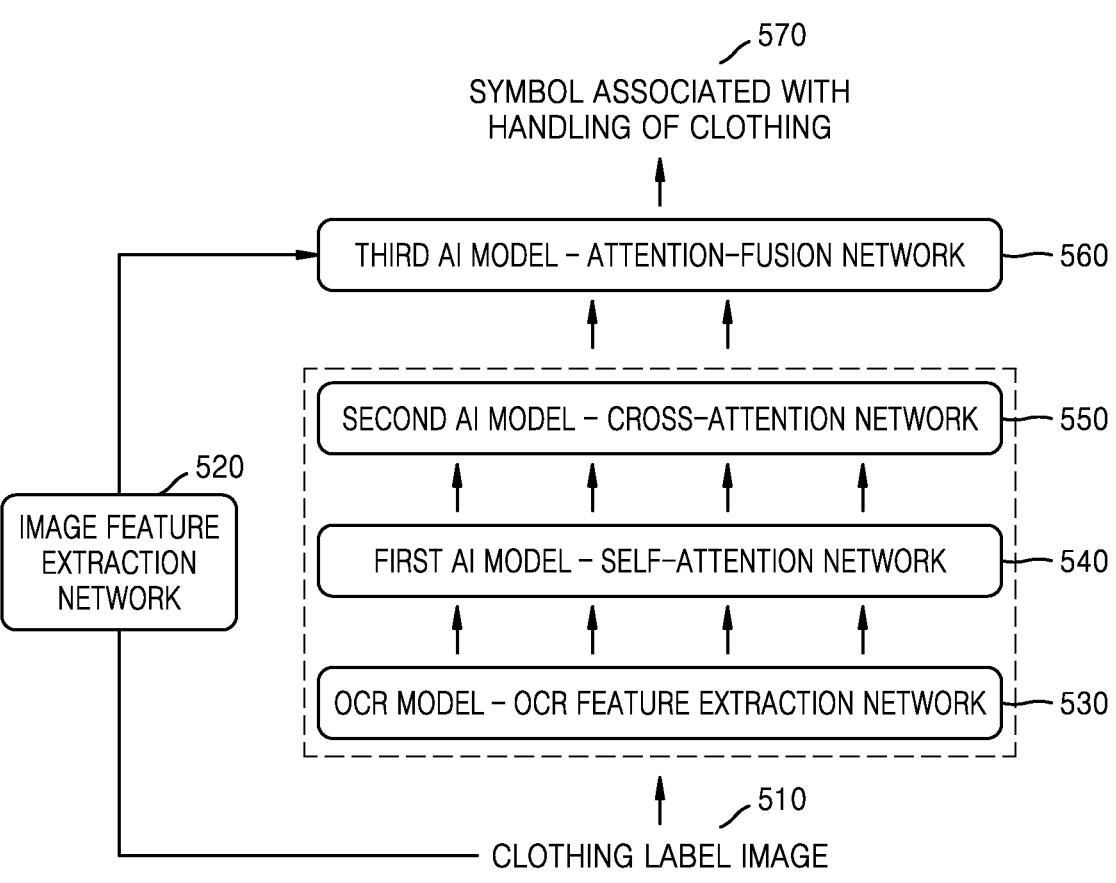
FIG. 5 illustrates a clothing symbol identification module that receives a label image and recognizes a clothing symbol, according to an embodiment of the disclosure.

FIG. 5 illustrates a clothing symbol identification module that receives a label image and recognizes a clothing symbol, according to an embodiment of the disclosure.

In an embodiment of the disclosure, the electronic device 100 may identify a symbol 570 associated with handling of clothing item by inputting a label image 510 to the clothing symbol identification module. According to an embodiment, the clothing symbol identification module may be implemented in the electronic device 100. Meanwhile, the disclosure is not limited thereto, and as such, according to an embodiment, the clothing symbol identification module may be implemented in an externa device. The clothing symbol identification module may include an image feature extraction network 520, an OCR model 530, a first AI model 540, a second AI model 550, and a third AI model 560, but the disclosure is not limited thereto. For example, one or more of the components illustrated in FIG. 5 may be omitted and/or combined, and other components may be included in the clothing symbol identification module.

In an embodiment of the disclosure, the image feature extraction network 520 may be a network that receives the label image 510 and extracts at least one image feature corresponding to at least one symbol included in the label image 510. The electronic device 100 may obtain at least one image feature in a form of a feature vector. Also, the electronic device 100 may input, to the third AI model 560, at least one image feature and text information associated with the clothing symbol in order to perform accurate image recognition later.

In an embodiment of the disclosure, the OCR model 530 may receive the label image 510 and extract a plurality of texts included in the clothing label. The plurality of texts may be a plurality of feature vectors corresponding to the plurality of texts. Also, the electronic device 100 may apply the plurality of texts to the first AI model 540. The OCR model 530 is a pre-trained model, and may be fixed without being trained when the clothing symbol identification module is trained, or may be additionally trained in the process of training the clothing symbol identification module. In the disclosure, the OCR model 530 may be referred to as an OCR feature extraction network.

In an embodiment of the disclosure, the first AI model 540 may receive a plurality of texts, assign weights to texts having a correlation with each other among the plurality of texts, and extract weight information. The first AI model 540 may be an AI model trained to receive the plurality of texts and infer a weight representing a correlation between the plurality of texts. The electronic device 100 may assign high weights to texts having a correlation to each other among the plurality of texts, regardless of whether the texts are associated with handling of clothing item. For example, the electronic device 100 may extract a high weight in relation to text "Korea" with respect to text "country of manufacture," and may extract a low weight in relation to text "polyester." Also, the electronic device 100 may extract a high weight for the text 'country of manufacture' in relation to the same text "country of manufacture." Meanwhile, the electronic device 100 may extract weight information excluding the same text as the user. In the disclosure, the first AI model 540 may be referred to as a self-attention network. The self-attention network may refer to a network including a mechanism for outputting a correlation between inputs as a weight with respect to at least one input.

In an embodiment of the disclosure, the second AI model 550 may receive a plurality of texts and weight information and extract at least one text associated with handling of clothing item from among the plurality of texts. The second AI model 550 may be an AI model trained to receive a plurality of texts and weight information and infer text associated with handling of clothing item. That is, the second AI model 550 may extract only text associated with handling of clothing item by using the outputs of the OCR model 530 and the first AI model 540. For example, the electronic device 100 may extract words "country of manufacture," "Korea," "polyester," and "20%" by applying a plurality of texts and weight information to the OCR model 530. In this case, "country of manufacture" and "Korea" are mutually weighted words, but are not texts associated with handling of clothing item. Meanwhile, "Polyester" and "20%" are texts with high weights and are texts associated with handling of clothing item. Accordingly, the second AI model 550 may extract texts "polyester" and "20%" as text information associated with handling of clothing item. In the disclosure, the second AI model 550 may be referred to as a cross-attention network.

In an embodiment of the disclosure, the third AI model 560 may receive text information associated with handling of clothing item and at least one image feature associated with at least one symbol and extract a symbol associated with handling of clothing item. The third AI model may be an AI model trained to receive text information associated with handling of clothing item and at least one image feature and infer a symbol associated with handling of clothing item. In an example in which the electronic device 100 outputs texts "polyester" and "20%" as text information associated with handling of clothing item by using the second AI model 550, the third AI model 560 may identify at least one symbol 570 associated with handling of clothing item by using information about clothing containing 20% polyester and image features obtained from the image feature extraction network 520. In the disclosure, the third AI model 560 may be referred to as an attention-fusion network.

Figure 6:
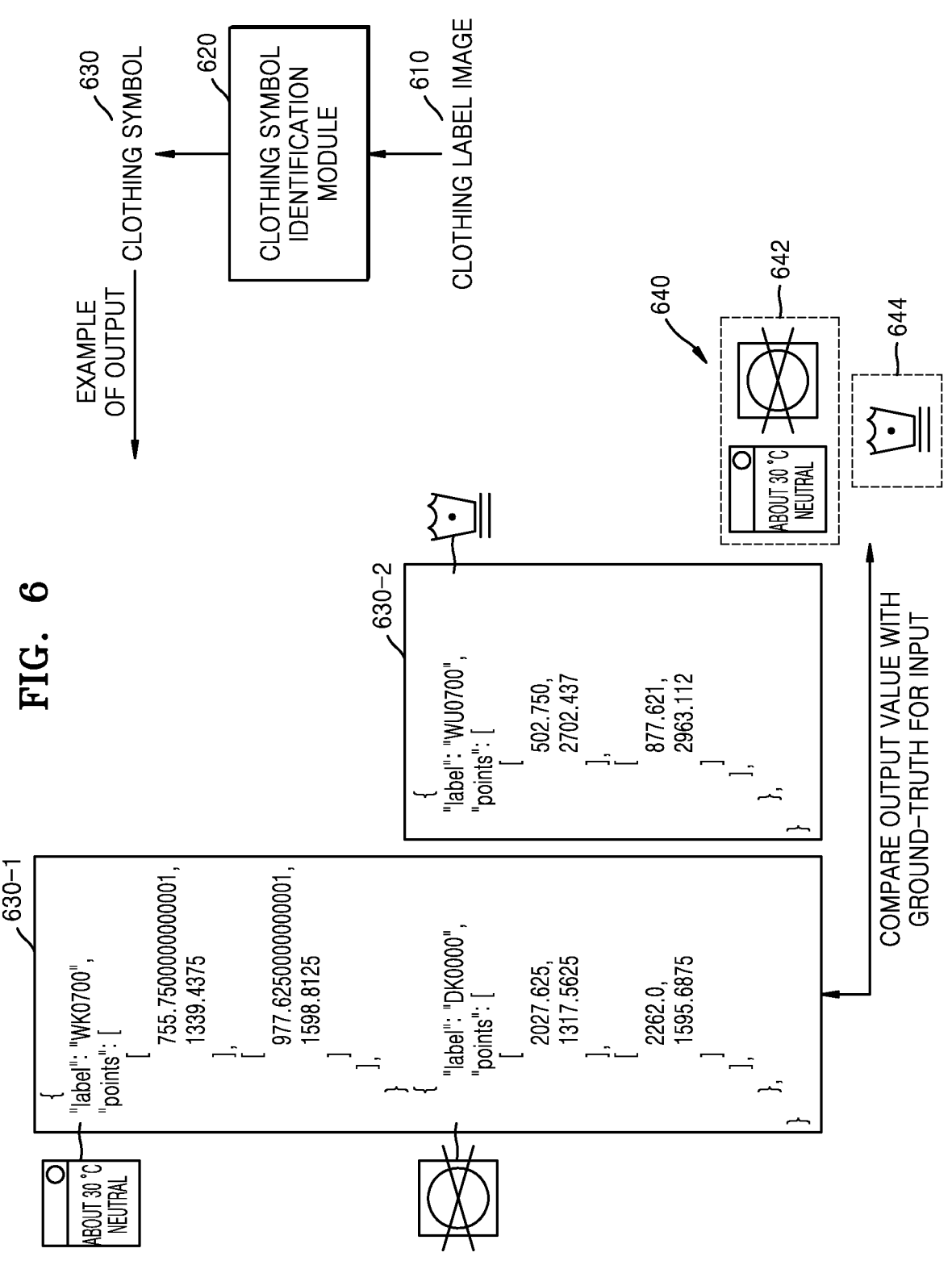
FIG. 6 illustrates an operation of training an artificial intelligence (AI) model in order to infer, from a label image, at least one symbol associated with handling of clothing item, according to an embodiment of the disclosure.

FIG. 6 illustrates an operation of training an AI model in order to infer, from a label image, at least one symbol associated with handling of clothing item, according to an embodiment of the disclosure.

According to an embodiment of the disclosure, a clothing symbol identification module 620 may be trained to identify, from a label image, at least one symbol associated with handling of clothing item. The clothing symbol identification module 620 may be trained in the electronic device 100 or may be trained in an external computing device (e.g., a server).

The clothing symbol identification module 620 may include at least one AI model. The clothing symbol identification module 620 may include at least one of an image feature extraction network that extracts features from the label image, an OCR model that extracts features corresponding to a plurality of texts from the label image, a first AI model that extracts weight information indicating a correlation between plurality of texts from a plurality of texts, a second AI model that extracts at least one text associated with handling of clothing item by using plurality of obtained texts and weight information, or a third AI model that identifies at least one symbol associated with handling of clothing item from at least one text associated with handling of clothing item and the image features. Meanwhile, for convenience of description, the network or the AI model is described separately according to the operation performed in the clothing symbol identification module 620, but the network or the AI model included in the clothing symbol identification module 620 may not operate separately.

In an embodiment of the disclosure, the network included in the clothing symbol identification module 620 may be a network individually trained according to the operation performed therein, or may be a network trained as the whole clothing symbol identification module 620.

The electronic device 100 may train the clothing symbol identification module 620 by using various label images as training data. The electronic device 100 may train the clothing symbol identification module 620 through supervised learning that inputs label images and ground-truth (label) (e.g., at least one symbol) corresponding to the label images to the clothing symbol identification module 620. In this case, the clothing symbol identification module 620 may be trained by updating connection weights of connection lines so that the ground-truth (e.g., at least one symbol) corresponding to the label images is output.

In an example in which the electronic device 100 inputs a training label image 610 and ground-truth 640 to the clothing symbol identification module 620, the clothing symbol identification module 620 may be trained by adjusting nodes or weights so that at least one symbol associated with handling of clothing item, which is an output value 630, approaches the ground-truth 640. Specifically, the clothing symbol identification module 620 may receive the training label image 610 and output, as the output value 630, a location of a symbol included in the training label image 610 and an identification (ID) value corresponding to a symbol associated with handling of clothing item. The clothing symbol identification module 620 may be trained by comparing the ground-truth 640 corresponding to the training label image 610 with the output value 630.

In an embodiment of the disclosure, the electronic device 100 may input the training label image 610 to the clothing symbol identification module 620 and obtain the output value 630 represented by at least one symbol associated with handling of clothing item. The output value 630 obtained by the electronic device 100 may be displayed by using a label ID corresponding to a preset symbol and location data of a symbol identified from the training label image 610. For example, a symbol meaning "washing lightly with neutral detergent at about 30° C." in Korea may be preset as "WK0700," a symbol meaning that the dryer is unusable may be preset as "DK0000," and a symbol meaning "washing lightly at 30° C." in the United States may be preset as "WU0700." The location data in the label image may be expressed by using coordinates of a left upper end and a right lower end, and may be expressed by using coordinates of a right upper end and a left upper end. Meanwhile, this is only an example, and the method of displaying the label ID and the location is not limited to the disclosed example.

In an embodiment of the disclosure, the clothing symbol identification module 620 may be trained by comparing the ground-truth 640 of the symbol obtained from the training label image 610 with the output value 630 output as the label ID and the location data. Specifically, the clothing symbol identification module 620 may be trained to approach a first ground-truth 642 by comparing the first ground-truth 642 with a first output value 630-1 output together with the symbols "WK0700" and "DK0000." The clothing symbol identification module 620 may be trained to approach a second ground-truth 644 by comparing the second ground-truth 644 with a second output value 630-2 output together with the symbol "WU0700."

In FIG. 6, a case where the clothing symbol identification module 620 trains itself while comparing the ground-truth with the output value is described as an example, but the disclosure is not limited thereto. For example, the clothing symbol identification module 620 may be trained on an external device (e.g., a server or an administrator's computer).

Hereinafter, the first AI model included in the clothing symbol identification module 620 will be described in more detail with reference to FIGS. 7A and 7B.

Figure 7A:
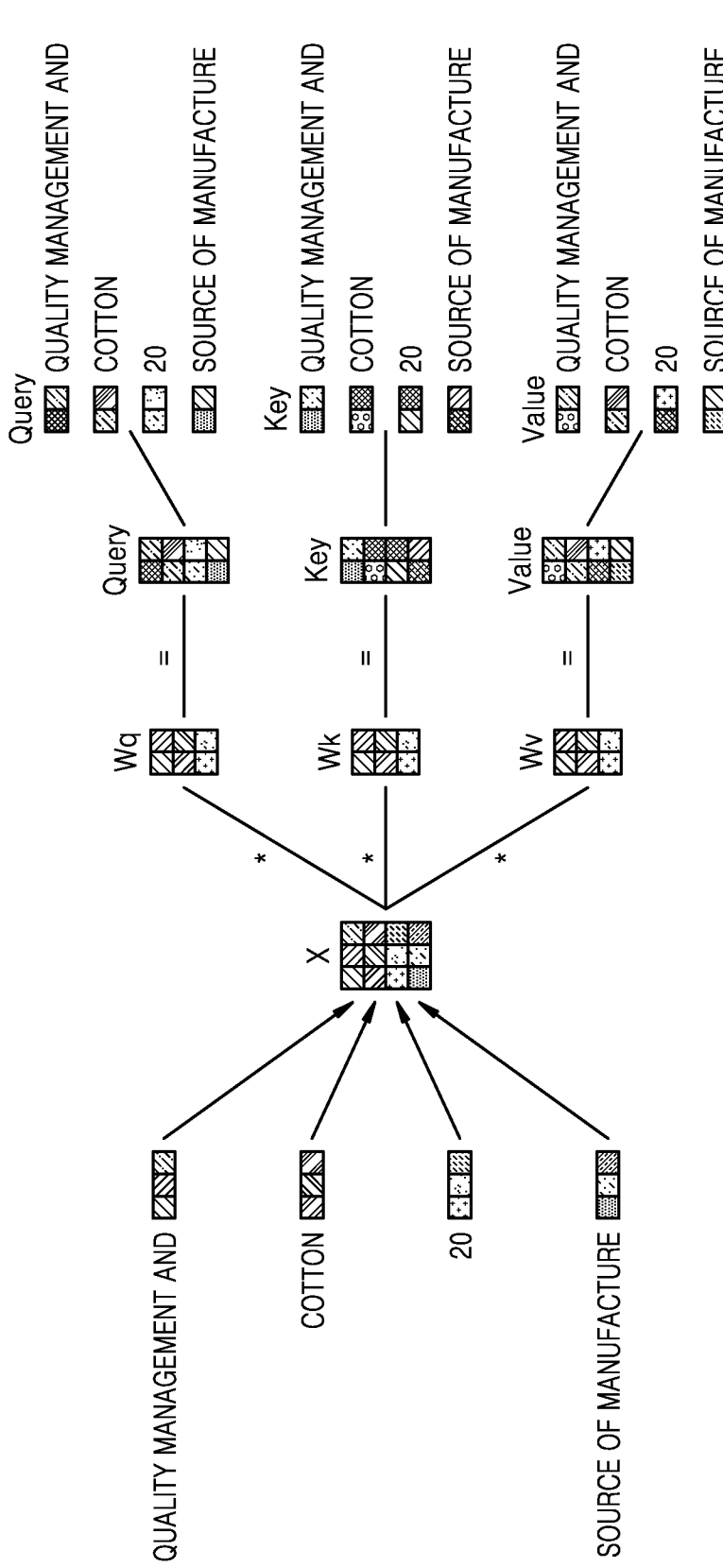
FIGS. 7A and 7B illustrate a method of inferring weight information in a first AI model, according to an embodiment of the disclosure.
Figure 7B:
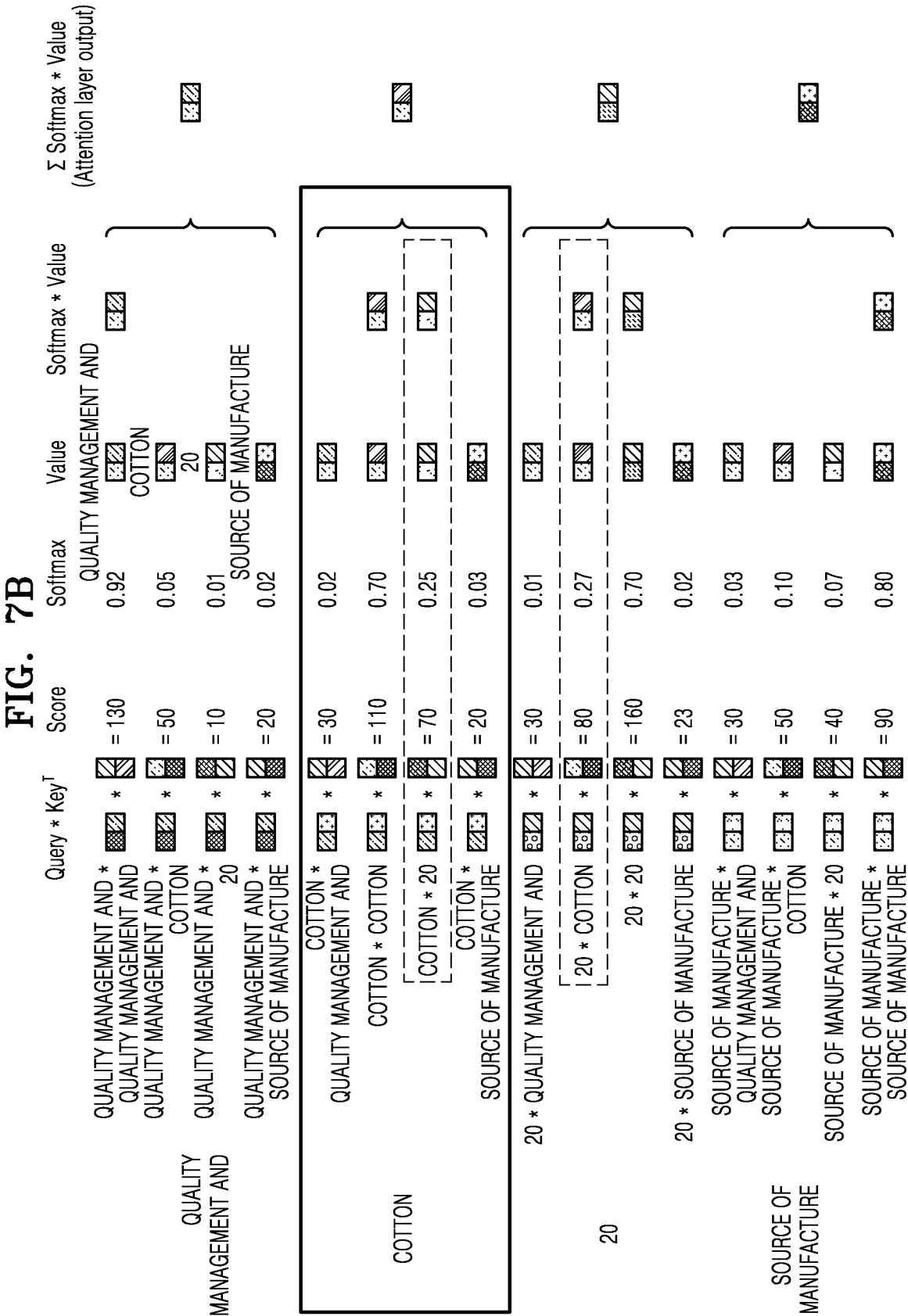

FIGS. 7A and 7B illustrate a method of inferring weight information in a first AI model, according to an embodiment of the disclosure.

FIG. 7A illustrates an operation of obtaining a query vector, a key vector, and a value vector for each text from feature vectors corresponding to a plurality of texts.

FIG. 7B illustrates an operation of obtaining weight information from a query vector, a key vector, and a value vector for each text.

In an embodiment of the disclosure, the first AI model may be referred to as a self-attention network. The electronic device 100 may use the self-attention network in order to obtain weight information between texts. The electronic device 100 may input, to the first AI model, feature vectors corresponding to a plurality of texts obtained from an OCR model. In the first AI model, the electronic device 100 may obtain a query vector, a key vector, and a value vector for each text in relation to a plurality of text feature vectors. For example, the electronic device 100 may obtain a query vector by multiplying an embedding vector for a plurality of texts by a query weight matrix, may obtain a key vector by multiplying an embedding vector for a plurality of texts by a key weight matrix, and may obtain a value vector by multiplying an embedding vector for a plurality of texts by a value weight matrix.

In an embodiment of the disclosure, the electronic device 100 may obtain a first text embedding vector corresponding to "quality management and," a second text embedding vector corresponding to "cotton," a third text embedding vector corresponding to "20," and a fourth text embedding vector corresponding to "manufacturer." The text embedding vector may include the first to fourth text embedding vectors. The electronic device 100 may obtain a query vector by multiplying a text embedding vector by a query weight matrix, may obtain a key vector by multiplying a text embedding vector by a key weight matrix, and may obtain a value vector by multiplying a text embedding vector by a value weight matrix.

In an embodiment of the disclosure, the electronic device 100 may obtain first to fourth query vectors corresponding to the first to fourth text embedding vectors. Also, the electronic device 100 may obtain first to fourth key vectors corresponding to the first to fourth text embedding vectors and first to fourth value vectors corresponding to the first to fourth text embedding vectors.

A method of obtaining weight information for the second embedding vector, according to an embodiment of the disclosure, will be described in detail. The electronic device 100 may perform a dot product of a query vector and a key vector in order to digitize and indicate a correlation between a plurality of texts. For example, in order to extract a correlation between the second text embedding vector and the first text embedding vector or the text embedding vectors, scores may be obtained by performing the dot product of the second query vector and the first to fourth key vectors. A first score obtained by performing the dot product of the second query vector and the first key vector is 30, a second score obtained by performing the dot product of the second query vector and the second key vector is 110, a third score obtained by performing the dot product of the second query vector and the third key vector is 70, and the inner product value of the second query vector and the fourth key vector is 20. It may be confirmed that the dot product value of the second key vector and the second query vector, which indicates a weight between the same second text embedding vectors, obtains the highest value. However, it is obvious that the correlation with the same text embedding vectors is high. Excluding this, it may be confirmed that the value with the third key vector is the highest.

In an embodiment of the disclosure, the electronic device 100 may perform a softmax operation of normalizing the first to fourth scores so that the sum of the first to fourth scores becomes 1. The electronic device 100 may maintain text with a high weight and remove irrelevant text by multiplying the first to fourth value vectors by the first to fourth softmax values obtained by performing the softmax operation on the first to fourth scores. In an example in which all the softmax values are less than or equal to a threshold value, it may indicate that there is no word having a high correlation to the second text embedding vector.

In an embodiment of the disclosure, the threshold value having a correlation for softmax may be 0.2. Except for the second softmax value, the third softmax value is the highest and is greater than or equal to the threshold value. The electronic device 100 may obtain weight information indicating that the second text embedding vector and the third text embedding vector have high weights. The electronic device 100 may obtain the weight information as a feature vector indicating the sum of the product of the first softmax value and the first value vector, the product of the second softmax value and the second value vector, the product of the third softmax value and the third value vector, and the product of the fourth softmax value and the fourth value vector. Meanwhile, for convenience of description, the second text embedding vector has been described as an example, and the weight information is not limited to the disclosed example.

Figure 8:
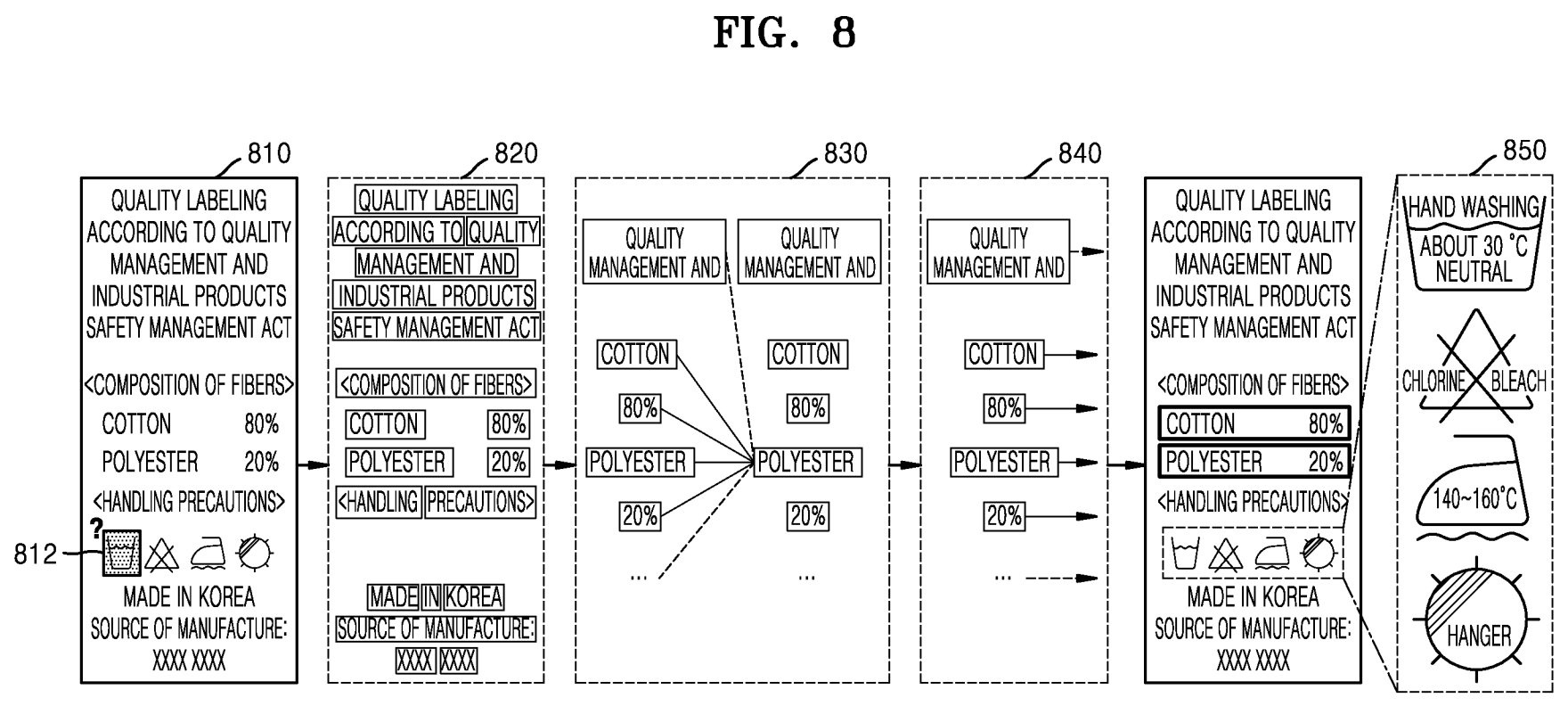

FIG. 8 illustrates an input and an output of a clothing symbol identification module that receives a label image and recognizes a clothing symbol, according to an embodiment of the disclosure.

In an embodiment of the disclosure, a label image 810 including the clothing label may include a first symbol 812 associated with handling of clothing item, which is difficult to identify with the naked eye.

In an embodiment of the disclosure, the electronic device 100 may obtain a plurality of texts 820, including texts "quality management," "cotton," "80%," "polyester," "20%," "manufacturer," "PINK," and "JANE," by applying the label image 810 to an OCR model. In an example, the plurality of texts 820 may be feature vectors corresponding to the plurality of texts 820.

In an embodiment of the disclosure, the electronic device 100 may extract weight information 830, obtained by assigning weights to texts having a correlation with each other from among the plurality of texts 820, by applying the plurality of texts 820 to a first AI model. For example, the electronic device 100 may extract a high weight in relation to "20%," which is a fiber ratio, by taking into account the feature of the fiber material and the location in the label image with respect to "polyester." The electronic device 100 may extract higher weights for the texts "cotton" and "80%" than weights for "quality management and" in relation to "polyester." The electronic device 100 may extract the weight information 830 indicating a correlation between the plurality of texts 820. In an example, the weight information 830 may be a feature vector corresponding to the weight information 830.

In an embodiment of the disclosure, the electronic device 100 may implement a second AI model by using a cross-attention network. The electronic device 100 may extract text information 840 associated with handling of clothing item by applying the plurality of texts 820 and the weight information 830 to the second AI model. For example, the fiber ratio and the fiber material such as "cotton" and "polyester" may be texts having a high correlation to handling of clothing item. The electronic device 100 may extract "cotton" and "80%," and "polyester" and "20%" as the text information 840 associated with handling of clothing item by taking into account the weight information 830. Meanwhile, the text information 840 associated with handling of clothing item may be a feature vector corresponding to the text information 840 associated with handling of clothing item.

In an embodiment of the disclosure, the electronic device 100 may implement a third AI model by using an attention-fusion network. The electronic device 100 may extract the image feature obtained by applying the label image 810 to an image feature extraction network and at least one symbol 850 associated with handling of clothing item by applying the text information 840 associated with handling of clothing item to the third AI model. Specifically, the electronic device 100 may infer and identify the first symbol 812 that was not identifiable with the naked eye, and may extract the symbol 850 associated with handling of clothing item, which is included in the label image including the first symbol 812. Meanwhile, the symbol 850 associated with handling of clothing item, which is the output of the third AI model, may be a feature vector corresponding to the symbol 850 associated with handling of clothing item. The electronic device 100 may output the symbol associated with handling of clothing item by applying, to an additional network, the feature vector corresponding to the symbol 850 associated with handling of clothing item.

Figure 9:
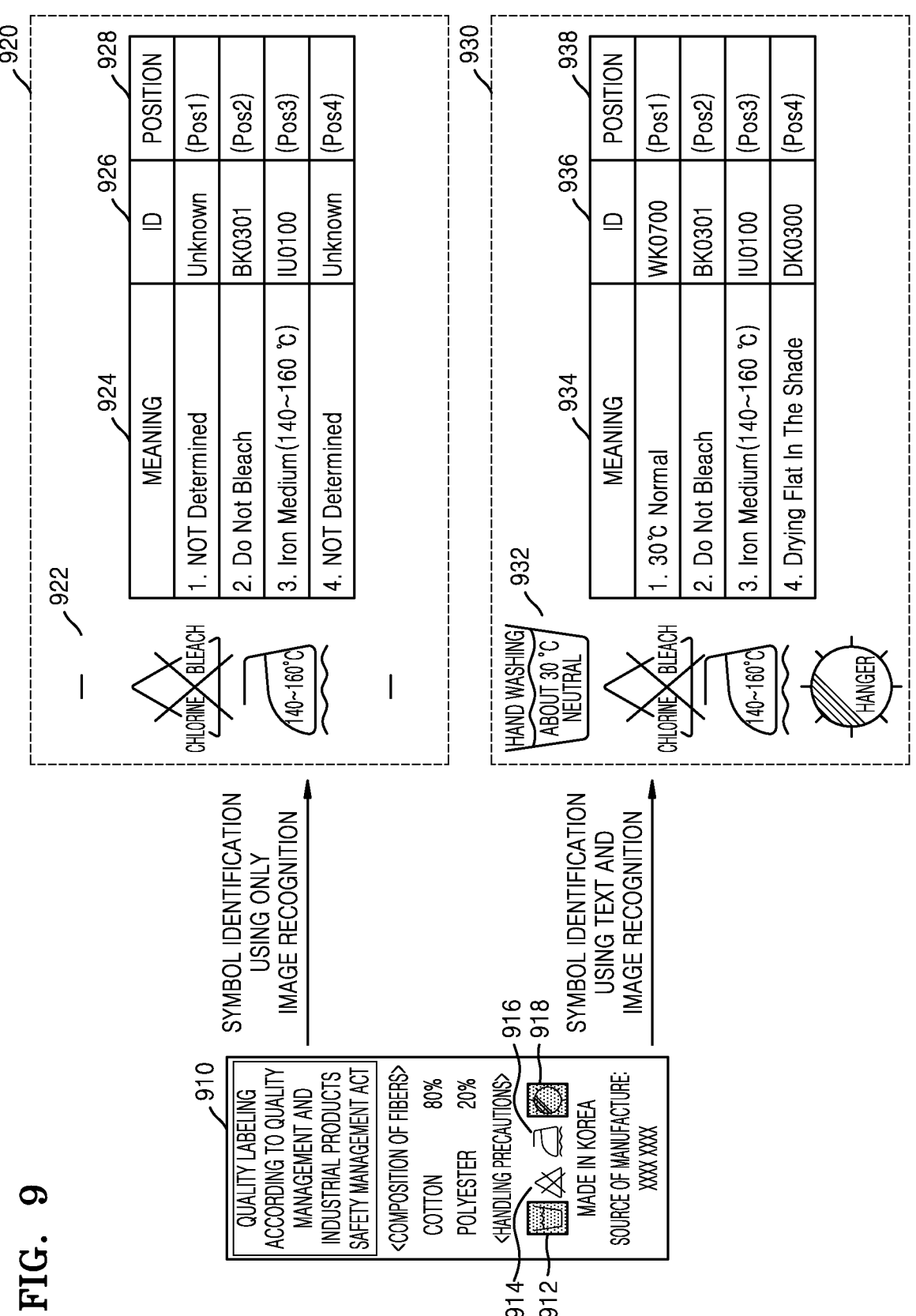
FIG. 9 illustrates a comparison between a method of identifying a symbol from a label image by using only image recognition and a method of identifying a symbol from a label image by using image recognition and text recognition, according to an embodiment of the disclosure.

FIG. 9 illustrates a comparison between a method of identifying a symbol from a label image by using only image recognition and a method of identifying a symbol from a label image by using image recognition and text recognition, according to an embodiment of the disclosure.

In an embodiment of the disclosure, the label image 910 may include a first symbol 912 and a fourth symbol 918, which are not identifiable with the naked eye, and a second symbol 914 and a third symbol 916, which are identifiable with the naked eye. Meanwhile, for convenience of description, in the disclosure, although the first to fourth symbols 912 to 918 in the label image 910 are simply described, the first symbol 912 and the fourth symbol 918 may be symbols that are not clearly identifiable with the naked eye, and the second symbol 914 and the third symbol 916 may be symbols that are clearly identifiable even with the naked eye.

In an embodiment of the disclosure, the electronic device 100 may obtain first output information 920 when at least one symbol associated with handling of clothing item (hereinafter referred to as clothing symbol) is identified by using only image recognition without taking into account the texts from the label image. The first output information 920 may include an identified clothing symbol image 922, a meaning 924 of the identified clothing symbol, an identifier (ID) 926 of the identified clothing symbol, and position information 928 about the location of the identified symbol within the label image. The first output information 920 obtained by using only image recognition may not include information about the first symbol 912 and the fourth symbol 918, which are not identifiable with the naked eye, and may include only information about the second symbol 914 and the third symbol 916.

In an embodiment of the disclosure, the electronic device 100 may obtain second output information 930 when a symbol is identified by performing text recognition from the label image as well. The second output information 930 may include an identified clothing symbol image 932, a meaning 934 of the identified clothing symbol, an identifier (ID) 936 of the identified clothing symbol, and position information 938 about the location of the identified symbol within the label image. The second output information 930 obtained by using text recognition and image recognition may include information obtained by identifying the second symbol 914 and the third symbol 916, which are identifiable with the naked eye, and the first symbol 912 and the fourth symbol 918, which were not identifiable with the naked eye. In a case where the symbol is identified by using text recognition and image recognition, the possibility of identifying the symbol may be higher than a case where the clothing symbol is identified by using only image recognition. For example, as shown in the second output information 930, the identified clothing symbol image 932 corresponding to the first symbol 912 and the fourth symbol 918 are identified along with the corresponding meaning 934.

Figure 10:
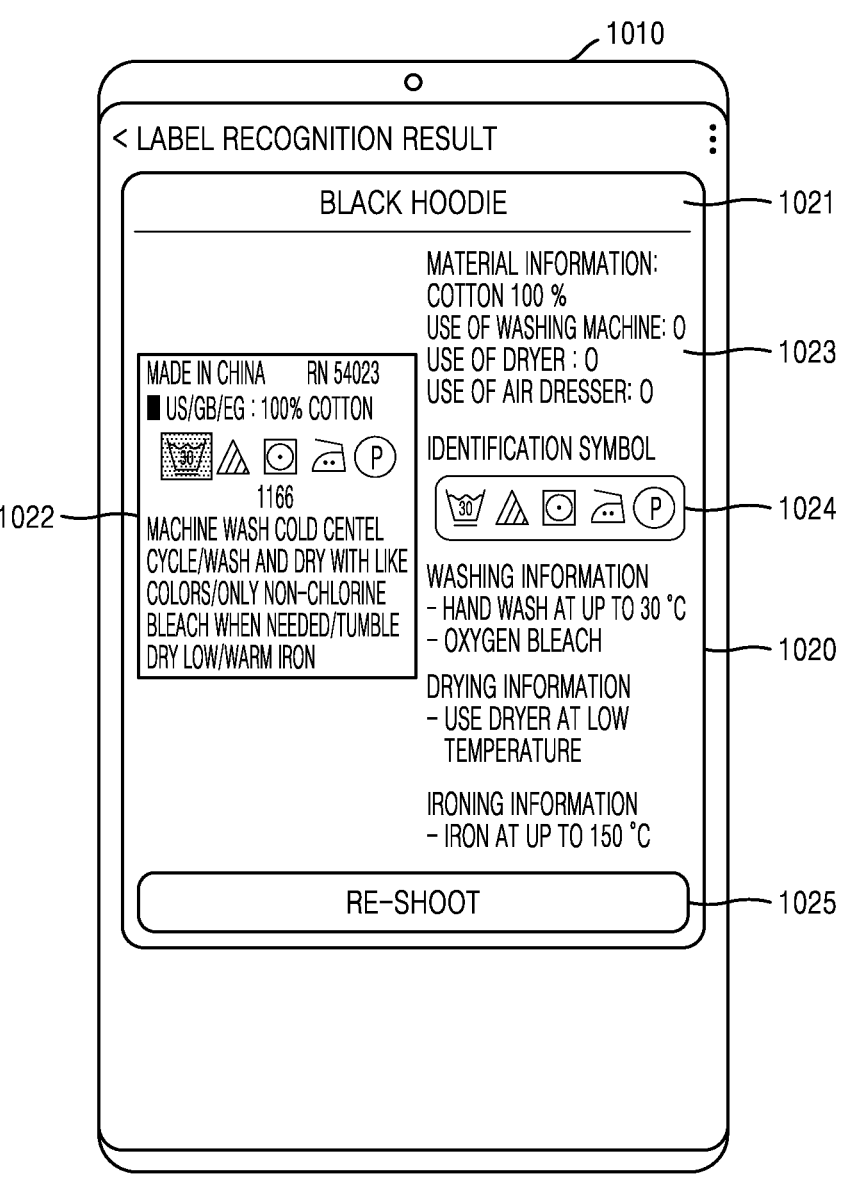
FIG. 10 illustrates an operation of providing handling information related to the clothing item, based on an identified clothing symbol, according to an embodiment of the disclosure.

FIG. 10 illustrates an operation of providing handling information of clothing to which a clothing label is attached, based on an identified clothing symbol, according to an embodiment of the disclosure.

In an embodiment of the disclosure, the electronic device 100 may identify at least one symbol 1024 associated with handling of clothing item by inputting a label image 1022, including at least one symbol associated with handling of clothing item, to a clothing symbol identification module.

In an embodiment of the disclosure, the electronic device 100 may obtain handling information 1023 of clothing, to which a clothing label is attached, by analyzing the identified at least one symbol 1024. For example, the electronic device 100 may obtain, from the identified at least one symbol 1024, washing information, drying information, spin-drying information, ironing information, dry cleaning information, or information on solvents usable in a clothing management device.

In an embodiment of the disclosure, the electronic device 100 may provide handling information of the clothing, to which the clothing label is attached, to the user through a display screen 1010 of the electronic device 100. For example, the electronic device 100 may provide handling information by displaying a label recognition result 1020. The label recognition result 1020 may include at least one of a clothing name 1021, a label image 1022, handling information 1023, at least one identified symbol 1024, or a re-shooting label 1025. In order to identify the clothing to which the clothing label is attached, the user of the electronic device 100 may assign the clothing name 1021, such as "black hoodie," to the clothing by using the color and type of the clothing. Meanwhile, the clothing name 1021 is a name assigned to the clothing to which the clothing label is attached, so that the user distinguishes other clothing from the clothing to which the clothing label is attached. The disclosure is not limited to the disclosed example. In an example in which the user does not determine the name for the clothing, the electronic device 100 may arbitrarily determine the name 1021 for the clothing. Also, in an example in which the handling information 1023 is provided, the electronic device 100 may also provide the obtained label image 1022, and may also provide at least one symbol 1024 identified from the label image 1022. The electronic device 100 may provide the handling information 1023 obtained from the identified at least one symbol 1024. The handling information 1023 may include text information associated with handling of clothing item, information about whether the clothing management device is usable, and semantic information corresponding to the at least one identified symbol. Also, in an example in which the clothing symbol is not identifiable or is incorrectly identified, the user may select the re-shooting label 1025 so that the electronic device 100 obtains the label image 1022 again.

According to an embodiment of the disclosure, the user may easily identify the handling information of the clothing, to which the clothing label is attached, by using the electronic device 100 to capture the label image. Also, the user may store the label image and the clothing handling information corresponding to the label image in the electronic device 100. In an example in which the label attached to the clothing is damaged over time, the user may identify the handling information of the clothing again by using the information stored in the electronic device 100.

Figure 11:
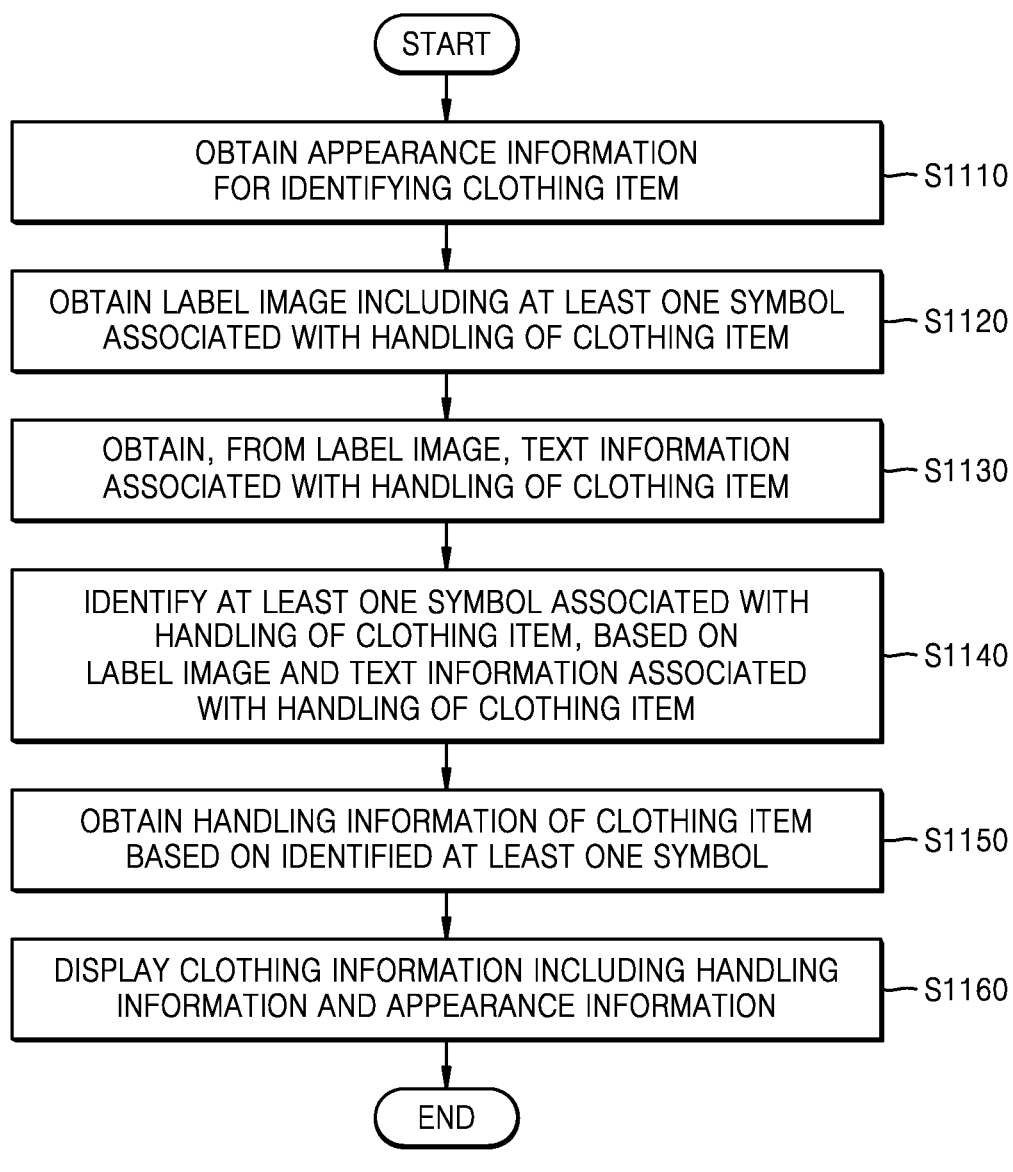
FIG. 11 is a flowchart of a method, performed by an electronic device, of processing an image, according to an embodiment of the disclosure.

FIG. 11 is a flowchart of a method, performed by the electronic device 100, of processing an image, according to an embodiment of the disclosure.

In operation S1110, the electronic device 100 according to an embodiment of the disclosure may obtain appearance information for identifying clothing. For example, the electronic device 100 may obtain the appearance information in such a manner that the user of the electronic device 100 photographs the outer appearance of the clothing item by using the camera of the electronic device 100. The appearance information may be referred to as a clothing appearance information. In an example, the electronic device 100 may obtain the appearance information in such a manner that the user of the electronic device 100 directly inputs the appearance information to the electronic device 100. For example, the user may type the appearance information or a name (e.g., black hoodie in FIG. 10) of the clothing item. In yet an example, the electronic device 100 may obtain the appearance information from data pre-stored in the memory or receive data from the external electronic device, the server 200, or the cloud storage.

In operation S1120, the electronic device 100 according to an embodiment of the disclosure may obtain a label image including at least one symbol associated with handling of clothing item. In an example, operation S1120 corresponds to operation S210 of FIG. 2, and as such, the same description thereof is omitted.

In operation S1130, the electronic device 100 according to an embodiment of the disclosure may obtain, from the label image, text information associated with handling of clothing item. In an example, operation S1130 corresponds to operation S220 of FIG. 2, and as such, the same description thereof is omitted.

In operation S1140, the electronic device 100 according to an embodiment of the disclosure may identify, from the label image, at least one symbol associated with handling of clothing item, based on the label image and the text information associated with handling of clothing item. In an example, operation S1140 corresponds to operation S230 of FIG. 2, and as such, the same description thereof is omitted.

In operation S1150, the electronic device 100 according to an embodiment of the disclosure may obtain handling information of the clothing to which the clothing label is attached, based on the identified at least one symbol. In an example, operation S1150 corresponds to operation S240 of FIG. 2, and as such, the same description thereof is omitted.

In an example in which the electronic device 100 obtains the handling information of the clothing to which the clothing label is attached, the electronic device 100 may store the appearance information and the handling information of the clothing in the memory or the server 200.

In operation S1160, the electronic device 100 according to an embodiment of the disclosure may display clothing information including the handling information and the appearance information. In an example in which the electronic device 100 provides the obtained handling information, the electronic device 100 may provide the handling information and the appearance information together. In an example, the electronic device 100 provides both at least one piece of handling information and at least one piece of appearance information corresponding to the piece of handling information, and as such, the user may easily identify a plurality of pieces of handling information.

FIG. 12 illustrates an operation by which the electronic device 100 provides appearance information and handling information, according to an embodiment of the disclosure.

In an embodiment of the disclosure, the electronic device 100 may obtain handling information corresponding to at least one piece of clothing. Also, the electronic device 100 may provide handling information corresponding to the at least one piece of clothing through the display of the electronic device 100. For example, the electronic device 100 may provide the handling information corresponding to the at least one piece of clothing by using a first screen 1210. Specifically, the electronic device 100 may provide, to the user, handling information corresponding to each clothing through a clothing banner 1214 indicating clothing information, such as, jeans, black hoodies, and wool jackets included in the first screen 1210.

In an embodiment of the disclosure, the electronic device 100 may provide specific handling information of the clothing to the user by displaying the handling information based on a reception of a user input selecting the clothing banner 1214 or reception of a user input selecting an arrow included in the clothing banner 1214. For example, the selection of the clothing banner 1214 or the selection of the arrow may provide detail information corresponding to the selected clothing banner 1214.

In an embodiment of the disclosure, the electronic device 100 may obtain clothing information including the handling information or the appearance information by using a clothing addition banner 1212 of the first screen 1210. In an example in which the electronic device 100 receives an input of selecting the clothing addition banner 1212, the electronic device 100 may execute a camera application to capture a label image 1240 including at least one symbol. In an example in which the electronic device 100 receives the input of selecting the clothing addition banner 1212, the electronic device 100 may display images prestored in the memory or the server 200 through a photograph management application (e.g., a gallery application). In this case, the electronic device 100 may receive a user input of selecting the label image 1240 from among the prestored images. Also, the electronic device 100 may selectively obtain appearance information 1230. The electronic device 100 may obtain the appearance information 1230 as an image or may receive the appearance information 1230 from the user in the form of text. For example, after the electronic device 100 obtains the label image 1240, the electronic device 100 may display guide information for guiding the user to photograph the appearance of the clothing (e.g., "The label photographing has been completed. Please capture the entire image of the clothing"). In this case, the electronic device 100 may obtain the appearance information 1230 by photographing the appearance of the clothing according to the user's operation. According to an embodiment of the disclosure, the electronic device 100 may obtain the appearance information 1230 after obtaining the label image 1240, or may obtain the label image 1240 after obtaining the appearance information 1230.

In an embodiment of the disclosure, the electronic device 100 may obtain handling information 1274 based on the obtained label image 1240. In an embodiment of the disclosure, the electronic device 100 may provide the handling information through the display of the electronic device 100. For example, the electronic device 100 may provide clothing information 1270 including handling information and appearance information respectively corresponding to at least one piece of clothing through a second screen 1260. Specifically, a case where the electronic device 100 provides specific handling information 1274 for a "white hoodie" will be described. The electronic device 100 may attach a clothing name 1271 to the clothing by using the color and type of the clothing, such as "white hoodie" in order to identify the clothing to which the clothing label is attached, and may also provide a clothing appearance image 1273. Also, at least one symbol 1276 identified from the label image 1240 may also be provided, and the handling information 1274 obtained from the at least one symbol may be provided.

In an embodiment of the disclosure, the electronic device 100 may briefly provide the clothing information 1270 on the second screen 1260 configured to provide the clothing information 1270. In an example in which the electronic device 100 receives the input of selecting the clothing banner with respect to the screen specifically showing the clothing information, the electronic device 100 may omit the displaying of the clothing information 1270 and display only the clothing banner 1272. The clothing banner 1272 may include the clothing name 1271 or the arrow within the clothing banner 1272.

According to an embodiment of the disclosure, the electronic device 100 may recommend, to the user, a washing operation or a drying operation to be performed on clothing in the clothing management device, based on a user input of selecting a recommendation operation banner 1275.

Hereinafter, in an example in which the electronic device 100 obtains a user input of requesting information about a recommendation operation corresponding to handling information, the electronic device 100 may identify whether clothing is manageable in at least one clothing management device. The operation by which the electronic device 100 identifies whether clothing is manageable in at least one clothing management device and provides information about the recommendation operation will be described in more detail with reference to FIG. 13.

Figure 13:
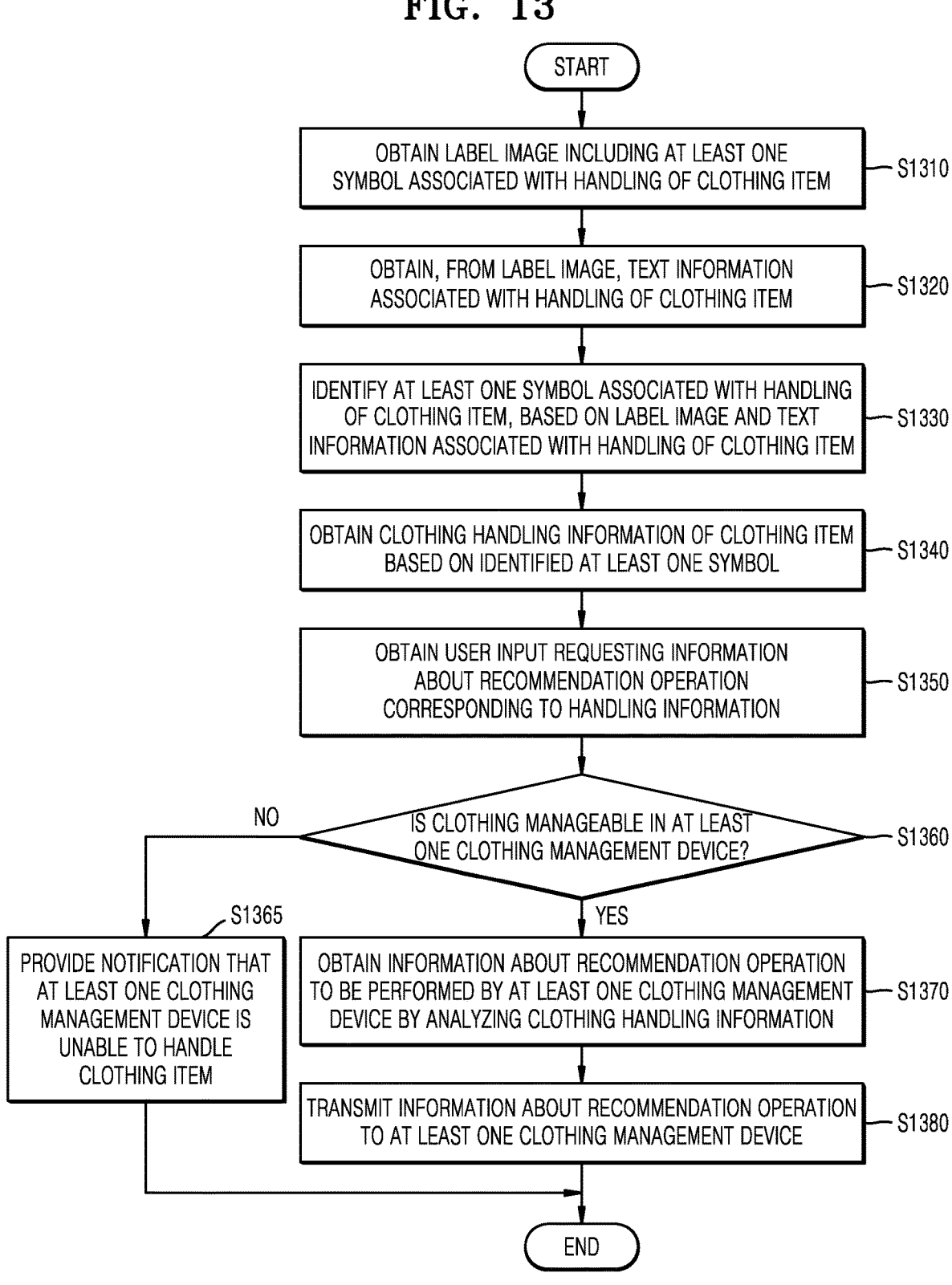
FIG. 13 illustrates an operation by which an electronic device provides information about a recommendation operation, based on handling information, according to an embodiment of the disclosure.

FIG. 13 illustrates an operation by which an electronic device provides information about a recommendation operation, based on handling information, according to an embodiment of the disclosure.

In operation S1310, the electronic device 100 according to an embodiment of the disclosure may obtain a label image including at least one symbol associated with handling of clothing item. In an example, operation S1310 corresponds to operation S210 of FIG. 2, and as such, the same description thereof is omitted.

In operation S1320, the electronic device 100 according to an embodiment of the disclosure may obtain, from the label image, text information associated with handling of clothing item. In an example, operation S1320 corresponds to operation S220 of FIG. 2, and as such, the same description thereof is omitted.

In operation S1330, the electronic device 100 according to an embodiment of the disclosure may identify, from the label image, at least one symbol associated with handling of clothing item, based on the label image and the text information associated with handling of clothing item. In an example, operation S1330 corresponds to operation S230 of FIG. 2, and as such, the same description thereof is omitted.

In operation S1340, the electronic device 100 according to an embodiment of the disclosure may obtain handling information of the clothing to which the clothing label is attached, based on the identified at least one symbol. In an example, operation S1340 corresponds to operation S240 of FIG. 2, and as such, the same description thereof is omitted.

In operation S1350, the electronic device 100 according to an embodiment of the disclosure may obtain a user input requesting information about a recommendation operation corresponding to the handling information. For example, the electronic device 100 may obtain a user input of requesting information about the recommendation operation corresponding to the handling information (hereinafter, information about the recommendation operation) through a touch input or a voice input. Meanwhile, the method of obtaining the user input is not limited to the disclosed example, and as such, the user input may be obtained in various ways according to other embodiments.

In operation S1360, the electronic device 100 according to an embodiment of the disclosure may identify whether the clothing item is manageable in at least one clothing management device, based on the handling information. Also, the electronic device 100 may provide information about whether the clothing is manageable in the at least one clothing management device, based on the user input.

In an embodiment of the disclosure, the electronic device 100 may perform operation S1365 based on an identification that the clothing is not manageable in the at least one clothing management device. Also, the electronic device 100 may perform operation S1370 based on an identification that the clothing is manageable in the at least one clothing management device.

In operation S1365, the electronic device 100 according to an embodiment of the disclosure may provide a notification that the at least one clothing management device is unable to handle the clothing item. For example, the handling information may include drying information indicating that the use of the dryer is impossible. In an example in which the electronic device 100 obtains the user input of requesting information about the recommendation operation for the dryer, the electronic device 100 may provide a notification that the dryer is unable to handle the clothing. The electronic device 100 may provide the notification that the handling of the clothing is impossible with sound through a sound outputter, or may provide the notification on the display screen of the display.

In operation S1370, the electronic device 100 according to an embodiment of the disclosure may obtain information about the recommendation operation to be performed by the at least one clothing management device by analyzing the handling information. The electronic device 100 may obtain information about the recommendation operation in the at least one clothing management device by using washing information, drying information, and dry cleaning information, which are included in the handling information obtained in operation S1340. In an example in which the clothing management information includes drying information indicating that the clothing should be dried lightly at a low temperature in the dryer, the electronic device 100 may obtain an operation of "drying the clothing lightly at a low temperature for 20 minutes" as information about the recommendation operation for drying the clothing in the dryer. Meanwhile, this is only an example, and the information about the recommendation operation is not limited thereto.

In operation S1380, the electronic device 100 according to an embodiment of the disclosure may transmit the information about the recommendation operation to the at least one clothing management device. The electronic device 100 may transmit the obtained information about the recommendation operation to the at least one clothing management device. Also, the at least one clothing management device may receive the information about the recommendation operation and set the course of the at least one clothing management device in order to perform the recommendation operation. For example, the dryer may receive information about a recommendation operation for drying second clothing in the dryer and set the course for drying the second clothing "lightly" "at a low temperature" "for 20 minutes."

Figure 14:
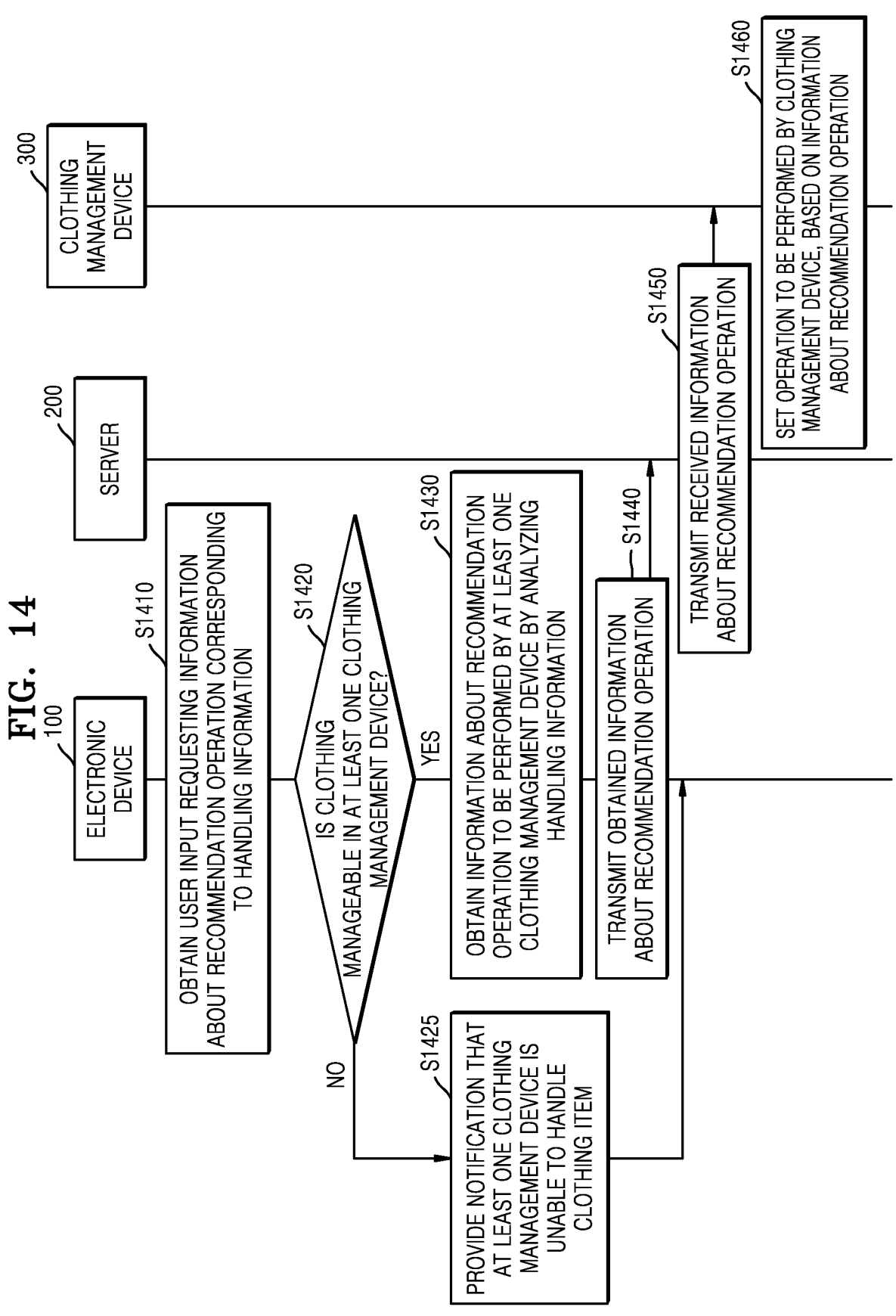
FIG. 14 illustrates an operation by which an electronic device provides information about a recommendation operation to a clothing management device through a server, according to an embodiment of the disclosure.

FIG. 14 illustrates an operation by which the electronic device 100 provides information about a recommendation operation to the clothing management device through the server, according to an embodiment of the disclosure.

In an embodiment of the disclosure, the operations of FIG. 14 may be performed after obtaining handling information in the same manner as in the drawings described above.

In operation S1410, the electronic device 100 according to an embodiment of the disclosure may obtain a user input requesting information about a recommendation operation corresponding to handling information. In an example, operation S1410 corresponds to operation S1350 of FIG. 13, the same description thereof is omitted.

In operation S1420, the electronic device 100 according to an embodiment of the disclosure may identify whether the clothing item is manageable in at least one clothing management device based on the user input. In an example, operation S1420 corresponds to operation S1360 of FIG. 13, and as such, the same description thereof is omitted.

In operation S1425, the electronic device 100 according to an embodiment of the disclosure may provide a notification that the at least one clothing management device is unable to handle the clothing item. In an example, operation S1425 corresponds to operation S1365 of FIG. 13, and as such, the same description thereof is omitted.

In operation S1430, the electronic device 100 according to an embodiment of the disclosure may obtain information about the recommendation operation to be performed by the at least one clothing management device by analyzing the handling information. In an example, operation S1430 corresponds to operation S1370 of FIG. 13, and as such, the same description thereof is omitted.

In operation S1440, the electronic device 100 according to an embodiment of the disclosure may transmit the information about the recommendation operation to the server 200. The electronic device 100 may transmit the obtained information about the recommendation operation to the server 200 in order to transmit the information about the recommendation operation to the at least one clothing management device. For example, the electronic device 100 may transmit, to the server 200, the information about the recommendation operation to be performed on the clothing in a washing machine, a dryer, an air dresser, or the like.

In operation S1450, the server 200 according to an embodiment of the disclosure may transmit the information about the recommendation operation to the clothing management device. The server 200 may transmit, to the clothing management device 300, the information about the recommendation operation which is received from the electronic device 100. In an example in which the server 200 obtains, from the electronic device 100, the information about the recommendation operation to be performed by the dryer, the server 200 may transmit the information about the recommendation operation to the dryer. In an example in which the server 200 obtains, from the electronic device 100, the information about the recommendation operation to be performed by the air dresser, the server 200 may transmit the information about the recommendation operation to the air dresser.

In operation S1460, the clothing management device 300 according to an embodiment of the disclosure may set an operation to be performed by the clothing management device 300, based on the information about the recommendation operation. For example, the washing machine, the dryer, the air dresser, or the like may set the course so as to perform the information about the recommendation operation which is received from the server 200. In an example in which the dryer receives, from the server 200, the information about the recommendation operation of "drying lightly at a low temperature for 20 minutes," the dryer may set the course of drying "lightly" "at a low temperature" "for 20 minutes." Meanwhile, this is only an example, and the clothing management device 300 and the information about the recommendation operation are not limited thereto. According to an embodiment, the server 200 may control an operation of the clothing management device based on the information about the recommended operation. For example, the server 200 may control a washing operation and/or a drying operation of a washer/dryer machine based on based on the information about the recommended operation. In an embodiment, the electronic device 100 may control an operation of the clothing management device based on the information about the recommended operation. For example, the electronic device 100 may control a washing and/or a drying operation of a washer/dryer machine based on based on the information about the recommended operation.

Figure 15:
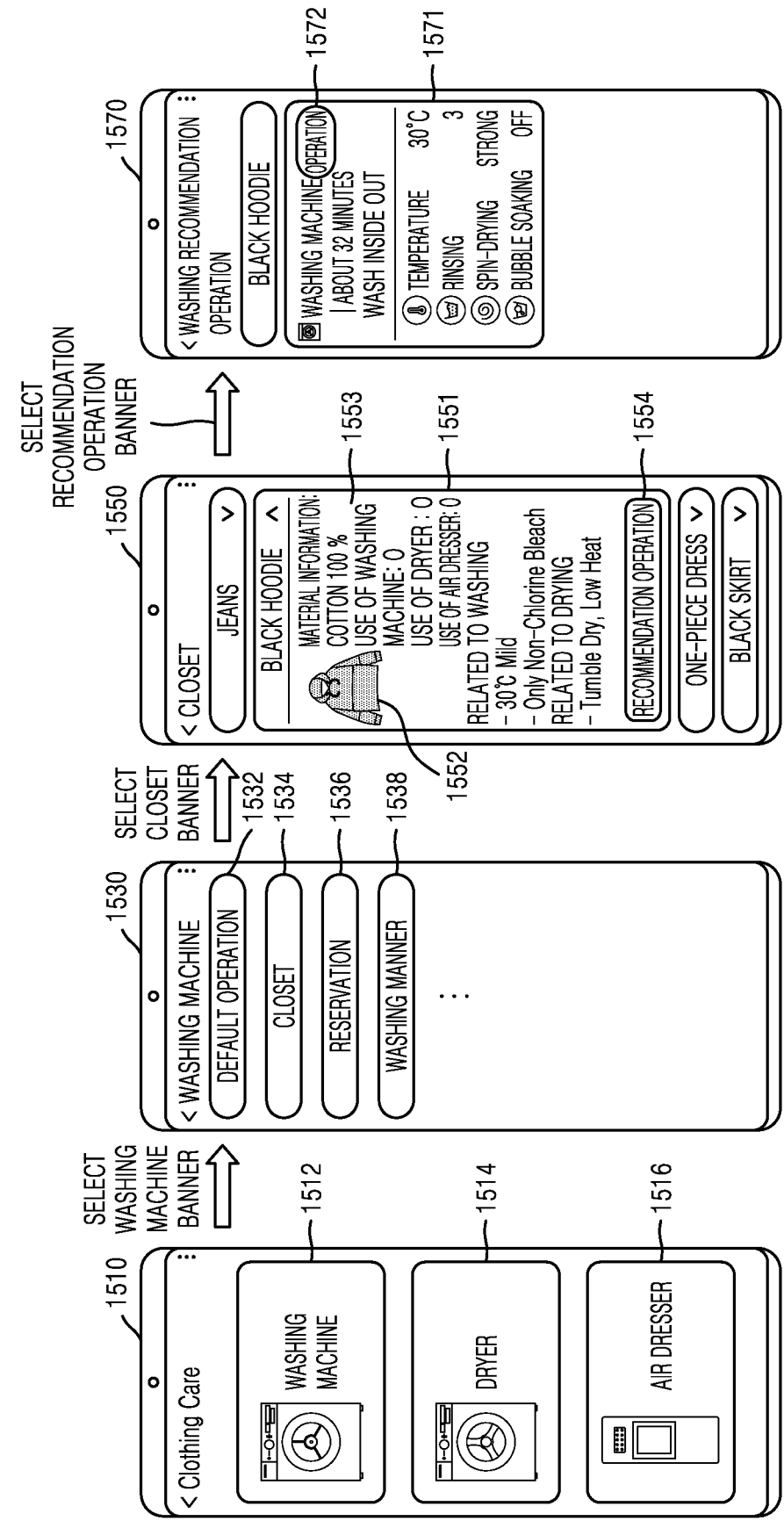
FIG. 15 illustrates an operation by which an electronic device provides information about a recommendation operation, according to an embodiment of the disclosure.

FIG. 15 illustrates an operation by which the electronic device 100 provides information about a recommendation operation, according to an embodiment of the disclosure.

In an embodiment of the disclosure, the electronic device 100 may obtain information about the recommendation operation to be performed by the at least one clothing management device, based on handling information of the clothing item. Also, the obtained information about the recommendation operation may be displayed on the electronic device 100, or may be transmitted to the clothing management device.

In an embodiment of the disclosure, the electronic device 100 may display, on the first screen 1510, at least one clothing management device capable of transmitting information to the electronic device 100 or the server 200, and receiving information the electronic device 100 or the server 200. The at least one clothing management device may be registered in the server 200 with a same user account as the electronic device 100. For example, the at least one clothing management device may include at least one of a washing machine, a dryer, or an air dresser. Meanwhile, for convenience of description, only one clothing management device is described for each type, and a plurality of identical clothing management devices, such as two washing machines, may be connected to the electronic device 100 or the server 200. Also, the clothing management device is not limited to the disclosed example.

In an embodiment of the disclosure, the user may select a washing machine banner 1512 from among the washing machine banner 1512, a dryer banner 1514, and an air dresser banner 1516 included in the first screen 1510. The electronic device 100 may obtain an input for the washing machine banner 1512 through a voice input or a touch input. Meanwhile, the disclosure is not limited thereto, the electronic device 100 may obtain an input in various ways, and a detailed description of a method of obtaining an input is omitted below. In an example in which the electronic device 100 obtains the user input for the washing machine banner 1512 on the first screen 1510, the electronic device 100 may display a second screen 1530. The electronic device 100 may display, on the second screen 1530, operations that may be performed in the washing machine.

In an embodiment of the disclosure, the electronic device 100 may obtain an input for a default operation banner 1532 and perform the courses basically set for the washing machine. For example, a 'wool course' basically set for the washing machine is a course in which the washing machine performs a washing operation on wool clothing, and may be an operation of rinsing twice at 30° C. and spin-drying lightly. The electronic device 100 may obtain an input for a reservation banner 1536 on the second screen 1530, and may be set to perform a course basically set for the washing machine or a course set by the user at a time specified by the user. The electronic device 100 may obtain an input for a washing instruction banner 1538 on the second screen 1530 and recommend a washing operation based on the material or type of clothing. Also, the electronic device 100 may obtain an input for a closet banner 1534 on the second screen 1530 and provide handling information stored in the electronic device 100 or the server 200.

In an embodiment of the disclosure, the electronic device 100 may display a third screen 1550 when the input for the closet banner 1534 is obtained on the second screen 1530. The electronic device 100 may display handling information corresponding to the clothing item, which is obtained through the third screen 1550. For example, the electronic device 100 may display a prestored clothing list (e.g., a plurality of clothing banners). The electronic device 100 may obtain a user input for a specific clothing banner from among a plurality of clothing banners and provide specific handling information for specific clothing. For example, the electronic device 100 may obtain an input for a black hoodie clothing banner and provide clothing information 1551 corresponding to the black hoodie. The clothing information 1551 corresponding to the black hoodie may include appearance information 1552 of the black hoodie or handling information 1553 of the black hoodie. In an example in which the clothing information 1551 is provided, the electronic device 100 may also display a recommendation operation banner 1554 for recommending an operation of at least one clothing management device.

In an embodiment of the disclosure, the electronic device 100 may regard the obtaining of the input for the recommendation operation banner 1554 as the obtaining of the user input of requesting information about the recommendation operation corresponding to the handling information. In an example in which the input for the recommendation operation banner 1554 is obtained, the electronic device 100 may display a fourth screen 1570. The electronic device 100 may analyze the obtained handling information 1553 and display information 1571 about the recommendation operation to be performed by the clothing management device. Specifically, the information 1571 about the recommendation operation for the black hoodie may include information for performing a series of operations such as washing at 30° C., rinsing three times, and strongly spin-drying.

In an example in which the user identifies the information 1571 about the recommendation operation and selects the operation banner 1572, the electronic device 100 may control the washing machine to operate based on the information 1571 about the recommendation operation. In this case, the washing machine may be a washing machine registered in the server 200 with the same user account as the electronic device 100.

Figure 16:
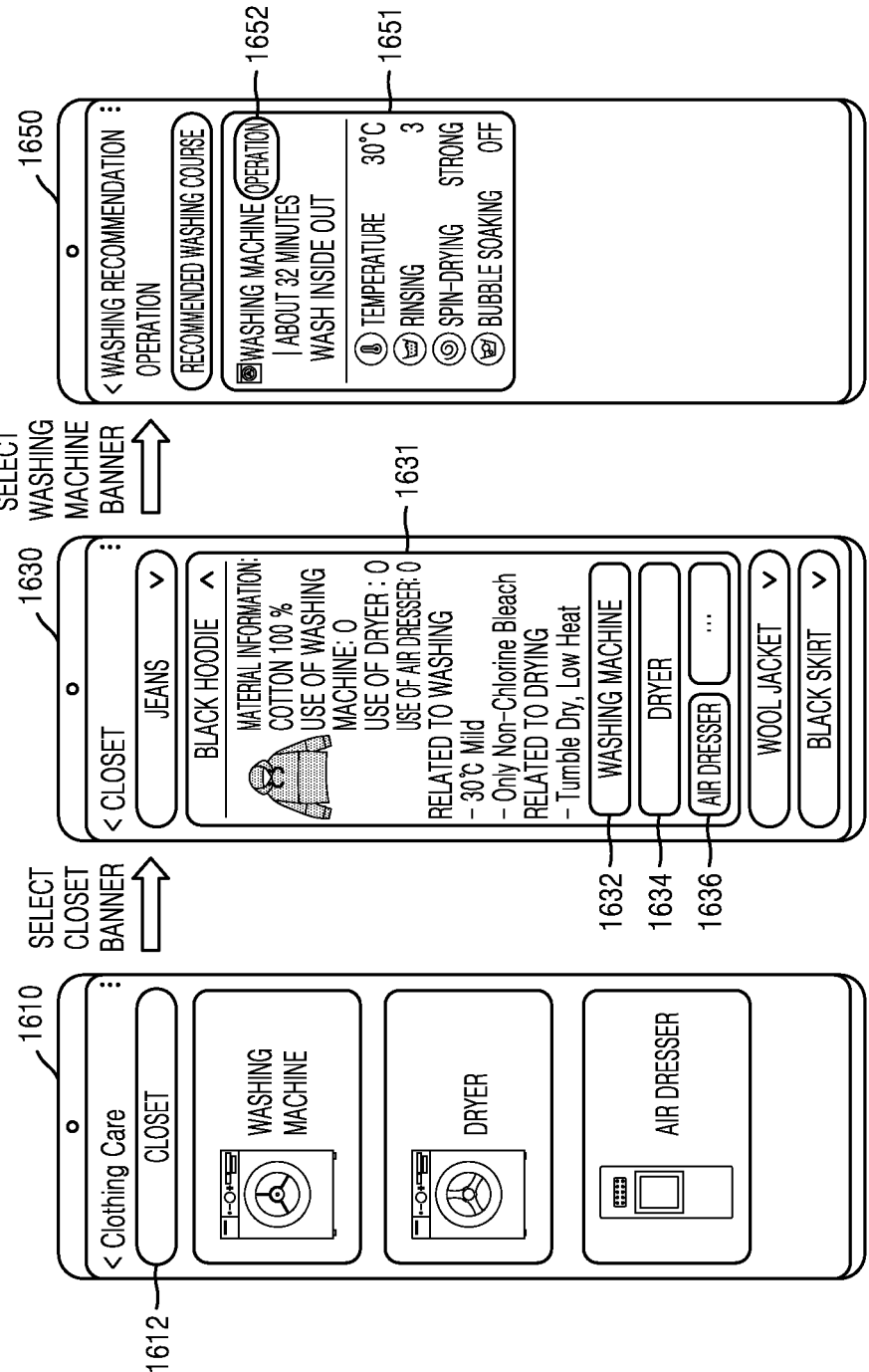
FIG. 16 illustrates an operation by which an electronic device provides information about a recommendation operation, according to an embodiment of the disclosure.

FIG. 16 illustrates an operation by which the electronic device 100 provides information about a recommendation operation, according to an embodiment of the disclosure.

In an embodiment of the disclosure, the electronic device 100 may display, on the first screen 1610, at least one clothing management device capable of transmitting and receiving information to and from the electronic device 100 or the server 200. The at least one clothing management device may be registered in the server 200 with the same user account as the electronic device 100. For example, the at least one clothing management device may include at least one of a washing machine, a dryer, or an air dresser. Meanwhile, for convenience of description, only one clothing management device is described for each type, and a plurality of identical clothing management devices, such as two washing machines, may be connected to the electronic device 100 or the server 200. Also, the clothing management device is not limited to the disclosed example.

In an example in which the user selects a banner for at least one clothing management device on the first screen 1610, the electronic device 100 may operate as illustrated in FIG. 15.

In an embodiment of the disclosure, the electronic device 100 may display a second screen 1630 when a user input for a closet banner 1612 is obtained on the first screen 1610. The electronic device 100 may provide handling information corresponding to the clothing item, which is obtained through the second screen 1630. For example, the electronic device 100 may display a prestored clothing list (e.g., a plurality of clothing banners). The electronic device 100 may obtain an input for a specific clothing banner from among a plurality of clothing banners and provide specific handling information for specific clothing. In an example in which the electronic device 100 obtains a user input for a black hoodie banner, the electronic device 100 may provide, to the user, clothing information 1631 corresponding to the black hoodie. The clothing information 1631 may include appearance information and handling information.

In an embodiment of the disclosure, in order to obtain information about a recommendation operation to be performed by the clothing management device connected to the electronic device 100 or the server 200, the electronic device 100 may display a banner for the connected clothing management device on the screen providing clothing information. In an example in which the clothing management device registered to the server 200 with the user account include a washing machine, a dryer, and an air dresser, the electronic device 100 may provide a washing machine banner 1632 providing a recommendation operation to be performed by the washing machine, a dryer banner 1634 providing a recommendation operation to be performed by the dryer, and an air dresser banner 1636 providing a recommendation operation to be performed by the air dresser.

In an example in which the user input for the washing machine banner 1632 is obtained, the electronic device 100 may display a third screen 1650. The electronic device 100 may analyze the handling information obtained through the third screen 1650 and provide information 1651 on the recommendation operation to be performed by the washing machine.

In an example in which the user identifies the information 1651 about the recommendation operation and selects the operation banner 1652, the electronic device 100 may control the washing machine to operate based the information 1651 about the recommendation operation.

Figure 17:
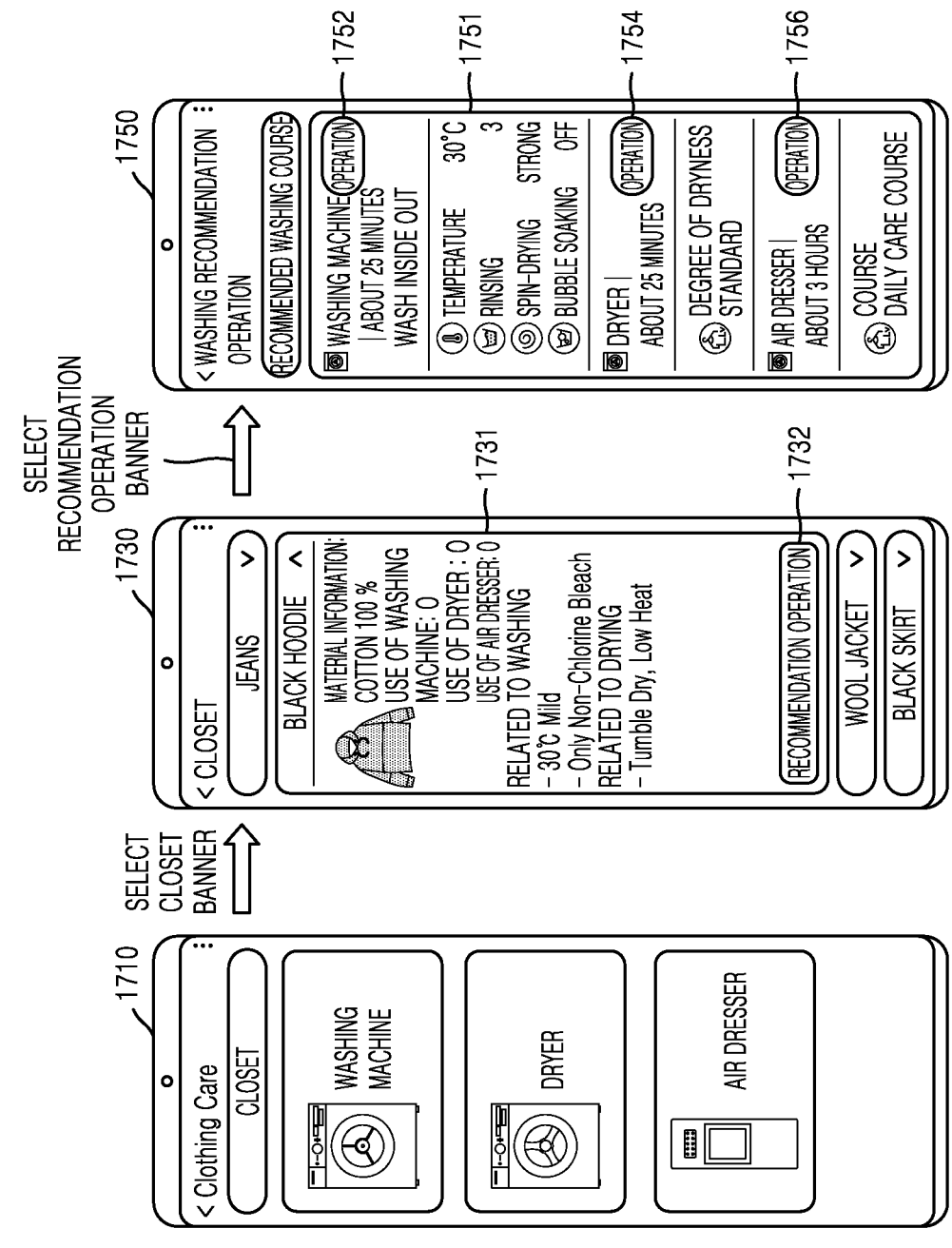
FIG. 17 illustrates an operation by which an electronic device provides information about a recommendation operation, according to an embodiment of the disclosure.

FIG. 17 illustrates an operation by which the electronic device 100 provides information about a recommendation operation, according to an embodiment of the disclosure.

In an embodiment of the disclosure, the electronic device 100 may provide, through the first screen 1710, handling information and at least one clothing management device that transmits and receives information to and from the electronic device 100 or the server 200. In an example, the description of the first screen 1710 corresponds to the description of the first screen 1610 of FIG. 16, the description of the first screen 1710 is omitted.

In an embodiment of the disclosure, the electronic device 100 may obtain an input for a closet banner and display a second screen 1730. The electronic device 100 may provide handling information corresponding to the clothing item, which is obtained through the second screen 1730. For example, the electronic device 100 may display a prestored clothing list (e.g., a plurality of clothing banners). The electronic device 100 may obtain an input for a specific clothing banner from among the clothing banners and provide specific handling information for specific clothing. In an example in which an input for a black hoodie banner is obtained, the electronic device 100 may display clothing information 1731 for the black hoodie. Also, the electronic device 100 may display a recommendation operation banner 1732 for recommending an operation of at least one clothing management device connected to the electronic device 100 or the server 200.

In an example in which the input for the recommendation operation banner 1732 is obtained, the electronic device 100 may display a third screen 1750. The electronic device 100 may provide, on the third screen 1750, information 1751 about a recommendation operation to be performed by the at least one clothing management device connected to the electronic device 100 or the server 200. In an example in which the at least one clothing management device connected to the electronic device 100 or the server 200 is a washing machine, a dryer, and an air dresser, the electronic device 100 may provide information about a recommendation operations to be performed by the washing machine, information about a recommendation operation to be performed by the dryer, and information about a recommendation operation to be performed by the air dresser.

In an embodiment of the disclosure, the electronic device 100 may also display recommendation operation banners (e.g., a first operation banner 1752, a second operation banner 1754, and a third operation banner 1756) for recommending the operation of the at least one clothing management device.

In an example in which the electronic device 100 obtains an input for the first operation banner 1752, the electronic device 100 may transmit, to the server 200 or the washing machine, information about a recommendation operation for recommending the operation of the washing machine. In an example in which the electronic device 100 obtains an input for the second operation banner 1754, the electronic device 100 may transmit, to the server 200 or the dryer, information about a recommendation operation for recommending the operation of the dryer. In an example in which the electronic device 100 obtains an input for the third operation banner 1756, the electronic device 100 may transmit, to the server 200 or the air dresser, information about a recommendation operation for recommending the operation of the air dresser.

Figure 18:
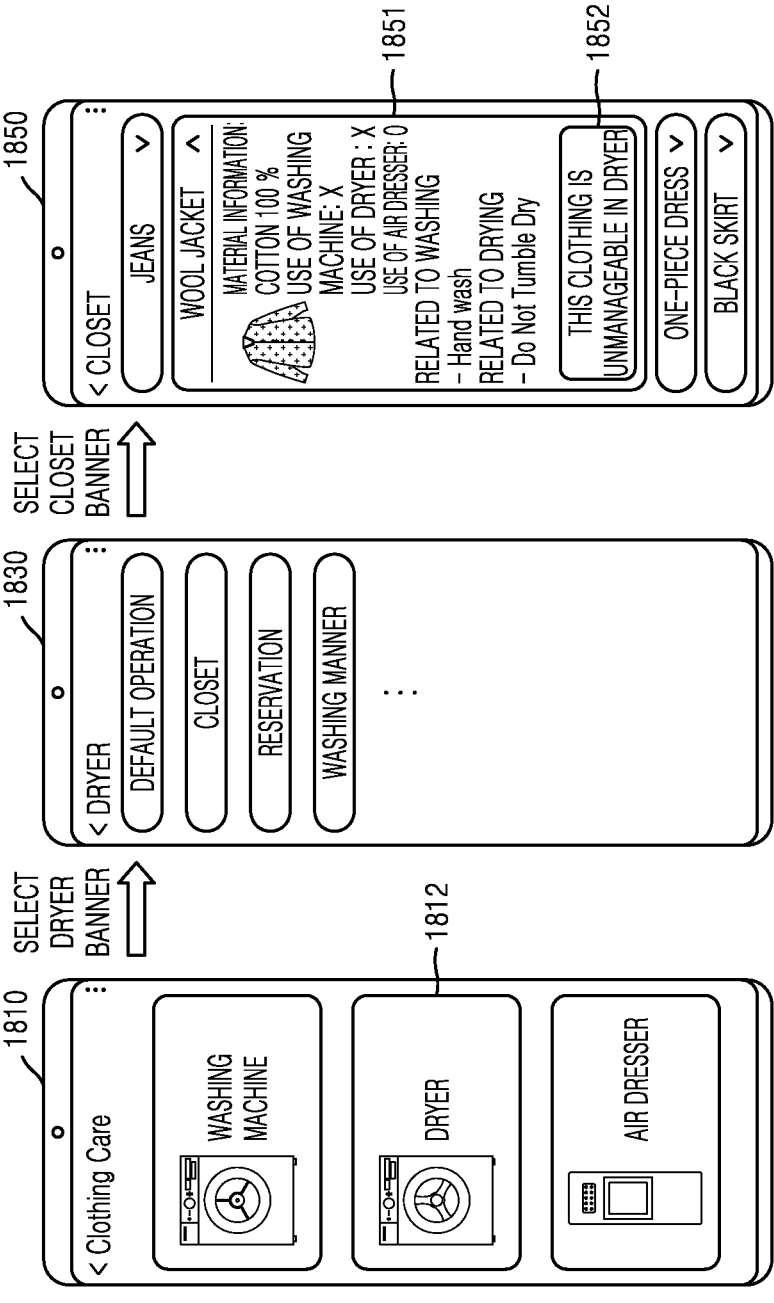
FIG. 18 illustrates an operation by which an electronic device provides information about a recommendation operation, according to an embodiment of the disclosure.

FIG. 18 illustrates an operation by which the electronic device 100 provides information about a recommendation operation, according to an embodiment of the disclosure.

In an example, a description of a first screen 1810 corresponds to the description of the first screen 1510 of FIG. 15, and as such, the description of the first screen 1810 is omitted. However, in FIG. 18, unlike in FIG. 15, the electronic device 100 may obtain an input for a dryer banner 1812.

In an embodiment of the disclosure, a description of a second screen 1830 corresponds to the description of the second screen 1530 of FIG. 15, except that the input for the dryer banner 1812 is obtained, and thus, the description of the second screen 1830 is omitted.

In an embodiment of the disclosure, the electronic device 100 may obtain an input for a closet banner on the second screen 1830 and display a third screen 1850. The electronic device 100 may display a prestored clothing list (e.g., a plurality of clothing banners) on the third screen 1850, obtain an input for a specific banner from among the clothing banners, and provide specific handling information for specific clothing. For example, the electronic device 100 may obtain an input for a wool jacket banner and provide clothing information 1851 corresponding to the wool jacket. In an example, based on an identification that the wool jacket is clothing unmanageable in the dryer, the electronic device 100 may provide a notification 1852 that the handling of the wool jacket is impossible in the dryer. For example, the electronic device 100 may provide the notification 1852 that the handling is impossible through a banner including text "this is clothing unmanageable in the dryer."

Figure 19:
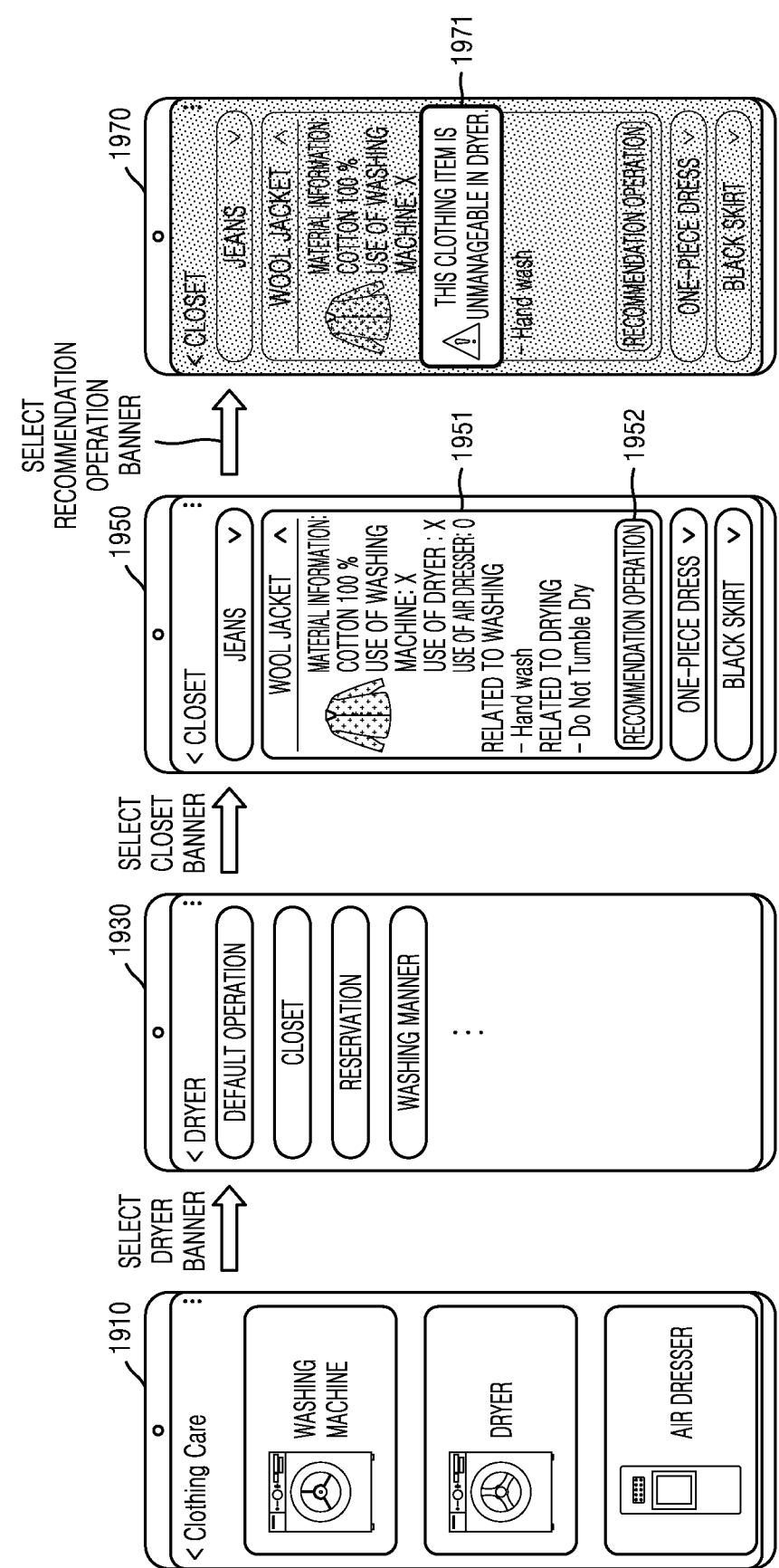
FIG. 19 illustrates an operation by which an electronic device provides information about a recommendation operation, according to an embodiment of the disclosure.

FIG. 19 illustrates an operation by which the electronic device 100 provides information about a recommendation operation, according to an embodiment of the disclosure.

In an example, a description of a first screen 1910 corresponds to the description of the first screen 1510 of FIG. 15, and as such, the description of the first screen 1910 is omitted. However, in FIG. 19, unlike in FIG. 15, the electronic device 100 may obtain an input for a dryer banner 1912.

In an example, a description of a second screen 1930 corresponds to the description of the second screen 1530 of FIG. 15, except that the input for the dryer banner 1912 is obtained, and thus, the description of the second screen 1930 is omitted.

In an embodiment of the disclosure, the electronic device 100 may display a plurality of clothing banners on the third screen 1950, obtain an input for least one banner from among the clothing banners, and provide specific handling information. For example, the electronic device 100 may obtain an input for a wool jacket banner and provide clothing information 1951 corresponding to the wool jacket. In an example, based on an identification that the wool jacket is clothing unmanageable in the dryer, the electronic device 100 may provide a notification that the handling of the wool jacket is impossible in the dryer. The electronic device 100 may also provide a recommendation operation banner 1952 for recommending an operation of at least one clothing management device while providing the clothing information 1951 corresponding to the wool jacket. In an example, the wool jacket may been identified as clothing unmanageable in the dryer, and as such, the electronic device 100 may provide a fourth screen 1970 to the user in order to provide a notification 1971 that the handling of the clothing is impossible. Meanwhile, the method of providing the notification 1971 that the electronic device 100 is unable to handle the clothing is not limited thereto.

Figure 20:
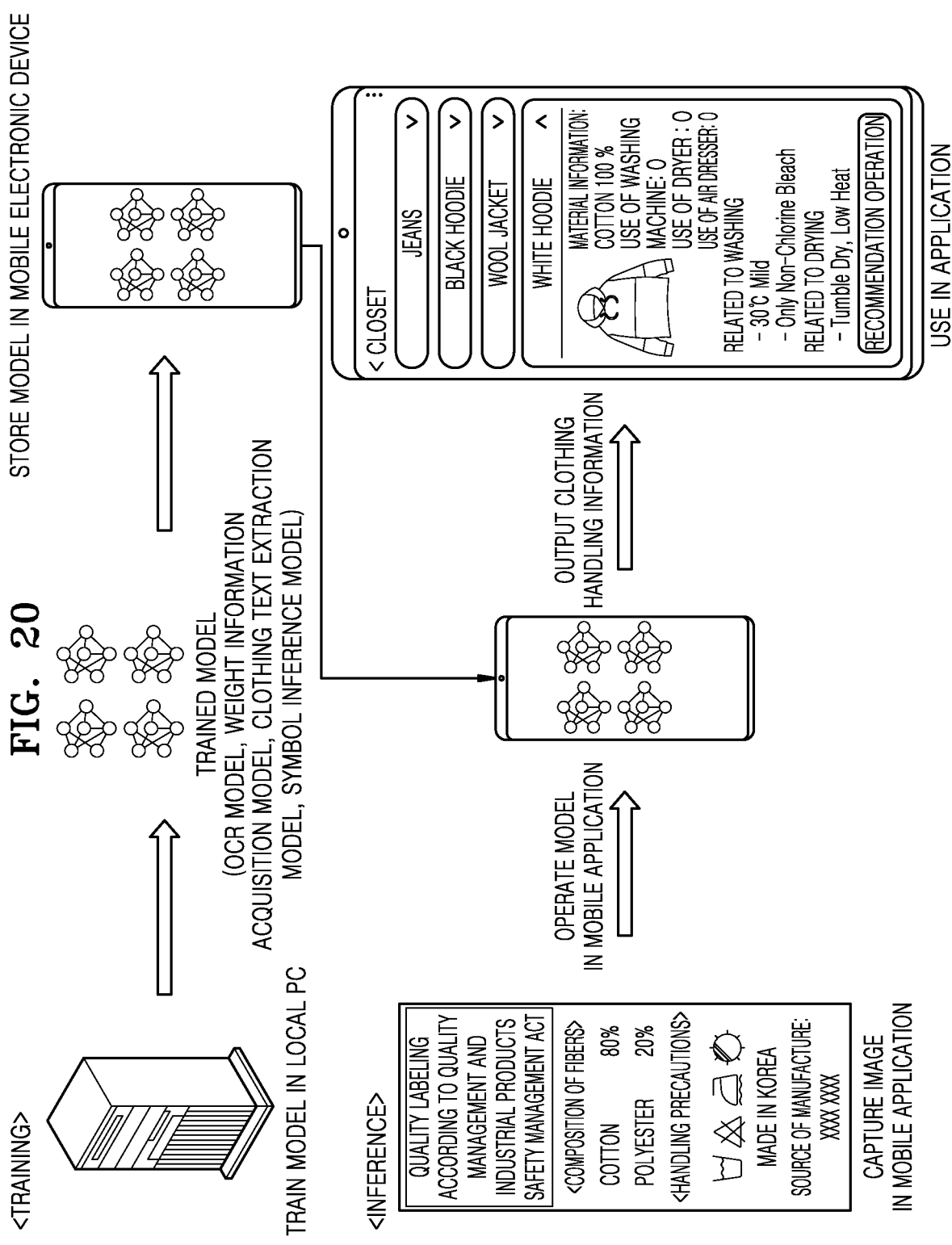
FIG. 20 illustrates an example of a system associated with an operation by which an electronic device processes an image, according to an embodiment of the disclosure.

FIG. 20 illustrates an example of a system associated with an operation by which an electronic device 100 processes an image, according to an embodiment of the disclosure.

In an embodiment of the disclosure, models used by the electronic device 100 may be trained in an external electronic device (e.g., a local personal computer (PC), etc.) suitable for performing neural network operations. For example, an image feature extraction network, an OCR model, a first AI model, a second AI model, a third AI model, and the like may be trained in the external electronic device and stored in a trained state.

In an embodiment of the disclosure, the electronic device 100 may receive trained models stored in the external electronic device. The electronic device 100 may perform the above-described image processing operations based on the received models. In this case, the electronic device 100 may execute the trained models to perform an inference operation, and obtain handling information by identifying, from a label image, at least one symbol associated with handling of clothing item. The identified at least one symbol or the obtained handling information may be provided to the user through an application or the like. In FIG. 20, a case where a phone is stored in a mobile and used will be described as an example of the electronic device 100, but the disclosure is not limited thereto. The electronic device 100 may include any electronic devices capable of executing applications and having a display and a camera mounted thereon. Examples of the electronic device 100 may include a TV, a tablet PC, a smart refrigerator, and the like.

In an example, as described above with reference to the drawings, networks or models used by the electronic device 100 may be trained by using computing resources of the electronic device 100, and as such, a description thereof is omitted.

Figure 21:
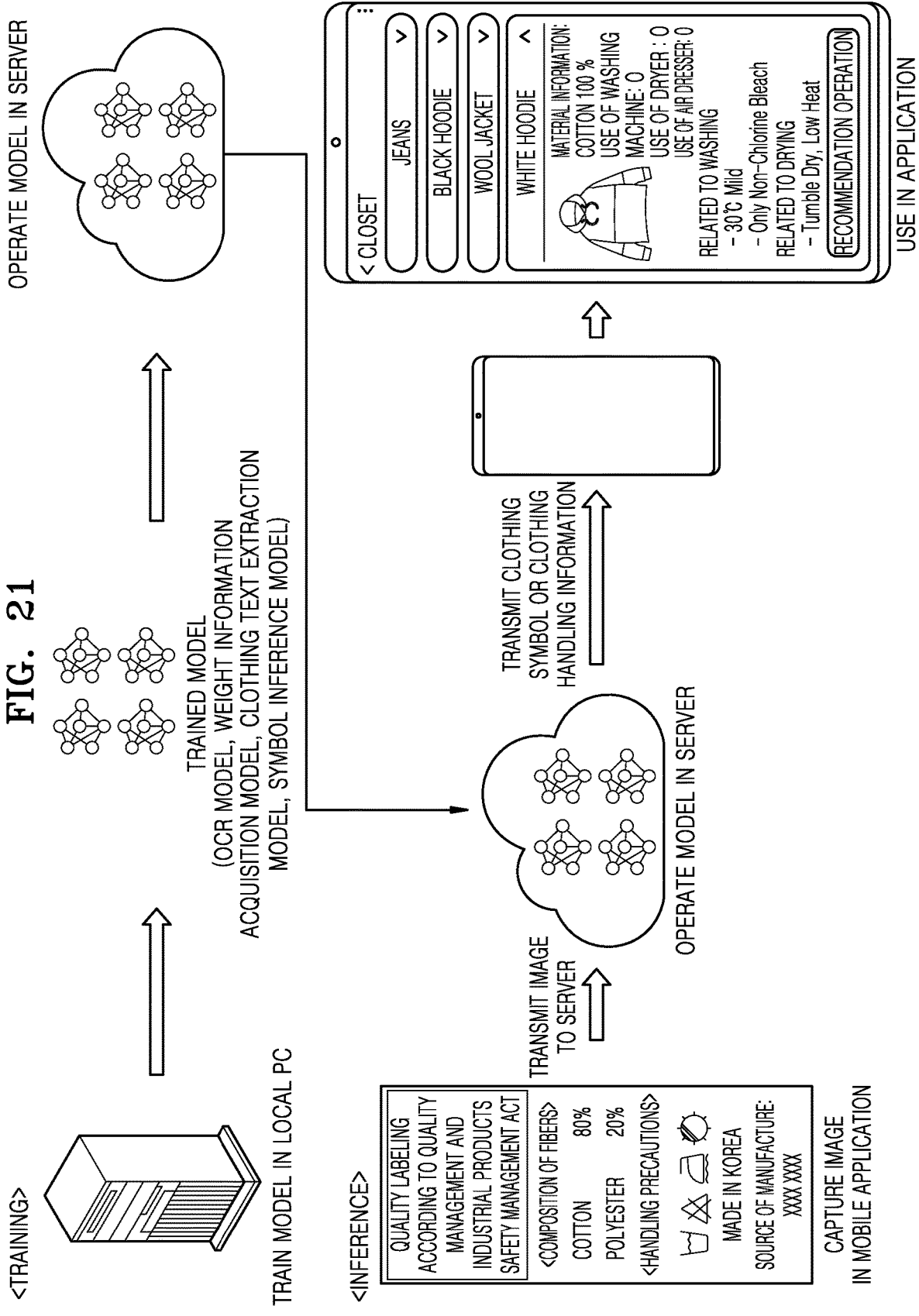
FIG. 21 is a diagram for describing an example of a system associated with an operation by which an electronic device processes an image by using a server, according to an embodiment of the disclosure.

FIG. 21 is a diagram for describing an example of a system associated with an operation by which an electronic device 100 processes an image by using a server, according to an embodiment of the disclosure.

In an embodiment of the disclosure, models used by the electronic device 100 may be trained in an external electronic device (e.g., a local PC) suitable for performing neural network operations. For example, an image feature extraction network, an OCR model, a first AI model, a second AI model, a third AI model, and the like may be trained in the external electronic device and stored in a trained state. Also, models trained in the external electronic device (e.g., a local PC, etc.) may be transmitted to and stored in another electronic device (e.g., the server 200, etc.).

In an embodiment of the disclosure, the electronic device 100 may perform image processing operations by using the server 200. The electronic device 100 may obtain a label image including at least one symbol associated with handling of clothing item, and transmit the label image to the server 200. In this case, the server 200 may execute the trained models to perform an inference operation. For example, the server 200 may identify at least one symbol associated with the handling of the clothing item by applying the label image to the trained models, and obtain handling information based on the identified at least one symbol. The electronic device 100 may receive the handling information from the server 200. The received handling information may be provided to the user through an application or the like. In FIG. 21, a case where the server 200 performs the inference operation by using the model stored in the server 200 has been described as an example, and all or part of the inference operation may be performed by the server 200.

Meanwhile, as described above with reference to the drawings, models used by the server 200 may be trained by using computing resources of the server 200, and as such, a description thereof is omitted.

Figure 22:
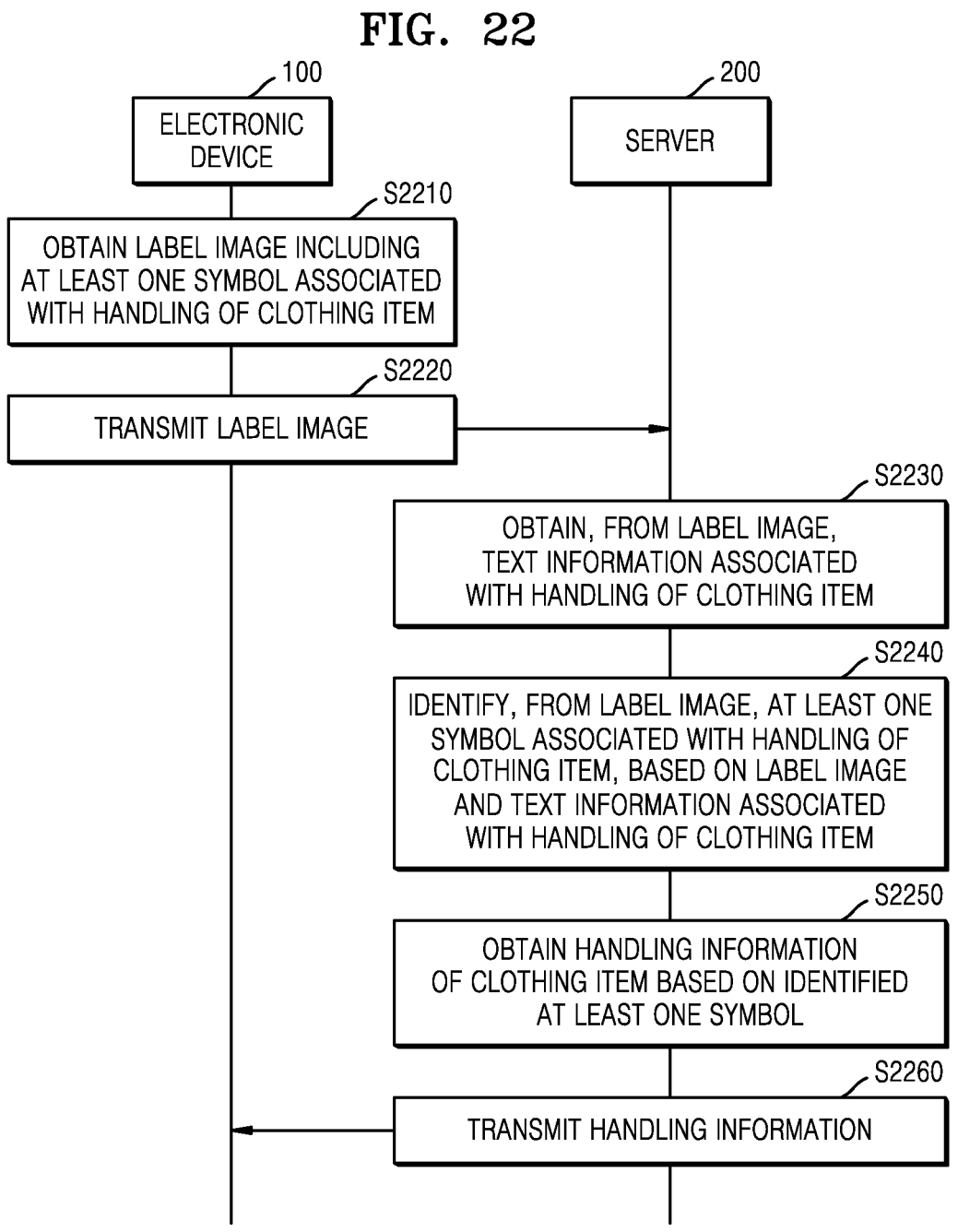
FIG. 22 is a flowchart of a method, performed by an electronic device, of processing an image by using a server, according to an embodiment of the disclosure.

FIG. 22 is a flowchart of a method, performed by an electronic device 100, of processing an image by using a server 200, according to an embodiment of the disclosure.

In an embodiment of the disclosure, the electronic device 100 may perform image processing operations by using the server 200.

In operation S2210, the electronic device 100 according to an embodiment of the disclosure may obtain a label image including at least one symbol associated with the handling of the clothing item. In an example, operation S2210 corresponds to operation S210 of FIG. 2, and as such, the same description thereof is omitted.

In operation S2220, the electronic device 100 according to an embodiment of the disclosure may transmit the label image to the server 200. The electronic device 100 may transmit the label image to the server 200 so that the server 200 processes the label image.

In operation S2230, the server 200 according to an embodiment of the disclosure may obtain, from the label image, text information associated with the handling of the clothing item. Operation S2230 corresponds to operation S220 of FIG. 2, except that operation S2230 is performed by the server 200, and thus, the same description thereof is omitted.

In an embodiment of the disclosure, the server 200 may receive the label image obtained by the electronic device 100. Also, the server 200 may select a label image pre-stored in the server 200. The server 200 may obtain the text information associated with the handling of the clothing item by applying the received label image to an OCR model included in the server 200.

In operation S2240, the server 200 according to an embodiment of the disclosure may identify, from the label image, at least one symbol associated with the handling of the clothing item, based on the label image and the text information associated with the handling of the clothing item. Operation S2240 corresponds to operation S230 of FIG. 2, except that operation S2240 is performed by the server 200, and thus, the same description thereof is omitted.

In an embodiment of the disclosure, the server 200 may easily identify the at least one symbol associated with the handling of the clothing item by performing symbol recognition on the label image by taking into account the text information included in the label. The server 200 may perform symbol recognition on the label image by using an AI model including at least one of a first AI model, a second AI model, or a third AI model, which is stored in the server 200.

In operation S2250, the server 200 according to an embodiment of the disclosure may obtain handling information related to the clothing item, based on the identified at least one symbol. Operation S2250 corresponds to operation S240 of FIG. 2, except that operation S2250 is performed by the server 200, and thus, the same description thereof is omitted.

In an embodiment of the disclosure, the server 200 may obtain handling information by taking into account the meaning represented by the identified at least one symbol.

In operation S2260, the server 200 according to an embodiment of the disclosure may transmit the obtained handling information to the electronic device 100.

In an embodiment of the disclosure, the electronic device 100 may receive the handling information from the server 200 and provide the received handling information to the user.

Figure 23:
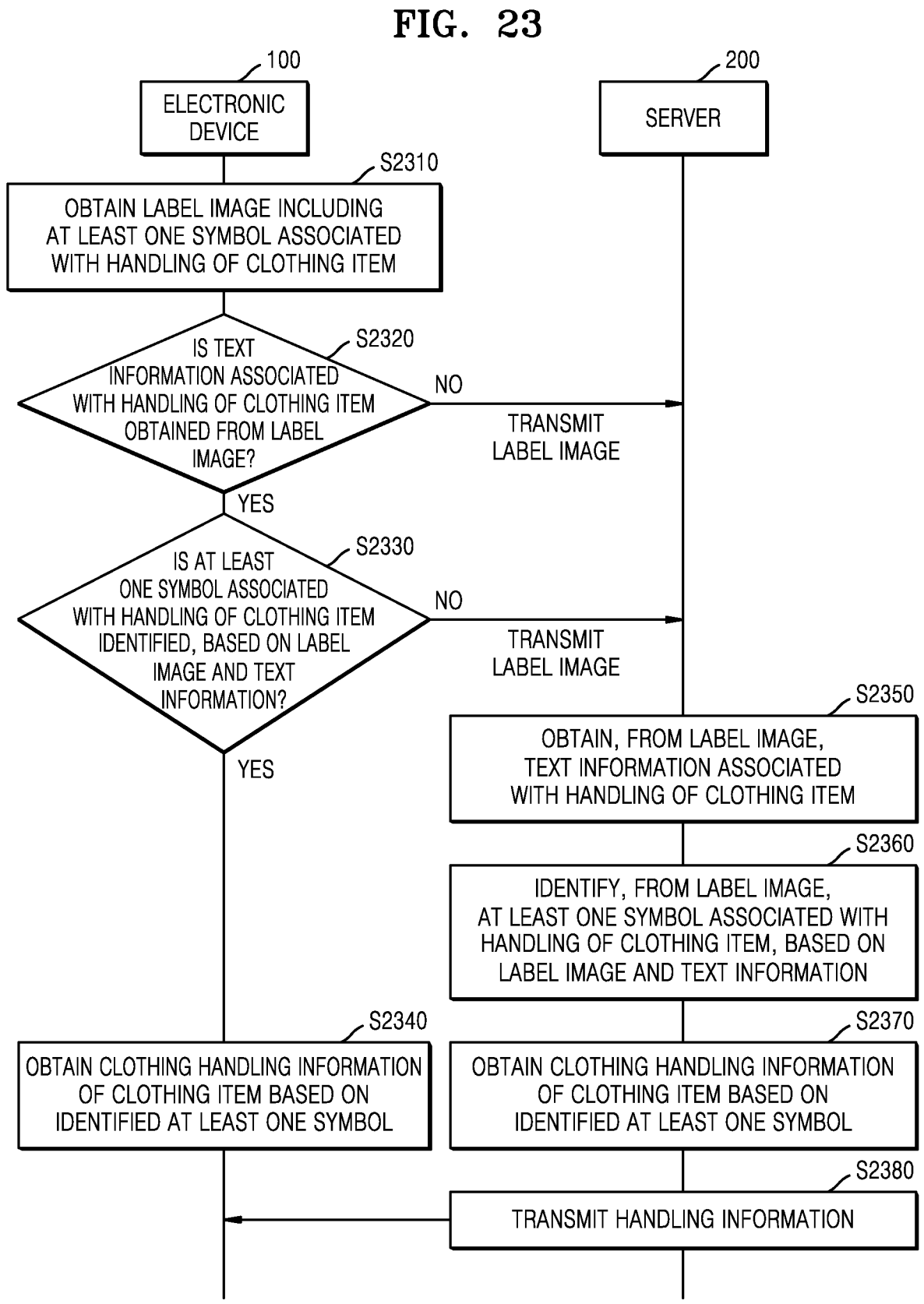
FIG. 23 is a flowchart of a method, performed by an electronic device, of processing an image by using a server, according to an embodiment of the disclosure.

FIG. 23 is a flowchart of a method, performed by an electronic device 100, of processing an image by using a server 200, according to an embodiment of the disclosure.

The server 200 according to an embodiment of the disclosure may be a device with higher computing performance than the electronic device 100 so as to be able to perform operations with a larger amount of computation than the electronic device 100. The server 200 may train an AI model that requires a relatively large amount of computation, compared to inference. The server 200 may perform the inference by using the AI model and transmit an inference result to the electronic device 100. Therefore, when it is difficult to perform the inference by using the model trained in the electronic device 100, the electronic device 100 may transmit a label image to the server 200 and perform the inference by using the model trained in the server 200.

In operation S2310, the electronic device 100 according to an embodiment of the disclosure may obtain a label image including at least one symbol associated with the handling of the clothing item. In an example, operation S2310 corresponds to operation S210 of FIG. 2, and as such, the same description thereof is omitted.

In operation S2320, the electronic device 100 according to an embodiment of the disclosure may obtain, from the label image, text information associated with the handling of the clothing item. In an example, operation S2320 corresponds to operation S220 of FIG. 2, and as such, the same description thereof is omitted.

In an embodiment of the disclosure, the electronic device 100 may not obtain, from the label image, text information associated with the handling of the clothing item. In this case, the electronic device 100 may transmit the label image to the server 200 so that the server 200 obtains the text information associated with the handling of the clothing item.

In operation S2330, the electronic device 100 according to an embodiment of the disclosure may identify, from the label image, at least one symbol associated with the handling of the clothing item, based on the label image and the text information associated with the handling of the clothing item. In an example, operation S2330 corresponds to operation S230 of FIG. 2, and as such, the same description thereof is omitted.

In an embodiment of the disclosure, the electronic device 100 may not identify at least one symbol associated with the handling of the clothing item, based on the label image and the text information associated with the handling of the clothing item. In this case, the electronic device 100 may transmit the label image to the server 200 so that the server 200 may identify at least one symbol associated with the handling of the clothing item. Also, the server 200 may perform the operation of obtaining the text information associated with the handling of the clothing item again.

In operation S2340, the electronic device 100 according to an embodiment of the disclosure may obtain handling information related to the clothing item, based on the identified at least one symbol. In an example, operation S2340 corresponds to operation S240 of FIG. 2, and as such, the same description thereof is omitted.

In operation S2350, the server 200 according to an embodiment of the disclosure may obtain, from the label image, text information associated with the handling of the clothing item. In an example, operation S2350 corresponds to operation S2230 of FIG. 22, and as such, the same description thereof is omitted.

In operation S2360, the server 200 according to an embodiment of the disclosure may identify, from the label image, at least one symbol associated with the handling of the clothing item, based on the label image and the text information associated with the handling of the clothing item. In an example, operation S2360 corresponds to operation S2240 of FIG. 22, the same description thereof is omitted.

In operation S2370, the server 200 according to an embodiment of the disclosure may obtain handling information related to the clothing item, based on the identified at least one symbol. In an example, operation S2370 corresponds to operation S2250 of FIG. 22, and as such, the same description thereof is omitted.

In operation S2380, the server 200 according to an embodiment of the disclosure may transmit the obtained handling information to the electronic device 100. In an example, operation S2380 corresponds to operation S2260 of FIG. 22, the same description thereof is omitted.

Figure 24:
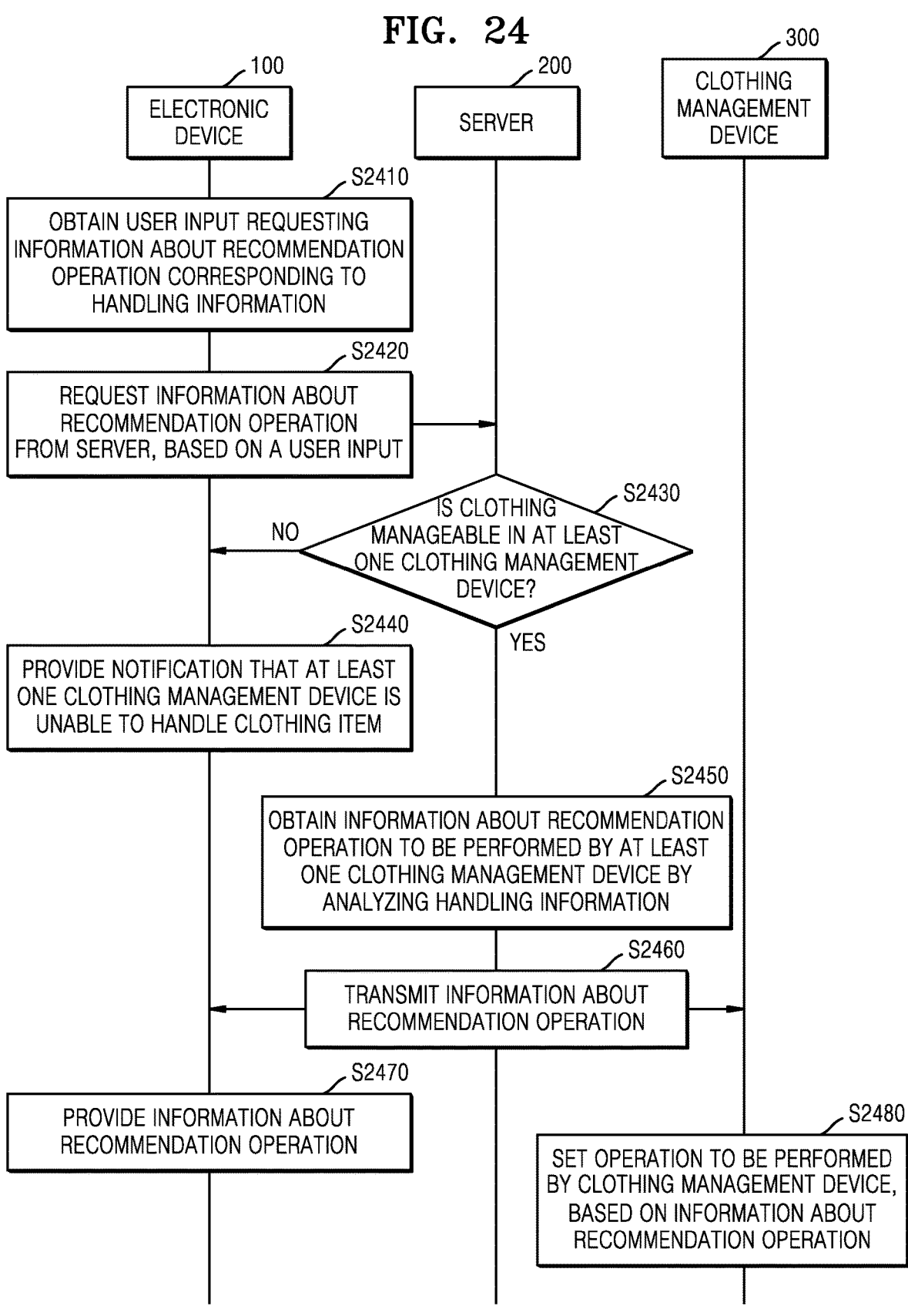
FIG. 24 is a flowchart of an operation by which an electronic device provides information about a recommendation operation to a clothing management device by using a server, according to an embodiment of the disclosure.

FIG. 24 is a flowchart of an operation by which an electronic device 100 provides information about a recommendation operation to a clothing management device 300 by using a server 200, according to an embodiment of the disclosure.

In an embodiment of the disclosure, the operations of FIG. 24 may be performed after obtaining handling information in the same manner as in the drawings described above.

In operation S2410, the electronic device 100 according to an embodiment of the disclosure may obtain a user input requesting information about a recommendation operation corresponding to the handling information. In an example, operation S2410 corresponds to operation S1350 of FIG. 13, and as such, the same description thereof is omitted.

In operation S2420, the electronic device 100 according to an embodiment of the disclosure may request information about a recommendation operation from the server 200, based on a user input. In an example in which handling information is obtained by using a model trained in the electronic device 100, the electronic device 100 may transmit the handling information together while requesting the information about the recommendation operation from the server 200. Meanwhile, a case where the electronic device 100 requests the information about the recommendation operation from the server 200 is not limited to a case where the handling information is received from the server 200.

In operation S2430, the server 200 according to an embodiment of the disclosure may identify whether the clothing item is manageable in at least one clothing management device, based on the handling information. Operation S2430 corresponds to operation S1360 of FIG. 13, except that operation S2430 is performed by the server 200, and thus, the same description thereof is omitted.

In an example in which the electronic device 100 requests the information about the recommendation operation from the server 200, the server 200 may obtain, from the electronic device 100, a user input requesting the information about the recommendation operation corresponding to the handling information.

In an example in which the server 200 receives a user input for a recommendation operation banner recommending the operation of the clothing management device, the server 200 may identify whether the clothing item is manageable in the at least one clothing management device, based on clothing information for specific clothing. In an example in which the clothing item is manageable in the at least one clothing management device, the server 200 may obtain information including an appropriate operation to be performed by the clothing management device. In an example in which the clothing item is unmanageable in the at least one clothing management device, the server 200 may obtain information indicating that the clothing item is unmanageable in the at least one clothing management device.

In an embodiment of the disclosure, the server 200 may transmit, to the electronic device 100, information indicating that the clothing is unmanageable in the clothing management device, based on an identification that the clothing is unmanageable in the clothing management device. Also, the server 200 may perform operation S2450 based on an identification that the clothing is manageable in the clothing management device.

In operation S2440, the electronic device 100 according to an embodiment of the disclosure may provide a notification that the at least one clothing management device is unable to handle the clothing item. In an example, operation S2440 corresponds to operation 1365 of FIG. 13, and as such, the same description thereof is omitted.

For example, the electronic device 100 may obtain, from the server 200, information indicating that the clothing item is unmanageable in the clothing management device, and provide, to the user, a notification that the handling of the clothing item is impossible.

In operation S2450, the server 200 according to an embodiment of the disclosure may obtain information about the recommendation operation to be performed by the at least one clothing management device by analyzing the handling information. Operation S2450 corresponds to operation S1370 of FIG. 13, except that operation S2450 is performed by the server 200, and thus, the same description thereof is omitted.

In operation S2460, the server 200 according to an embodiment of the disclosure may transmit information about the recommendation operation of the at least one clothing management device. For example, the server 200 may transmit information about the recommendation operation of the at least one clothing management device to the electronic device 100 or the clothing management device 300.

In operation S2470, the electronic device 100 according to an embodiment of the disclosure may provide the information about the recommendation operation of the at least one clothing management device. In an example in which the electronic device 100 receives, from the server 200, the information about the recommendation operation of the at least one clothing management device, the electronic device 100 may display the information about the recommendation operation of the at least one clothing management device on the screen.

In operation S2480, the clothing management device 300 according to an embodiment of the disclosure may set an operation to be performed by the clothing management device 300, based on the information about the recommendation operation. In an example, operation S2480 corresponds to operation S1460 of FIG. 14, and as such, the same description thereof is omitted.

Figure 25:
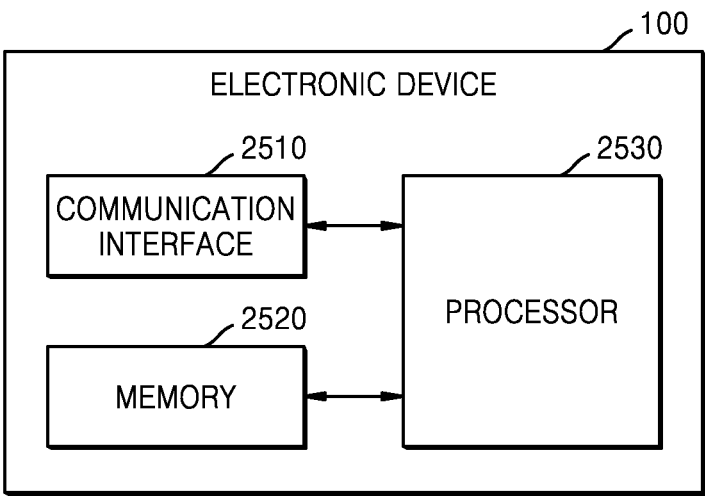
FIG. 25 is a block diagram illustrating a configuration of an electronic device according to an embodiment of the disclosure.

FIG. 25 is a block diagram illustrating a configuration of an electronic device 100 according to an embodiment of the disclosure.

The electronic device 100 according to an embodiment of the disclosure may include a communication interface 2510, a memory 2520, and a processor 2530. Meanwhile, the disclosure is not limited to the components illustrated in FIG. 25, and as such, according to an embodiment, the electronic device 100 may include various other components.

The communication interface 2510 may perform data communication with external electronic devices under the control of the processor 2530.

The communication interface 2510 may include a communication circuit. The communication interface 2510 may include a communication circuit that may perform data communication between the electronic device 100 and other devices by using at least one of data communication schemes including, for example, wired local area network (LAN), wireless LAN, Wireless Fidelity (Wi-Fi), Bluetooth, ZigBee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (WiGig), or radio frequency (RF) communication.

The communication interface 2510 may transmit and receive, to and from the external electronic device, data for performing an image processing operation of the electronic device 100. For example, the communication interface 2510 may transmit and receive AI models used by the electronic device 100 or may transmit and receive training datasets of AI models to and from a server 200 or the like. Also, the electronic device 100 may obtain a label image from the server 200 or the like. Also, the electronic device 100 may transmit and receive data to and from the server 200 or the like in order to obtain, from the label image, text information associated with the handling of the clothing item or to identify, from the label image, at least one symbol associated with the handling of the clothing item.

The memory 2520 may store instructions, a data structure, and program code, which are readable by the processor 2530. One or more memories 2520 may be provided. In an embodiment of the disclosure, operations performed by the processor 2530 may be implemented by executing instructions or codes of a program stored in the memory 2520.

The memory 2520 may include flash memory-type memory, hard disk-type memory, multimedia card micro-type memory, or card-type memory (e.g., secure digital (SD) or extreme digital (XD) memory), may include a non-volatile memory including at least one of read-only memory (ROM), electrically erasable programmable read-only memory (EEPROM), or programmable read-only memory (PROM), and may include a volatile memory, such as random access memory (RAM) or static random access memory (SRAM).

The processor 2530 may control overall operations of the electronic device 100. For example, the processor 2530 may execute one or more instructions of the program stored in the memory 2520, so that the electronic device 100 processes the label to identify at least one symbol associated with the handling of the clothing item and the processor 2530 controls overall operations for obtaining handling information related to the clothing item. One or more processors 2530 may be provided.

The processor 2530 according to the disclosure may include at least one of a central processing unit (CPU), a graphics processing unit (GPU), an accelerated processing unit (APU), a many integrated core (MIC), a digital signal processor (DSP), or a neural processing unit (NPU). The processor 2530 may be implemented in the form of an integrated system-on-chip (SoC) including one or more electronic components. The processor 2530 may each be implemented as separate hardware (H/W).

In an example in which the method according to an embodiment of the disclosure includes a plurality of operations, the operations may be performed by one processor or a plurality of processors. As such, the processor 2530 may include one or more processors. In an example in which a first operation, a second operation, and a third operation are performed by the method according to an embodiment of the disclosure, the first operation, the second operation, and the third operation may all be performed by a first processor. Alternatively, the first operation and the second operation may be performed by the first processor (e.g., a general-purpose processor) and the third operation may be performed by a second processor (e.g., a dedicated AI processor). The dedicated AI processor, which is an example of the second processor, may perform operations for training and inference of an AI model. Meanwhile, the embodiments of the disclosure are not limited thereto.

The processor according to the disclosure may be implemented as a single-core processor or may be implemented as a multi-core processor.

In an example in which the method according to an embodiment of the disclosure includes a plurality of operations, the operations may be performed by one core or may be performed by a plurality of cores included in the at least one processor.

Figure 26:
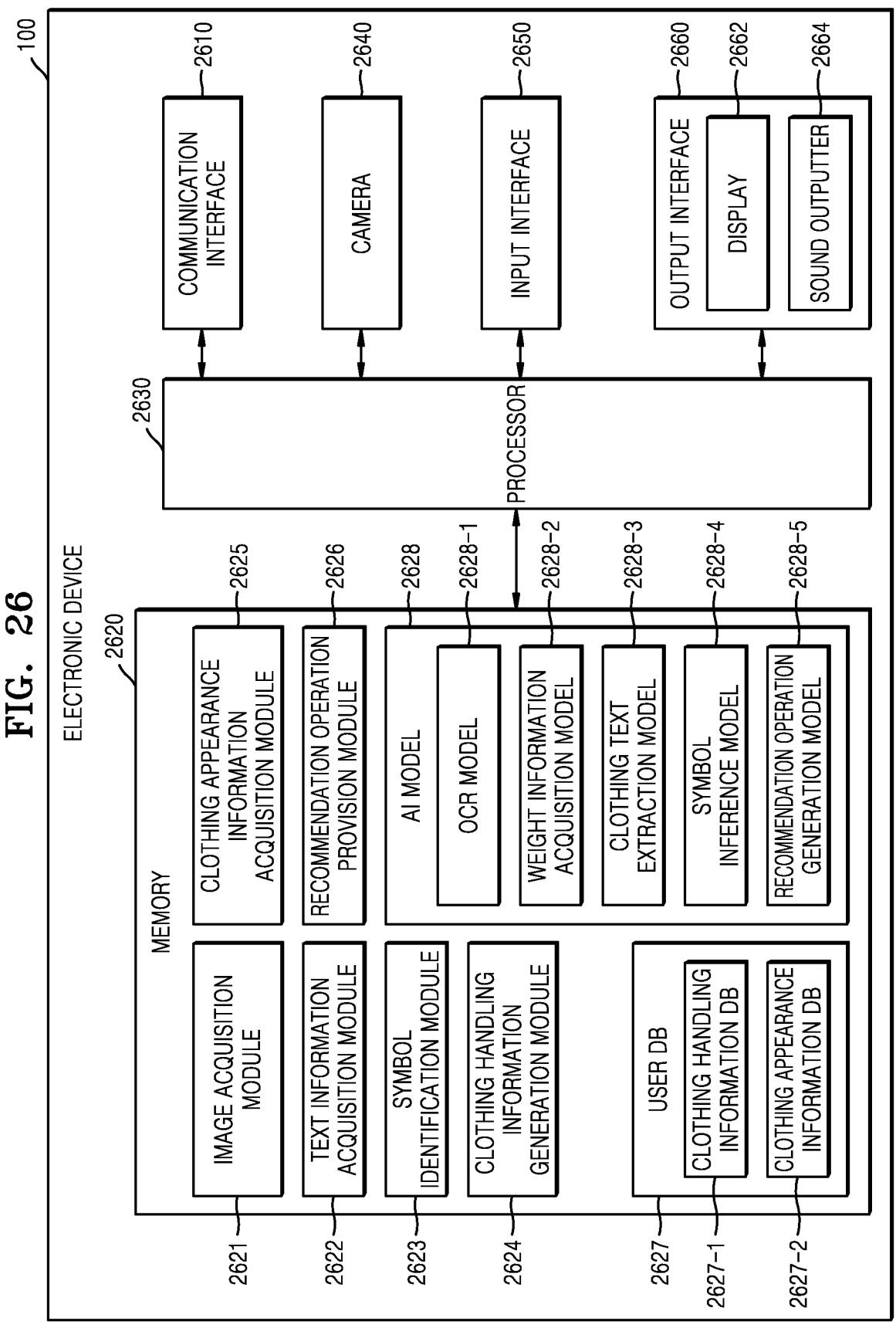
FIG. 26 is a block diagram illustrating a configuration of an electronic device according to an embodiment of the disclosure.

FIG. 26 is a block diagram illustrating a configuration of an electronic device 100 according to an embodiment of the disclosure.

The electronic device 100 according to an embodiment of the disclosure may a communication interface 2610, a memory 2620, a processor 2630, a camera 2640, an input interface 2650, and an output interface 2660.

In an example, the communication interface 2610 corresponds to the communication interface 2510 of FIG. 25, and as such, the same description thereof is omitted.

In an example, the memory 2620 corresponds to the memory 2520 of FIG. 25, and as such, the same description thereof is omitted. The memory 2620 may store one or more instructions and/or programs for allowing the electronic device 100 to identify at least one symbol associated with the handing of the clothing item by processing the label image and obtain handling information related to the clothing item. For example, the memory 2620 may include an image acquisition module 2621, a text information acquisition module 2622, a symbol identification module 2623, a handling information generation module 2624, an appearance information acquisition module 2625, a recommendation operation provision module 2626, a user database (DB) 2627, and an AI model 2628.

In an embodiment of the disclosure, the user DB 2627 may include a handling information DB 2627-1 or an appearance information DB 2627-2. The AI model 2628 may include an OCR model 2628-1, a weight information acquisition model 2628-2, a clothing text extraction model 2628-3, a symbol inference model 2628-4, and a recommendation operation generation model 2628-5. At least one model included in the AI model 2628 may be implemented as one model or may be implemented as a plurality of models. The weight information acquisition model 2628-2 may be a first AI model. The clothing text extraction model 2628-3 may be a second AI model. The symbolic inference model 2628-4 may be a third AI model.

In an example, the processor 2630 corresponds to the processor 2530 of FIG. 25, and as such, the same description thereof is omitted.

In an embodiment of the disclosure, the processor 2630 may execute the image acquisition module 2621 to obtain a label image including at least one symbol associated with the handling of the clothing item. In an example, specific operations associated with the image acquisition module 2621 have been described above in detail with reference to the drawings, and as such, the same description thereof is omitted.

In an embodiment of the disclosure, the processor 2630 may execute the text information acquisition module 2622 to obtain, from the label image, text information associated with the handling of the clothing item. The text information acquisition module 2622 may be a module associated with the OCR model 2628-1, the weight information acquisition model 2628-2, and the clothing text extraction model 2628-

3, which are included in the AI model 2628. In an example, specific operations associated with the text information acquisition module 2622 have been described above in detail with reference to the drawings, and as such, the same description thereof is omitted.

In an embodiment of the disclosure, the processor 2630 may execute the symbol identification module 2623 to identify, from the label image, at least one symbol associated with the handling of the clothing item, based on the text information associated with the handling of the clothing item and the label image. The symbol identification module 2623 may be associated with the symbol inference model 2628-4. In an example, specific operations associated with the symbol identification module 2323 have been described in detail above with reference to the drawings, and as such, the same description thereof is omitted.

In an embodiment of the disclosure, the processor 2630 may execute the handling information generation module 2624 to obtain handling information related to the clothing item, based on the identified at least one symbol. Also, the processor 2630 may store the obtained handling information in the handling information DB 2627-1 included in the user DB 2627. In an example, specific operations associated with the handling information generation module 2624 have been described in detail above with reference to the drawings, and as such, the same description thereof is omitted.

In an embodiment of the disclosure, the processor 2630 may execute the appearance information acquisition module 2625 to obtain appearance information for identifying the clothing item. The appearance information may be obtained by using the camera 2640, or may be received from the external electronic device, the server 200, or the cloud storage. Also, the processor 2630 may store the obtained appearance information in the appearance information DB 2627-2 included in the user DB 2627. In an example, specific operations associated with the appearance information acquisition module 2625 have been described in detail above with reference to the drawings, and as such, the same description thereof is omitted.

In an embodiment of the disclosure, the processor 2630 may execute the recommendation operation provision module 2626 to obtain a user input requesting information about the recommendation operation corresponding to the handling information, identify whether the clothing item is manageable in at least one clothing management device, based on the handling information, and identify whether the clothing item is manageable in the at least one clothing management device, based on the user input. Also, the recommendation operation provision module 2626 may provide the recommendation operation based on an indication that the clothing is manageable in the at least one clothing management device. Also, the recommendation operation provision module 2626 may be associated with the recommendation operation generation model 2628-5 included in the AI model 2628. In an example, specific operations associated with the recommendation operation provision module 2626 have been described in detail above with reference to the drawings, and as such, the same description thereof is omitted.

In an embodiment of the disclosure, the camera 2640 may obtain videos and/or images by photographing an object. One or more cameras 2640 may be provided. The camera 2640 may include, for example, an RGB camera, a telephoto camera, a wide-angle camera, and an ultra-wide-angle camera, but the disclosure is not limited thereto. The camera 2640 may obtain a video including a plurality of frames. Specific types and detailed functions of the camera 2640 may be clearly inferred by those of ordinary skill in the art, and thus, descriptions thereof are omitted.

In an embodiment of the disclosure, the input interface 2650 receives an input from the user. The input interface 2650 may be at least one of a key pad, a dome switch, a touch pad (a contact capacitance type touch pad, a pressure resistance film type touch pad, an infrared detection type touch pad, a surface ultrasonic conduction type touch pad, an integral tension measurement type touch pad, a piezo effect type touch pad, etc.), a jog wheel, or a jog switch, but the disclosure is not limited thereto.

In an embodiment of the disclosure, the input interface 2650 may include a voice recognition module. For example, the electronic device 100 may receive a voice signal, which is an analog signal, through a microphone, and convert the voice part into computer-readable text by using an automatic speech recognition (ASR) model. The electronic device 100 may obtain a user's utterance intention by interpreting the text by using a natural language understanding (NLU) model. The ASR model or the NLU model may be an AI model. Linguistic understanding is a technology that recognizes, applies, and processes human language and characters, and may include natural language processing, machine translation, dialog system, question answering, and speech recognition/synthesis, and the like.

In an embodiment of the disclosure, the output interface 2660 may output a video signal or an audio signal. The output interface 2660 may include a display 2662, a sound outputter 2664, a vibration motor, and the like. In an example in which the display 2662 and the touch pad is configured as a touch screen having a layer structure, the display 2662 may be used as an input interface as well as an output interface. The display 2662 may include at least one of liquid crystal display, thin-film transistor-liquid crystal display, light-emitting diode (LED), organic light-emitting diode, flexible display, three-dimensional (3D) display, or electrophoretic display. According to the implementation of the electronic device 100, the electronic device 100 may include two or more displays 2662.

In an embodiment of the disclosure, the sound outputter 2664 may output an audio signal received from the communication interface 2610 or stored in the memory 2620. Also, the sound outputter 2664 may output sound signals related to functions performed by the electronic device 100. The sound outputter 2664 may include a speaker, a buzzer, and the like.

Meanwhile, the modules stored in the memory 2620 are for convenience of description and the disclosure is not necessarily limited thereto. Other modules may be added in order to implement the embodiments described above, and some modules may be implemented as one module.

Figure 27:
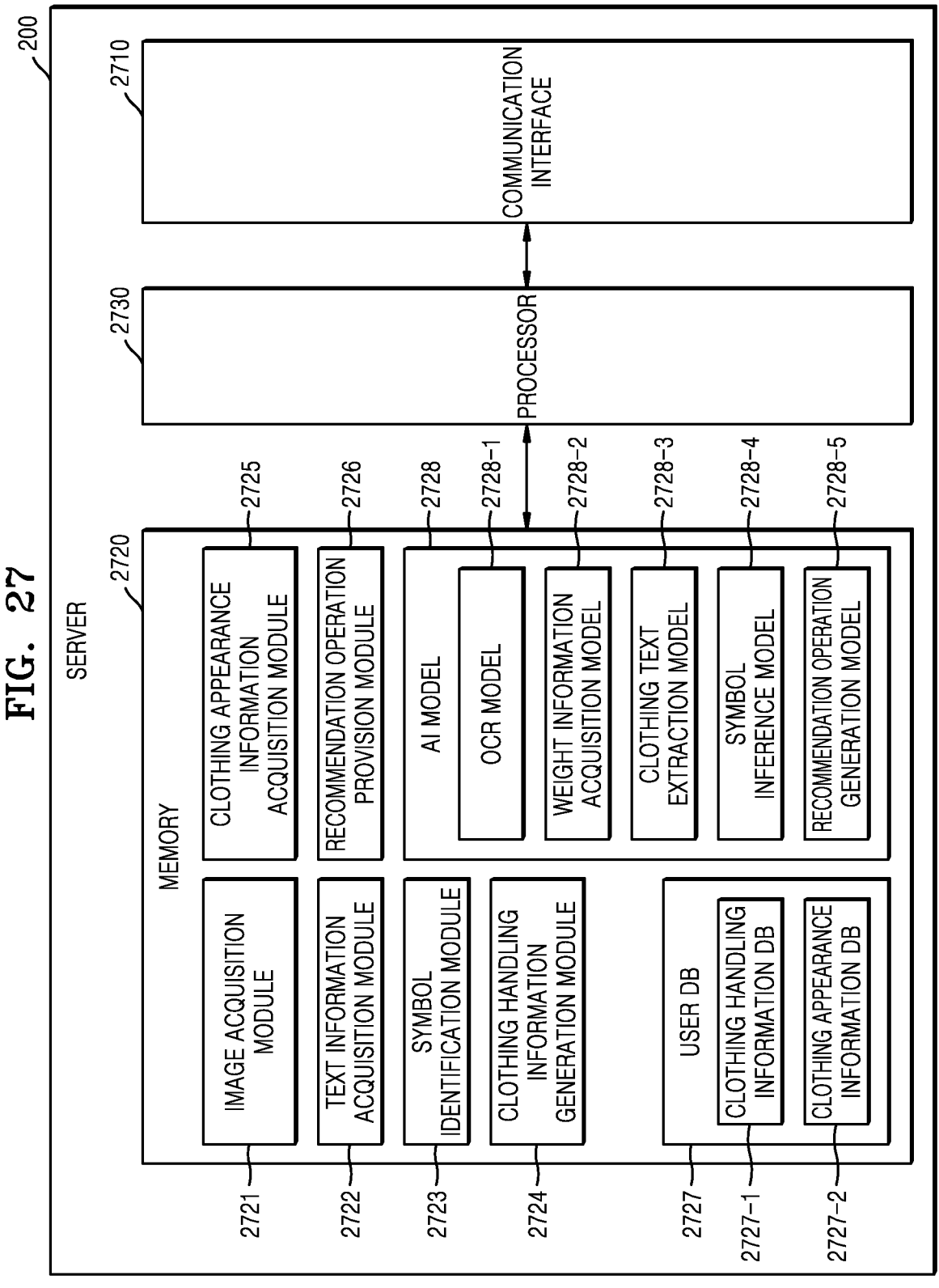
FIG. 27 is a block diagram illustrating a configuration of a server according to an embodiment of the disclosure.

FIG. 27 is a block diagram illustrating a configuration of a server 200 according to an embodiment of the disclosure.

In an embodiment of the disclosure, the above-described operations of the electronic device 100 may be performed by the server 200.

The server 200 according to an embodiment of the disclosure may include a communication interface 2710, a memory 2720, and a processor 2730. In an example, the communication interface 2710, the memory 2720, and the processor 2730 of the server 200 respectively may correspond to the communication interface 2610, the memory 2620, and the processor 2630 of the electronic device 100 of FIG. 26, and as such, the same descriptions thereof are omitted.

The server 200 according to an embodiment of the disclosure may be a device with higher computing performance than the electronic device 100 so as to be able to perform operations with a larger amount of computation than the electronic device 100. The server 200 may train an AI model that requires a relatively large amount of computation, compared to inference. The server 200 may perform the inference by using the AI model and transmit an inference result to the electronic device 100.

Figure 28:
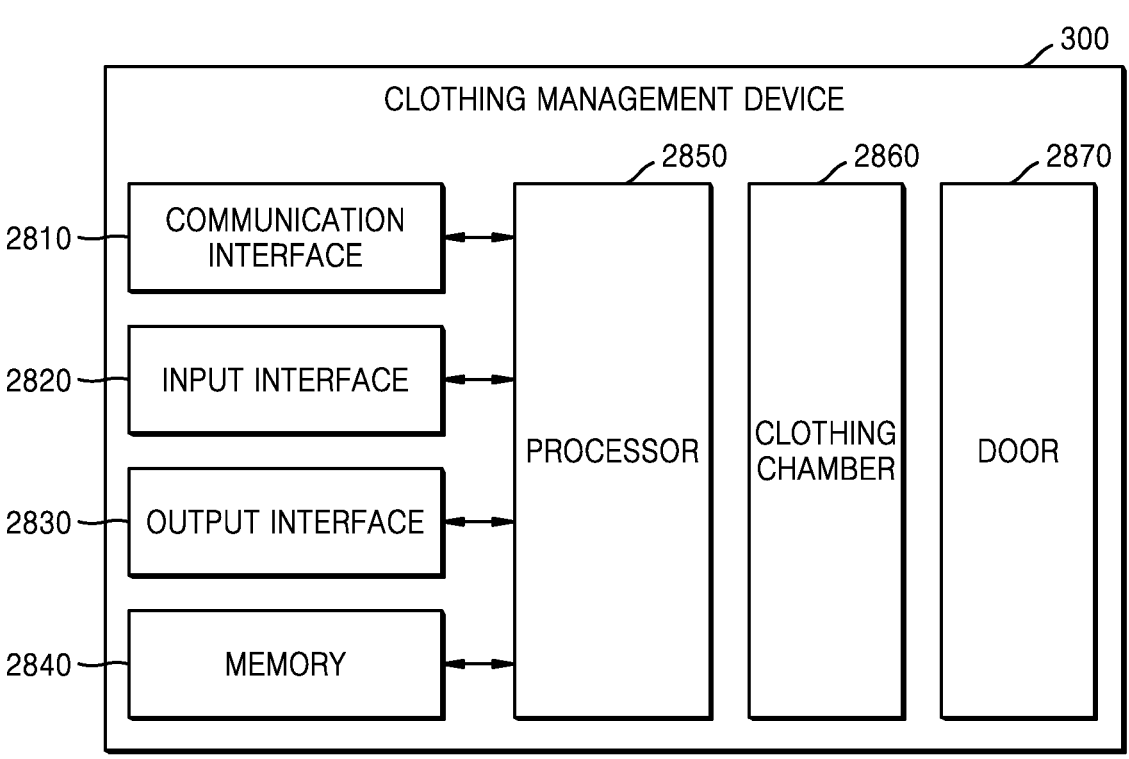
FIG. 28 is a block diagram illustrating a configuration of a clothing management device according to an embodiment of to the disclosure.

FIG. 28 is a block diagram illustrating a configuration of a clothing management device 300 according to an embodiment of to the disclosure.

The clothing management device 300 according to an embodiment of the disclosure may include a communication interface 2810, an input interface 2820, an output interface 2830, a memory 2840, a processor 2850, a clothing chamber 2860, and a door 2870. In an example, the communication interface 2810, the input interface 2820, and the output interface 2830 of the clothing management device 300 respectively correspond to the communication interface 2610, the input interface 2650, and the output interface 2660 of the electronic device 100 of FIG. 26, and as such, the same descriptions thereof are omitted.

In an example, the memory 2840 and the processor 2850 according to an embodiment of the disclosure respectively correspond to the memory 2520 and the processor 2530 of FIG. 25, and as such, the same descriptions thereof are omitted. The memory 2840 may include a default operation module, a recommendation operation acquisition module, a reservation module, and a power module.

In an embodiment of the disclosure, the processor 2850 may control overall operations of the clothing management device 300. The processor 2850 may execute programs stored in the memory 2840 to control the elements (the default operation module, the recommendation operation acquisition module, the reservation module, and the power module) of the clothing management device. The processor 2850 may control various elements of the clothing management device 300 according to a user input that is input through the input interface 2820.

In an embodiment of the disclosure, the processor 2850 may execute the default operation module so that the clothing management device performs operations such as washing, drying, and dry cleaning. The processor 2850 may execute the recommendation operation acquisition module to obtain information about an appropriate operation to be performed on clothing in the clothing management device 300. The processor 2850 may execute the reservation module so that an operation is performed in the clothing management device 300 at a time specified by a user. The processor 2850 may execute the power module to supply power to the elements of the clothing management device.

In an embodiment of the disclosure, the processor 2850 controls overall operations of the clothing management device 300. The processor 2850 may execute the program stored in the memory 2840 to control the elements of the clothing management device. The processor 2850 may control various elements of the clothing management device 300 according to a user input that is input through the input interface 2820. In an example in which the user input of causing the clothing management device to perform at least one of a washing operation, a drying operation, or a dry cleaning operation is obtained from a user, various elements of the clothing management device 300 may be controlled to perform an operation corresponding to the obtained user input. Meanwhile, the clothing management device is not limited to a washing machine, a dryer, an air dresser, and a shoe dresser, and refers to any devices capable of managing clothing. Accordingly, the "operations" performed by the clothing management device are not limited to the washing operation, the drying operation, and the dry cleaning operation, and may include any operations that may be performed by the clothing management device.

In an embodiment of the disclosure, the clothing chamber 2860 accommodates the clothing input through the door 2870 and provides a space for managing the clothing item. The managing of the clothing item may include operations performed for maintaining the condition of the clothing, such as washing, drying, and dry cleaning.

Figure 29:
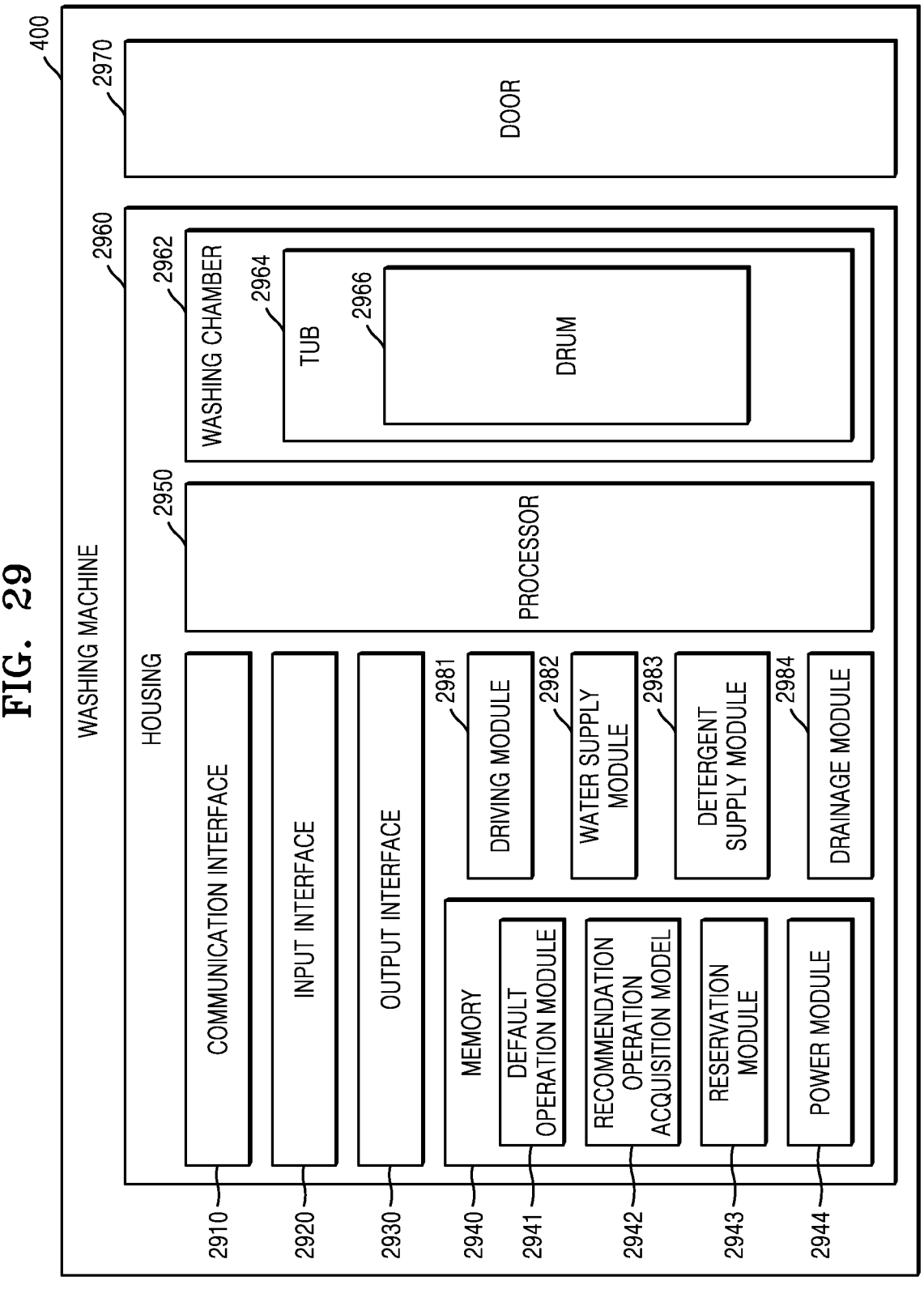
FIG. 29 is a block diagram illustrating a configuration of a washing machine according to an embodiment of the disclosure.

FIG. 29 is a block diagram illustrating a configuration of a washing machine 400 according to an embodiment of the disclosure.

In an embodiment of the disclosure, the washing machine 400 is a device for automatically washing laundry by using electricity, and may perform washing, rinsing, draining, and spin-drying operations. The washing machine 400 may also perform a drying operation on the spin-dried laundry. The washing machine 400 may be an example of the clothing management device.

In an embodiment of the disclosure, the washing machine 400 may include a top-loading washing machine in which a loading/unloading port through which laundry is loaded or unloaded faces upward, or a front-loading washing machine in which a loading/unloading port through which laundry is loaded or unloaded faces forward. The washing machine 400 may include washing machines of loading types other than the top-loading washing machine and the front-loading washing machine.

In an embodiment of the disclosure, the top-loading washing machine may wash laundry by using water current generated by a rotator such as a pulsator. The front-loading washing machine may wash laundry by rotating a drum 2966 to repeat lifting and dropping of laundry. The front-loading washing machine may include a lift for lifting laundry. The washing machine 400 according to various embodiments of the disclosure may include a washing machine of a washing method that is different than the washing method described above.

In an embodiment of the disclosure, the washing machine 400 may include a housing 2960 forming an appearance, a washing chamber 2962 provided inside the housing 2960, and a driving module 2981 configured to drive the washing chamber 2962.

In an embodiment of the disclosure, the housing 2960 may have a partially open shape. The housing 2960 may include a loading/unloading port through which laundry is loaded into the washing chamber 2962. The loading/unloading port may be opened and closed by a door 2970. The door 2970 may be rotatably mounted to the housing 2960 by a hinge. At least a portion of the door 2970 may be transparent or translucent so that the inside of the housing 2960 is visible.

In an example in which the washing machine 400 is a top-loading washing machine, the loading/unloading port may be provided on the top of the housing 2960. In an example in which the washing machine 400 is a front-loading washing machine, the loading/unloading port may be provided in the front side of the housing 2960. The washing chamber 2962 accommodates laundry input through the loading/unloading port and provides a space for washing laundry. According to an embodiment of the disclosure, the washing chamber 2962 may include a tub 2964 and a drum 2966 rotatably disposed inside the tub 2964.

In an embodiment of the disclosure, the tub 2964 may be provided inside the housing 2960 in order to store water. The tub 2964 may have a substantially cylindrical shape with one side open. The tub 2964 may be supported inside the housing 2960. The housing 2960 and the tub 2964 may be connected to each other by a damper. The tub 2964 may be elastically supported from the housing 2960 by the damper. In an example in which vibration generated during the rotation of the drum 2966 is transmitted to the tub 2964 and/or the housing 2960, the damper may be provided to attenuate vibration by absorbing vibration energy between the tub 2964 and the housing 2960.

In an embodiment of the disclosure, the drum 2966 may be provided to accommodate laundry. The drum 2966 may perform washing, rinsing, and/or spin-drying operations while rotating in the tub 2964. The drum 2966 may include a through-hole connecting the inner space of the drum 2966 to the inner space of the tub 2964. The drum 2966 may have a substantially cylindrical shape with one side open. The driving module 2981 may be configured to rotate the drum 2966. The driving module 2981 may include a driving motor and a rotating shaft that transmits driving force generated by the driving motor to the drum 2966. The rotating shaft may pass through the tub 2964 and be connected to the drum 2966. The driving module 2981 may be provided to perform washing, rinsing, and/or spin-drying operations by rotating the drum 2966 forward or backward.

In an embodiment of the disclosure, the washing machine 400 may further include a water supply module 2982 that supplies water to the washing chamber, a detergent supply module 2983 that supplies detergent from the washing chamber 2962, and a drainage module 2984 that discharges water contained in the washing chamber 2962 to the outside.

In an embodiment of the disclosure, the water supply module 2982 may supply water to the tub 2964. The water supply module 2982 may include a water supply pipe and a water supply valve provided in the water supply pipe. The water supply pipe may be connected to an external water supply source. The water supply pipe may extend from the external water supply source to the detergent supply module 2983 and/or the tub 2964. The water may be supplied to the tub 2964 through the detergent supply module 2983. The water may be supplied to the tub 2964 without passing through the detergent supply module 2983.

In an embodiment of the disclosure, the water supply valve may open or close the water supply pipe based on an electrical signal from a processor 2950. The water supply valve may permit or block the supply of water from the external water supply source to the tub 2964. The water supply valve may include, for example, a solenoid valve that opens or closes based on an electrical signal.

In an embodiment of the disclosure, the detergent supply module 2983 may be configured to supply detergent to the tub 2964. The detergent supply module 2983 may be configured to supply detergent to the tub 2964 during the supply of water. The water supplied through the water supply pipe may be mixed with the detergent via the detergent supply module 2983. The water mixed with the detergent may be supplied to the tub 2964. The detergent may include not only laundry detergent but also dryer rinse, deodorant, disinfectant, or air freshener.

In an embodiment of the disclosure, the drainage module 2984 may be configured to discharge the water contained in the tub 2964 to the outside. The drainage module 2984 may include a drainage pipe extending from the bottom of the tub 2964 to the outside of the housing 2960, and a pump provided on the drainage pipe. The pump may pump water from the drainage pipe to the outside of the housing 2960.

In an embodiment of the disclosure, a drainage port may be formed at a lower portion of the tub 2964 in order to drain water contained in the tub 2964 to the outside of the tub 2964. The drainage port may be connected to the drainage pipe. A drainage valve may be provided in the drainage pipe in order to open and close the drainage pipe.

In an embodiment of the disclosure, the processor 2950 may control overall operations of the washing machine 400. The processor 2950 may execute the program stored in the memory 2940 to control the elements of the washing machine 400. The processor 2950 may include a separate NPU that performs the operation of the AI model. Also, the processor 2950 may include a CPU, a GPU, and the like.

In an embodiment of the disclosure, the memory 2940 may store or record a variety of information, data, instructions, programs, and the like, which are necessary for the operation of the washing machine 400. The memory 2940 may store temporary data generated while generating control signals for controlling the elements included in the washing machine 400. The memory 2940 may include at least one of volatile memory or non-volatile memory, or a combination thereof.

In an embodiment of the disclosure, the processor 2950 may control various elements (e.g., a driving module, a water supply module, etc.) of the washing machine 400. The processor 2950 may control various elements of the washing machine 400 to perform at least one operation including water supply, washing, rinsing, and/or spin-drying according to a user input that is input to an input interface 2920. For example, the processor 2950 may control the driving motor to adjust the rotating speed of the tub 2964 or may control the water supply valve of the water supply module 2646 to supply water to the tub 2964.

In an embodiment of the disclosure, the processor 2950 may process the user input of the user interface and control the operation of the user interface according to programs and/or data memorized and/or stored in the memory 2940. The user interface may be provided by using the input interface 2920 and an output interface 2930. The processor 2950 may receive the user input from the user interface. In addition, the processor 2950 may transmit, to the user interface, a display control signal and image data for displaying an image on the user interface based on the user input.

In an embodiment of the disclosure, the processor 2950 and the memory 2940 may be provided integrally or separately. The processor 2950 may include at one or more processors 2950. For example, the processor 2950 may include a main processor and at least one sub-processor. The memory 2940 may include one or more memories.

In an embodiment of the disclosure, the memory 2940 may include a default operation module 2941, a recommendation operation acquisition module 2942, a reservation module 2943, and a power module 2944. Meanwhile, the modules that may be included in the memory 2940 are not limited thereto.

In an embodiment of the disclosure, the processor 2950 may execute the program stored in the memory 2940 to control the elements of the washing machine 400.

In an embodiment of the disclosure, the processor 2950 may execute the default operation module 2941 to cause the washing machine 400 to perform the washing course pre-stored in the washing machine 400.

In an embodiment of the disclosure, the processor 2950 may execute the recommendation operation acquisition module 2942 to obtain information about suitable operations to be performed on the clothing item by the washing machine 400. The washing machine 400 may directly or indirectly obtain, from the electronic device 100 or the server 200, information about the recommendation operation corresponding to the clothing item. For example, the washing machine 400 may execute the recommendation operation acquisition module to obtain information about the recommendation operation including a series of operations of washing clothing at 30° C., rinsing three times, and strongly spin-drying clothing loaded into the washing machine 400.

In an embodiment of the disclosure, the processor 2950 may execute the reservation module 2943 so that the washing machine 400 performs an operation (e.g., the default operation or the recommendation operation) at a time specified by a user.

In an embodiment of the disclosure, the processor 2950 may execute the power module 2944 to supply power to the elements of the washing machine 400.

In an embodiment of the disclosure, the communication interface 2910 may include at least one of a short-range wireless communication module or a long-range wireless communication module. The communication interface 2910 may include at least one antenna that wirelessly communicates with other devices.

In an embodiment of the disclosure, the short-range wireless communication module may include a Bluetooth communication module, a BLE communication module, a NFC module, a WLAN (Wi-Fi) communication module, a ZigBee communication module, an IrDA communication module, a WFD communication module, a UWB communication module, an Ant+ communication module, a microwave (uWave) communication module, and the like, but the disclosure is not limited thereto.

In an embodiment of the disclosure, the long-range wireless communication module may include a communication module that performs various types of long-range wireless communication, and may include a mobile communication module. The mobile communication module may transmit and receive radio signals to and from at least one of a base station, an external terminal, or a server on the mobile communication network.

In an embodiment of the disclosure, the communication interface 2910 may communicate with an external device, such as a server, a mobile device, or other home appliances, through a peripheral access point (AP). The AP may connect a LAN, to which the washing machine 400 or a user equipment is connected, to a WAN, to which the server is connected. The washing machine 400 or the user equipment may be connected to the server through the WAN.

In an embodiment of the disclosure, the input interface 2920 may receive the user input and transmit the received user input to the processor 2950. The input interface 2920 may include a power button, an operation button, a course selection dial (or a course selection button), or a wash/rinse/spin-dry setting button. The input interface 2920 may include, for example, a tact switch, a push switch, a slide switch, a toggle switch, a micro switch, or a touch switch.

In an embodiment of the disclosure, the output interface 2930 may output a variety of information associated with the operation of the washing machine 400. The output interface 2930 may include a display, an LED, or a speaker. The output interface 2930 may output washing course information, operation time information, and the like.

In an embodiment of the disclosure, the washing machine 400 may include a control panel including the input interface 2920 and the output interface 2930. The control panel may be disposed at a certain position on the front side of the housing 2960 of the washing machine 400.

According to an embodiment of the disclosure, a method and an electronic device for processing a label image and a computer-readable recording medium may be provided.

In an embodiment of the disclosure, a method, performed by the electronic device 100, of processing an image may include obtaining a label image including at least one symbol associated with handling of clothing item (S210). In an embodiment of the disclosure, the method, performed by the electronic device 100, of processing the image may include obtaining, from the label image, text information associated with the handling of the clothing item (S220). In an embodiment of the disclosure, the method, performed by the electronic device 100, of processing the image may include identifying, from the label image, the at least one symbol associated with the handling of the clothing item, based on the text information associated with the handling of the clothing item and the label image (S230). In an embodiment of the disclosure, the method, performed by the electronic device 100, of processing the image may include obtaining handling information related to the clothing item, based on the identified at least one symbol (S240).

In an embodiment of the disclosure, the method, performed by the electronic device 100, of processing the image may include obtaining a plurality of texts from the label image by applying the label image to an OCR model 530. In an embodiment of the disclosure, the method, performed by the electronic device 100, of processing the image may include extracting at least one text associated with the handling of the clothing item from among the plurality of obtained texts by applying the plurality of obtained texts to at least one AI model trained to infer texts associated with the handling of the clothing item.

In an embodiment of the disclosure, the method, performed by the electronic device 100, of processing the image may include obtaining weight information about weights representing a correlation between the plurality of texts by applying the plurality of obtained texts to the first AI model 540. In an embodiment of the disclosure, the method, performed by the electronic device 100, of processing the image may include extracting at least one text associated with the handling of the clothing item from among the plurality of obtained texts by applying the plurality of obtained texts and weight information to the second AI model 550.

In an embodiment of the disclosure, the first AI model 540 may be an AI model trained to infer weights representing a correlation between the plurality of texts, and the second AI model 550 may be an AI model trained to infer texts associated with handling of clothing item.

In an embodiment of the disclosure, the method, performed by the electronic device 100, of processing the image may include extracting at least one image feature associated with the at least one symbol by inputting the label image to the image feature extraction network 520. In an embodiment of the disclosure, the method, performed by the electronic device 100, of processing the image may include identifying, from the label image, at least one symbol associated with the handling of the clothing item by applying text information associated with the handling of the clothing item, including at least one text associated with the handling of the clothing item, and at least one image feature associated with at least one symbol to the third AI model 560 trained to infer symbols associated with the handling of the clothing item.

In an embodiment of the disclosure, the text information associated with the handling of the clothing item may include information about at least one of a type of clothing, a fiber material, a fiber ratio, or precautions.

In an embodiment of the disclosure, the method, performed by the electronic device 100, of processing the image may include obtaining appearance information for identifying the clothing item (S1110). In an embodiment of the disclosure, the method, performed by the electronic device 100, of processing the image may include displaying clothing information including the handling information and the appearance information (S1160).

In an embodiment of the disclosure, the method, performed by the electronic device 100, of processing the image may include obtaining a user input of requesting information about a recommendation operation corresponding to the handling information (S1350). In an embodiment of the disclosure, the method, performed by the electronic device 100, of processing the image may include identifying whether the clothing item is manageable in at least one clothing management device, based on the handling information (S1360). In an embodiment of the disclosure, the method, performed by the electronic device 100, of processing the image may include providing information about whether the clothing item is manageable in at least one clothing management device, based on the user input.

In an embodiment of the disclosure, the method, performed by the electronic device 100, of processing the image may include obtaining information about the recommendation operation to be performed by the at least one clothing management device by analyzing the handling information based on an identification that the clothing is manageable in the at least one clothing management device (S1370). In an embodiment of the disclosure, the method, performed by the electronic device 100, of processing the image may include transmitting the information about the recommendation operation to the at least one clothing management device (S1380).

In an embodiment of the disclosure, the method, performed by the electronic device 100, of processing the image may include providing a notification that the at least one clothing management device is unable to handle the clothing item, based on an indication that the clothing item is unmanageable in the at least one clothing management device (S1365).

In an embodiment of the disclosure, the method, performed by the electronic device 100, of processing the image may include transmitting the label image to the server 200. In an embodiment of the disclosure, the method, performed by the electronic device 100, of processing the image may include receiving, from the server 200, at least one symbol identified from the label image by the server 200 or the handling information of the clothing item, which is generated by the server 200.

In an embodiment of the disclosure, the handling information may include at least one of washing information, drying information, spin-drying information, ironing information, or dry cleaning information.

In an embodiment of the disclosure, the electronic device 100 for processing the image may include a memory 2520 that stores one or more instructions and at least one processor 2530 that executes the one or more instructions stored in the memory 2520. In an embodiment of the disclosure, the at least one processor 2530 may execute the one or more instructions to obtain a label image including at least one symbol associated with handling of clothing item. In an embodiment of the disclosure, the at least one processor 2530 may execute the one or more instructions to obtain, from the label image, text information associated with the handling of the clothing item. In an embodiment of the disclosure, the at least one processor 2530 may execute the one or more instructions to identify, from the label image, at least one symbol associated with handling of clothing item, based on the text information associated with handling of clothing item and the label image. In an embodiment of the disclosure, the at least one processor 2530 may execute the one or more instructions to obtain handling information related to the clothing item, based on the identified at least one symbol.

In an embodiment of the disclosure, the at least one processor 2530 may execute the one or more instructions to obtain a plurality of texts from the label image by applying the label image to the OCR model 530. In an embodiment of the disclosure, the at least one processor 2530 may execute the one or more instructions to extract at least one text associated with the handling of the clothing item from among the plurality of obtained texts by applying the plurality of obtained texts to at least one AI model trained to infer texts associated with the handling of the clothing item.

In an embodiment of the disclosure, the at least one processor 2530 may execute the one or more instructions to obtain weight information about weights representing a correlation between the plurality of texts by applying the plurality of obtained texts to the first AI model 540. In an embodiment of the disclosure, the at least one processor 2530 may execute the one or more instructions to extract at least one text associated with the handling of the clothing item from among the plurality of obtained texts by applying the plurality of obtained texts and weight information to the second AI model 550.

In an embodiment of the disclosure, the first AI model 540 may be an AI model trained to infer weights representing a correlation between the plurality of texts. In an embodiment of the disclosure, the second AI model 550 may be an AI model trained to infer texts associated with the handling of the clothing item.

In an embodiment of the disclosure, the at least one processor 2530 may execute the one or more instructions to extract at least one image feature associated with the at least one symbol by inputting the label image to the image feature extraction network 520. In an embodiment of the disclosure, the at least one processor 2530 may execute the one or more instructions to identify, from the label image, at least one symbol associated with the handling of the clothing item by applying text information associated with the handling of the clothing item, including at least one text associated with the handling of the clothing item, and at least one image feature associated with at least one symbol to the third AI model 560 trained to infer symbols associated with the handling of the clothing item.

In an embodiment of the disclosure, the at least one processor 2530 may execute the one or more instructions to obtain appearance information for identifying the clothing item. In an embodiment of the disclosure, clothing information including the handling information and the appearance information may be displayed.

In an embodiment of the disclosure, the at least one processor 2530 may execute the one or more instructions to obtain a user input requesting information about a recommendation operation corresponding to the handling information. In an embodiment of the disclosure, the at least one processor 2530 may execute the one or more instructions to identify whether the clothing item is manageable in at least one clothing management device, based on the handling information. In an embodiment of the disclosure, the at least one processor 2530 may execute the one or more instructions to provide information about whether the clothing item is manageable in the at least one clothing management device, based on the user input.

According to an embodiment of the disclosure, a computer-readable recording medium having recorded thereon a program for causing a computer to perform the method, performed by the electronic device 100, of processing the image may be provided. In an embodiment of the disclosure, the method, performed by the electronic device 100, of processing the image may include obtaining the label image including at least one symbol associated with the handling of the clothing item (S210). In an embodiment of the disclosure, the method, performed by the electronic device 100, of processing the image may include obtaining, from the label image, text information associated with the handling of the clothing item (S220). In an embodiment of the disclosure, the method, performed by the electronic device 100, of processing the image may include identifying, from the label image, the at least one symbol associated with the handling of the clothing item, based on the text information associated with the handling of the clothing item and the label image (S230). In an embodiment of the disclosure, the method, performed by the electronic device 100, of processing the image may include obtaining handling information related to the clothing item, based on the identified at least one symbol (S240).

Meanwhile, the embodiments of the disclosure may be implemented in the form of a computer-readable recording medium including computer-executable instructions, such as program modules executable by a computer. The computer-readable recording medium may be any available media that are accessible by the computer, and may include any volatile and non-volatile media and any removable and non-removable media. In addition, the computer-readable recording medium may include a computer storage medium and a communication medium. The computer storage medium may include any volatile, non-volatile, removable, and non-removable media that are implemented in any method or technology for storage of information, such as computer-readable instructions, data structures, program modules, or other data. The communication medium may typically include computer-readable instructions, data structures, or other data of a modulated data signal, such as program modules.

Also, the computer-readable recording medium may be provided in the form of a non-transitory computer-readable recording medium. The "non-transitory computer-readable recording medium" is a tangible device and only means not including a signal (e.g., electromagnetic waves). This term does not distinguish between a case where data is semi-permanently stored in a computer-readable recording medium and a case where data is temporarily stored in a computer-readable recording medium. For example, the non-transitory computer-readable recording medium may include a buffer in which data is temporarily stored.

According to an embodiment of the disclosure, the methods according to various embodiments of the disclosure may be provided by being included in a computer program product. The computer program products may be traded between a seller and a buyer as commodities. The computer program product may be distributed in the form of a machine-readable storage medium (e.g., CD-ROM), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The foregoing description of the disclosure is for illustrative purposes only, and those of ordinary skill in the art to which the disclosure pertains will understand that modifications into other specific forms may be made thereto without changing the technical spirit or essential features of the disclosure. Therefore, it should be understood that the embodiments described above are illustrative in all aspects and are not restrictive. For example, the components described as being singular may be implemented in a distributed manner. Similarly, the components described as being distributed may be implemented in a combined form.

The scope of the disclosure is defined by the appended claims rather than the above detailed description, and all changes or modifications derived from the meaning and scope of the claims and equivalent concepts thereof should be construed as falling within the scope of the disclosure.

What is claimed is:

1. A method of processing an image by an electronic device, the method comprising:

obtaining a label image including at least one symbol associated with handling of clothing item;

obtaining, from the label image, text information associated with the handling of the clothing item;

identifying, from the label image, the at least one symbol associated with the handling of the clothing item, based on the text information and the label image; and obtaining handling information related to the clothing item based on the identified at least one symbol.

2. The method of claim 1, wherein the obtaining of the text information associated with the handling of the clothing item comprises:

obtaining a plurality of texts from the label image by applying the label image to an optical character recognition (OCR) model; and extracting at least one text associated with the handling of the clothing item from among the plurality of texts by applying the plurality of texts to at least one artificial intelligence (AI) model trained to infer texts associated with handling of clothing item.

3. The method of claim 2, wherein the extracting of the at least one text associated with the handling of the clothing item comprises:

obtaining weight information about weights representing a correlation between the plurality of texts by applying the plurality of texts to a first AI model; and extracting the at least one text associated with the handling of the clothing item from among the plurality of texts by applying the plurality of texts and the weight information to a second AI model.

4. The method of claim 3, wherein the first AI model is an AI model trained to infer the weights representing the correlation between the plurality of texts, and the second AI model is an AI model trained to infer the texts associated with the handling of the clothing item.

5. The method of claim 1, wherein the identifying of the at least one symbol comprises:

extracting at least one image feature associated with the at least one symbol by inputting the label image to an image feature extraction network; and identifying, from the label image, the at least one symbol associated with the handling of the clothing item by applying the text information associated with the handling of the clothing item, including the at least one text associated with the handling of the clothing item, and the at least one image feature associated with the at least one symbol, to a third AI model trained to infer symbols associated with the handling of the clothing item.

6. The method of claim 1, wherein the text information associated with the handling of the clothing item comprises at least one of a type of clothing, a fiber material, a fiber ratio, or precautions corresponding to the clothing item.

7. The method of claim 1, further comprising:

obtaining appearance information for identifying the clothing item; and displaying clothing information including the handling information and the appearance information.

8. The method of claim 1, further comprising:

obtaining a user input requesting information about a recommendation operation corresponding to the handling information;

identifying whether the clothing item is manageable in at least one clothing management device, based on the handling information; and providing information about whether the clothing item is manageable in the at least one clothing management device, based on the user input.

9. The method of claim 8, wherein the providing of the information about whether the clothing item is manageable in the at least one clothing management device comprises:

obtaining information about the recommendation operation to be performed by the at least one clothing management device by analyzing the handling information based on identifying that the clothing item is manageable in the at least one clothing management device; and transmitting the information about the recommendation operation to the at least one clothing management device.

10. The method of claim 8, wherein the providing of the information about whether the clothing item is manageable in the at least one clothing management device comprises providing a notification that the at least one clothing management device is unable to handle the clothing item, based on identifying that the clothing item is unmanageable in the at least one clothing management device.

11. The method of claim 1, further comprising:

transmitting the label image to a server; and receiving, from the server, the at least one symbol or the handling information.

12. The method of claim 1, wherein the handling information comprises at least one of washing information, drying information, spin-drying information, ironing information, or dry cleaning information corresponding to the clothing item.

13. The method of claim 1, wherein the identifying of the at least one symbol comprises:

extracting at least one image feature associated with the at least one symbol by inputting the label image to an image feature extraction network; and identifying, from the label image, the at least one symbol associated with the handling of the clothing item by applying the text information associated with the handling of the clothing item, and the at least one image feature associated with the at least one symbol, to an artificial intelligence (AI) model trained to infer symbols associated with the handling of the clothing item.

14. An electronic device for processing an image, the electronic device comprising:

a memory storing one or more instructions; and

51

52 at least one processor configured to execute the one or more instructions stored in the memory to:

obtain a label image including at least one symbol associated with handling of clothing item;

obtain, from the label image, text information associated with the handling of the clothing item;

identify, from the label image, the at least one symbol associated with the handling of the clothing item, based on the text information and the label image; and obtain handling information related to the clothing item based on the identified at least one symbol.

15. The electronic device of claim 14, wherein the at least one processor is further configured to execute the one or more instructions to:

obtain a plurality of texts from the label image by applying the label image to an optical character recognition (OCR) model; and extract at least one text associated with the handling of the clothing item from among the plurality of texts by applying the plurality of texts to at least one artificial intelligence (AI) model trained to infer texts associated with the handling of clothing item.

16. The electronic device of claim 15, wherein the at least one processor is further configured to execute the one or more instructions to:

obtain weight information about weights representing a correlation between the plurality of texts by applying the plurality of texts to a first AI model; and extract the at least one text associated with the handling of the clothing item from among the plurality of texts by applying the plurality of texts and the weight information to a second AI model.

17. The electronic device of claim 16, wherein the first AI model is an AI model trained to infer the weights representing the correlation between the plurality of texts, and the second AI model is an AI model trained to infer the texts associated with the handling of the clothing.

18. The electronic device of claim 14, wherein the at least one processor is further configured to execute the one or more instructions to:

extract at least one image feature associated with the at least one symbol by inputting the label image to an image feature extraction network; and identify, from the label image, the at least one symbol associated with the handling of the clothing item by applying the text information associated with the handling of the clothing item, including the at least one text associated with the handling of the clothing item, and the at least one image feature associated with the at least one symbol, to a third AI model trained to infer symbols associated with the handling of the clothing item.

19. The electronic device of claim 14, wherein the at least one processor is further configured to execute the one or more instructions to:

obtain appearance information for identifying the clothing item; and display clothing information including the handling information and the appearance information.

20. A non-transitory computer-readable recording medium having recorded thereon a program for causing a computer to perform a method comprising:

obtaining a label image including at least one symbol associated with handling of clothing item;

obtaining, from the label image, text information associated with the handling of the clothing item;

identifying, from the label image, the at least one symbol associated with the handling of the clothing item, based on the text information and the label image; and obtaining handling information related to the clothing item, based on the identified at least one symbol.

* * * * *